United States Patent
Miyazaki et al.

(10) Patent No.: US 8,189,434 B2
(45) Date of Patent: May 29, 2012

(54) OPTICAL PICKUP UNIT AND OPTICAL PICKUP DEVICE HAVING SAME AND INFORMATION WRITING/READING DEVICE HAVING SAME

(75) Inventors: Osamu Miyazaki, Kyoto (JP); Keiji Sakai, Nara (JP); Yukio Watanabe, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1263 days.

(21) Appl. No.: 11/579,127

(22) PCT Filed: Apr. 27, 2005

(86) PCT No.: PCT/JP2005/008054
§ 371 (c)(1),
(2), (4) Date: Oct. 30, 2006

(87) PCT Pub. No.: WO2005/106862
PCT Pub. Date: Nov. 10, 2005

(65) Prior Publication Data
US 2008/0062826 A1    Mar. 13, 2008

(30) Foreign Application Priority Data

Apr. 30, 2004    (JP) .................................. 2004-136495
Apr. 30, 2004    (JP) .................................. 2004-136517

(51) Int. Cl.
*G11B 7/00*    (2006.01)
*G11B 7/135*    (2012.01)

(52) U.S. Cl. ............... 369/44.41; 369/47.25; 369/53.22; 369/112.07

(58) Field of Classification Search .... 369/44.37–44.42, 369/53.2, 53.22–53.23, 112.03–112.07, 112.11–112.12, 369/112.15
See application file for complete search history.

(56) References Cited

U.S. PATENT DOCUMENTS 5,026,981 A * 6/1991 Yamane et al. ............ 369/53.26
(Continued)

FOREIGN PATENT DOCUMENTS

JP    07-134831    5/1995
(Continued)

OTHER PUBLICATIONS

Machine-Assisted Translation of JP 10255300 A.*
(Continued)

*Primary Examiner* — Nathan Danielsen
(74) *Attorney, Agent, or Firm* — David G. Conlin; Steven M. Jensen; Edwards Wildman Palmer LLP

(57) ABSTRACT

An optical pickup device includes: a splitting section for splitting a beam; a light-receiving section for receiving the split beams. The light-receiving section includes: a tracking-use main light-receiving region and tracking-use sub light-receiving regions, and auxiliary light-receiving regions. Each of the auxiliary light-receiving regions receives only a light beam reflected off a recording layer other than a recording layer subjected to an information writing/reading process. A light-receiving area of each of the auxiliary light-receiving area is smaller than a light-receiving area of each tracking-use light-receiving region. Further, an optical pickup device includes: a splitting section for splitting a beam; and a light-receiving section for receiving the split beams. The light-receiving section includes a sub light-receiving regions for receiving tracking-use sub beams. The tracking-use sub beams are arranged so as not to allow entering of a focusing-use main beam reflected off a non-targeted recording layer.

8 Claims, 22 Drawing Sheets

U.S. PATENT DOCUMENTS

| | | | |
|---|---|---|---|
| 5,881,035 A * | 3/1999 | Ueyama | 369/44.23 |
| 5,923,632 A * | 7/1999 | Kato et al. | 369/112.07 |
| 7,483,360 B2 * | 1/2009 | Masui et al. | 369/120 |
| 2002/0024916 A1 * | 2/2002 | Ueyama et al. | 369/112.04 |
| 2004/0013057 A1 * | 1/2004 | Aoe et al. | 369/44.35 |

FOREIGN PATENT DOCUMENTS

| | | | |
|---|---|---|---|
| JP | 07134831 A * | 5/1995 | |
| JP | 08-185635 | 7/1996 | |
| JP | 09-161282 | 6/1997 | |
| JP | 09-161295 | 6/1997 | |
| JP | 10-222867 | 8/1998 | |
| JP | 10255300 A * | 9/1998 | |
| JP | 2002-237080 | 8/2002 | |
| JP | 2002-319177 | 10/2002 | |
| JP | 2003-067949 | 3/2003 | |
| JP | 2004-127482 | 4/2004 | |
| JP | 2004-288227 | 10/2004 | |
| JP | 2004-303296 | 10/2004 | |
| WO | WO-96/20473 | 7/1996 | |

OTHER PUBLICATIONS

Machine-Assisted Translation of JP 07134831 A.*

* cited by examiner

OPTICAL PICKUP UNIT AND OPTICAL PICKUP DEVICE HAVING SAME AND INFORMATION WRITING/READING DEVICE HAVING SAME

TECHNICAL FIELD

The present invention relates to an optical disc device (information writing/reading device) capable of writing or reading information into/from a storage medium such as an optical disc, and relates to an optical pickup device and an optical pickup unit used in the optical disc device.

BACKGROUND ART

To record high-resolution moving pictures on a single optical disc (storage medium), the optical disc needs to have an increased capacity for recording. An approach for achieving this is to provide plural writing-target layers (information writing layers) to an optical disc. Read-only single-sided double layer discs such as DVD-ROM, DVD-Video have been widely marketed, and are commercially available. Meanwhile, a standard for information-writable single-sided double layer optical discs has been already announced, and commercialization of such optical discs is just a matter of time.

Here, an optical-disc having plural writing-target layers has a problem of unnecessary reflected light component (stray light component) off a non-targeted layer which is a layer other than a writing-target layer to which information reading/writing is performed. Specifically, if a reflected light component off a writing-target layer (Hereinafter, targeted-layer) and a reflected light component off the non-targeted layer are detected, overlapping each other, an accurate measurement of a light quantity becomes difficult.

Technologies for this problem are disclosed for example in Patent document 1 (Japanese Patent No. 3372413 (Tokukaihei 9-0161282; Published on Jun. 20, 1997; Corresponding U.S. Pat. No. 5,881,035)) and Patent document 2 (Japanese Unexamined Patent Publication No. 319177 (Tokukai 2002-319177; Published on Oct. 31, 2002)).

Patent document 1 discloses a technique for restraining an influence of a stray light component which mixes in a focus signal. In the technique, only an influence of a stray light component is detected by using a configuration in which a light-receiving section for receiving a reflected light component off a targeted layer is provided with: a main light-receiving region for receiving a reflected light component off a targeted layer; and an auxiliary light-receiving region for receiving only a reflected light component off a non-targeted layer.

Further, similarly to Patent document 1, Patent document 2 discloses a technique for restraining crosstalk of a reproduced signal and a focus signal by providing an auxiliary light-receiving region for receiving a reflected light component (stray light component) off a non-targeted layer.

On the other hand, unlike a read-only (Play-only) disc, a writable disc has a problem of crosstalk to a tracking signal.

In view of this, a differential push-pull method (hereinafter DPP method) using three beams (one main beam and two sub beams) is generally employed as a tracking method. This DPP is a method in which an offset-free tracking signal is obtained by finding a differential amongst push-pull signals of the main beam and sub beams.

For example, in a case of using the above mentioned three beams for writing information in a DVD±R disc, the writing speed is proportional to the square of the light intensity of the main beam. On this account, the light intensity of the main beam needs to be increased to achieve a high-speed writing. In this case, the intensity ratio of the main beam versus each of the sub beams is set at for example 10:1 or 15:1, and as such, the light intensity of each sub beams is significantly low. This means that each detector (light-receiving section) for detecting the sub beam detects a light beam whose light intensity is extremely lower than the main beam.

Meanwhile, when writing or reading information into/from an optical disc in which plural writing-target layers are laminated, reflected light off a non-targeted layer (a layer not subject to information reading/writing) enters the light-receiving section as stray light including stray light components of the main beam and the sub beams. Since the stray light is light which is defocused by a layer interval from the writing-target layer, the stray light passes through a collector optics, and enters the light-receiving section without being focused. As such, the light-receiving section is irradiated with a light beam which is considerably larger than a light beam reflected off the layer to which information writing/reading is performed.

The stray light emitted in a wide range are incident on the light-receiving section used for tracking control, and causes an error in calculation of a tracking servo signal. This disturbs accurate tracking control.

The light density (a light quantity per a unit area) of such stray light is remarkably-low, when compared with a light quantity of the main beam or that of the sub beam. However, since the main beam has higher light intensity than the sub beams in the first place, a stray light component originated in the main beam gives a considerable amount of negative influence to the tracking control In a case of recording information on a DVD±R by using the three beams, the use of technologies disclosed in Patent documents 1 and 2 for restraining stray light-caused error necessitates provision of the auxiliary light-receiving region which receives only reflected light off the non-targeted layer to each one of the light-receiving sections for respectively detecting tracking-use beams of the three beams. However, the provision of the auxiliary light-receiving region to each of the light-receiving sections causes an increase in the area of the entire light-receiving section, and complication of the associated circuits.

The stray light itself does not cause a large influence when it is incident on the light-receiving region for receiving the main beam. This is because the light density of the stray light is considerably low.

However, each of the light-receiving regions for receiving the sub beams receives a light beam whose light intensity (light density) is extremely lower than that of the main beam. Specifically, the light intensity of the sub beam is smaller than that of the main beam (e.g. 1/10 of the main beam), and the light-receiving region for receiving the sub beam receives a light beam having such a small light intensity. Thus, when the sub-beam light-receiving region receives the stray light (particularly main-beam-originated stray light component whose light intensity is stronger than the other stray light components), a significant influence is given to the light intensity of light received by the light-receiving section, even if the light intensity of the stray light component is smaller than that of light from a layer to which information reading/writing is performed. This consequently causes significant offset of DPP signals. Furthermore, an accurate tracking signal is not obtained, when the stray light component originated in the main beam having a higher light intensity than the sub beam enters the sub-beam light-receiving region.

DISCLOSURE OF INVENTION

In view of the above problems, the present invention is made, and it is an object of the present invention to provide an optical pickup device and an information writing/reading device each capable of accurately and stably performing tracking control, when writing information into a DVD±R by using plural light beams, without a need of increasing the number of auxiliary light-receiving sections.

In order to achieve the foregoing object, an optical pickup unit of the present invention includes: a splitting section for at least (i) splitting at least one tracking-use main beam from a main beam which has been reflected off a storage medium and passed through a converging section and (ii) splitting at least one tracking-use sub beam from each of sub beams having lower light intensity than the main beam, the tracking-use main beam and the tracking-use sub beam used for figuring out a tracking servo signal, the storage section including plural information writing layers being laminated; and a light-receiving section for receiving the tracking-use main beam and the tracking-use sub beam, the light-receiving section including: (A) at least one tracking-use main light-receiving region for receiving the tracking-use main beam, (B) tracking-use sub light-receiving regions each for receiving the tracking-use sub beam, and (C) auxiliary light-receiving regions each for receiving only a light beam reflected off an information writing layer other than the information writing layer subjected to an information reading/writing process, each of the auxiliary light-receiving regions serving as a light-receiving region for use in error amount calculation for restraining an error in the tracking servo signal, and each of the auxiliary light-receiving regions having a smaller light-receiving area than that of each of the tracking-use sub light-receiving regions.

Here, a light beam (main beam or sub beams) reflected off the information writing layer (Hereinafter, non-targeted layer) other than the information writing layer (Hereinafter, targeted layer) being subject to an information writing/reading process irradiates a larger area of the light-receiving section than a light beam which has been reflected off the targeted layer, and which passed through the converging section. This is attributed to a difference between the respective optical path lengths of the light beams. Accordingly, the intensity per unit area of the light beam reflected off the non-targeted layer is lower than the light beam reflected off the targeted layer.

However, the main beam has a stronger light intensity than each of the sub beams, and the light intensity of the main beam reflected off the non-targeted layer is close to that of each sub beam reflected off the targeted layer. On this account, when the main beam reflected off the non-targeted layer enters each of the tracking-use sub light-receiving regions and the tracking-use main light-receiving region each being provided for finding out the tracking servo signal, an error occurs in a light quantity of the received light. Consequently, an accurate tracking signal is not obtained.

In view of this problem, the optical pickup unit of the present invention is provided with the auxiliary light-receiving regions each serves as a light-receiving region for use in calculating an error amount for restraining an error in the tracking servo signal, and which region receives only a light beam reflected off an information writing layer other than an information writing layer subjected to an information writing/reading process: i.e. receives only a light beam reflected off the non-targeted layer.

Here, in a case of figuring out a tracking signal by using the both main beam and sub beams as in the case of the optical pickup unit of the present invention, it is necessary to provide each tracking-use sub light-receiving region and the tracking-use main light-receiving region with an auxiliary light-receiving region for use in calculating an error amount. However, the provision of the auxiliary light-receiving region to each tracking-use sub light-receiving region and the tracking-use main light-receiving region causes an increase in the area of the entire light-receiving section, and causes complication of the associated circuits. This is disadvantageous in terms of cost.

In view of that, in the optical pickup unit of the present invention, the light-receiving area of each auxiliary light-receiving region is made smaller than that of the tracking-use sub light-receiving region, so that it is possible to more accurately cancel out the light quantity (i.e. error amount) of a light beam (stray light) reflected off the non-targeted layer, which light beam is included in a light quantity received by the tracking-use sub light-receiving regions and the tracking-use main light-receiving region. In this way, the offset occurring when figuring out a tracking servo signal is more surely cancelled out, and more accurate tracking servo signal is obtained. Note that the above mentioned light-receiving area is a planar dimension of a region which actually receives a light beam.

With the configuration, it is no longer necessary to provide an auxiliary light-receiving region for each of the tracking-use main light-receiving region and the tracking-use sub light-receiving region, at the time of calculating a tracking servo signal, and yet it is possible to restrain an error caused by stray light entered the both tracking-use main light-receiving region and the tracking-use sub light-receiving region. Thus, an accurate tracking servo signal is obtained without a need of increasing the entire area of the light-receiving section, or without a need of a complicated circuit associated with the light-receiving regions.

Furthermore, an accurate and stable tracking control is possible without a need of increasing the number of the auxiliary light-receiving regions, in a case of writing information by using plural beams (e.g. in a case of writing information into a DVD± disc by using three beams).

Further, in order to achieve the foregoing object, an optical pickup unit of the present invention includes: a splitting section for at least (i) splitting at least one tracking-use main beam from a main beam which has been reflected off a storage medium and passed through a converging section and (ii) splitting at least one tracking-use sub beam from each of sub beams having lower light intensity than the main beam, the tracking-use main beam and the tracking-use sub beam used for figuring out a tracking servo signal, the storage section including plural information writing layers being laminated; and a light-receiving section for receiving the tracking-use main beam and the tracking-use sub beam, the light-receiving section including: (A) at least one tracking-use main light-receiving region for receiving the tracking-use main beam, (B) tracking-use sub light-receiving regions each for receiving the tracking-use sub beam, and (C) auxiliary light-receiving regions each for receiving only a light beam reflected off an information writing layer other than the information writing layer subjected to an information reading/writing process, each of the auxiliary light-receiving regions serving as a light-receiving region for use in error amount calculation for restraining an error in the tracking servo signal; and the light-receiving section is connected to a calculating circuit for calculating out the tracking servo signal based on a light quantity in the light-receiving sections, the calculating circuit being provided with a gain adjuster for adding gain to a signal output based on the light quantity in the light-receiving sections, the gain adjuster adds, to a signal derived from the auxiliary light-receiving regions, a smaller gain than gain added to a signal derived from the tracking-use sub light-receiving regions.

Here, a light beam (main beam or sub beams) reflected off the information writing layer (Hereinafter, non-targeted layer) other than the information writing layer (Hereinafter, targeted layer) being subject to an information writing/reading process irradiates a larger area of the light-receiving section than a light beam which has been reflected off the targeted layer, and which passed through the converging section. This is attributed to a difference between the respective optical path lengths of the light beams. Accordingly, the intensity per unit area of the light beam reflected off the non-targeted layer is lower than the light beam reflected off the targeted layer.

However, the main beam has a stronger light intensity than each of the sub beams, and the light intensity of the main beam reflected off the non-targeted layer is close to that of each sub beam reflected off the targeted layer. On this account, when the main beam reflected off the non-targeted layer enters each of the tracking-use sub light-receiving regions and the tracking-use main light-receiving region each being provided for finding out the tracking servo signal, an error occurs in a light quantity of the received light. Consequently, an accurate tracking signal is not obtained.

In view of this problem, the optical pickup unit of the present invention is provided with the auxiliary light-receiving regions each serves as a light-receiving region for use in calculating an error amount for restraining an error in the tracking servo signal, and which region receives only a light beam reflected off an information writing layer other than an information writing layer subjected to an information writing/reading process: i.e. receives only a light beam reflected off the non-targeted layer.

Here, in a case of figuring out a tracking signal by using the both main beam and sub beams as in the case of the optical pickup unit of the present invention, it is necessary to provide each tracking-use sub light-receiving region and the tracking-use main light-receiving region with an auxiliary light-receiving region for use in calculating an error amount. However, the provision of the auxiliary light-receiving region to each tracking-use sub light-receiving region and the tracking-use main light-receiving region causes an increase in the area of the entire light-receiving section, and causes complication of the associated circuits. This is disadvantageous in terms of cost.

In view of that, the optical pickup unit of the present invention includes the calculating circuit connected to the light-receiving section, which circuit is for calculating a tracking servo signal based on a light quantity having received by each of the light-receiving regions. This calculating circuit is provided with the gain adjuster which adds a gain to a signal output from each of the light-receiving regions. The gain adjuster adds, to a signal derived from the auxiliary light-receiving region, a smaller gain than gain added to a signal derived from the tracking-use sub light-receiving region.

In this way, it is possible to more accurately cancel out a light quantity (i.e. error amount) of a light beam (stray light) reflected off the non-targeted layer, which light beam is included in a light quantity entered each tracking-use sub light-receiving region and the tracking-use main light-receiving region. Thus, the offset occurring when figuring out a tracking servo signal is more surely cancelled out, and more accurate tracking servo signal is obtained.

With the configuration, it is no longer necessary to provide an auxiliary light-receiving region for each of the tracking-use main light-receiving region and the tracking-use sub light-receiving region, at the time of calculating a tracking servo signal, and yet it is possible to restrain an error caused by stray light entered the both tracking-use main light-receiving region and the tracking-use sub light-receiving region. Thus, an accurate tracking servo signal is obtained without a need of increasing the entire area of the light-receiving section, or without a need of a complicated circuit associated with the light-receiving regions.

Furthermore, an accurate and stable tracking control is possible without a need of increasing the number of the auxiliary light-receiving regions, in a case of writing information by using plural beams (e.g. in a case of writing information into a DVD± disc by using three beams).

Another object of the present invention is to provide an optical pickup unit, an optical pickup device, and an information writing/reading device each capable of performing accurate and stable tracking control, when reading/writing information from/into a storage medium in which plural writing-target layers are laminated.

In order to achieve the foregoing object, an optical pickup unit of the present invention includes: a splitting section for (i) splitting a main beam reflected off a storage medium and passed through a converging section into a focusing-use main beam for use in figuring out a focus servo signal and at least one tracking-use main beam for use in figuring out a tracking servo signal, the storage medium having plural information writing layers being laminated, and (ii) splitting at least one tracking-use sub beam for use in figuring out the tracking servo signal, from each of sub beams each having a lower light intensity than the main beam; and a tracking light-receiving region for receiving the tracking-use main beam and the tracking-use sub beam, the tracking light-receiving region including a sub light-receiving region for receiving the tracking-use sub beam, and the tracking light-receiving region being arranged so that a focusing-use main beam reflected off an information writing layer other than an information writing layer subjected to an information writing/reading process is kept from entering the sub light-receiving region.

Each of the sub beams has lower intensity than the main beam, and each of the sub light-receiving regions receives such a sub beam whose light intensity is low. Accordingly, when each of the sub light-receiving regions receives stray light (unwanted light) other than the tracking-use sub beam, an error occurs in a signal generated in each sub light-receiving region.

Further, a light beam (main beam or sub beams) reflected off the information writing layer (Hereinafter, non-targeted layer) other than the information writing layer (Hereinafter, targeted layer) being subject to an information writing/reading process irradiates a larger area of the light-receiving section than a light beam which has been reflected off the targeted layer, and which passed through the converging section. This is attributed to a difference between the respective optical path lengths of the light beams. Accordingly, the intensity per unit area of the light beam reflected off the non-targeted layer is lower than the light beam reflected off the targeted layer. However, the main beam has a stronger light intensity than each of the sub beams, and the light intensity of the main beam reflected off the non-targeted layer is close to that of each sub beam reflected off the targeted layer. Further, when the focusing-use main beam reflected off the non-targeted layer enters the sub light-receiving regions, each sub light-receiving region is not able to obtain an accurate signal due to the light intensity of the focusing-use main beam.

In the above configuration, the tracking light-receiving regions are arranged so that the focusing-use main beam reflected off the non-targeted layer does not enter the sub light-receiving regions. In short, the sub light-receiving regions do not allow entering of the focusing-use main beam reflected off the non-targeted layer. Accordingly, it is possible to perform more accurate and stable tracking control than a conventional configuration which does not take into account the entering of the focusing-use main beam into the sub light-receiving region.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 illustrates an arrangement of light-receiving regions provided in the light-receiving section.

FIG. 7 illustrates an arrangement of light-receiving regions provided in the light-receiving section.

FIG. 8 illustrates an arrangement of light-receiving regions provided in the light-receiving section.

BEST MODE FOR CARRYING OUT THE INVENTION

Embodiment 1

The following will describe Embodiment 1 of the present invention. An optical pickup device of the present embodiment is provided in an optical disc device (information writing/reading device) which optically reads and writes information from/onto a storage medium such as an optical disc. To write information onto a storage medium, the optical pickup device performs tracking control by means of a differential push-pull method (hereinafter, DPP) using three beams (one main beam and two sub beams).

In the following, plural writing-target layers of a storage medium are termed as follows: a writing-target layer to/from which information is not written/read by the optical pickup device is a non-targeted layer, whereas a writing-target layer to/from which information is written/read by the optical pickup device is a targeted layer. In other words, writing-target layers other than the target layer are non-targeted layers.

Figure 2:
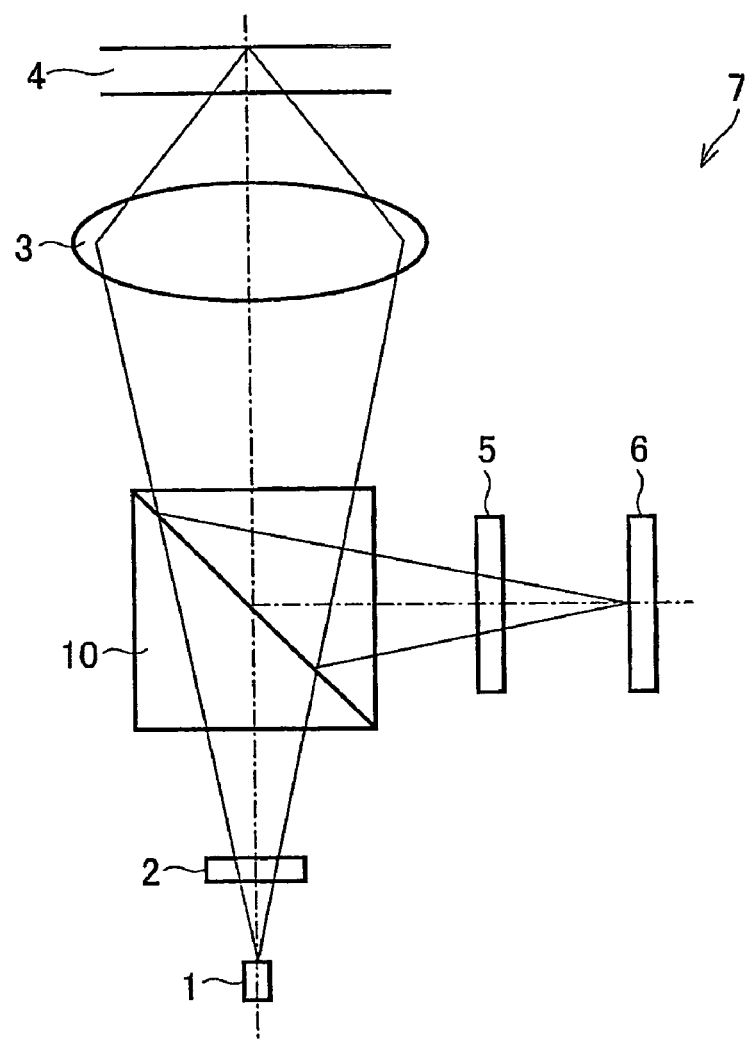
FIG. 2 is a side-view illustrating schematic configuration of the optical pickup device of Embodiments 1 to 6.

FIG. 2 is a side view which outlines an optical pickup device 7 of the present embodiment. The optical pickup device 7 includes a laser light source (laser source) 1, a diffraction section (generating section) 2, an objective lens (converging section) 3, a beam splitter 10, a hologram (splitting section) 5, and a light-receiving section 6.

The laser light source 1 applies laser light onto an optical disc (storage medium) 4. The laser source 1 emits, for example, a laser beam with the wavelength of 650 nm. Since the wavelength of the laser beam emitted from the laser light source 1 is not particularly limited, the wavelength may be 405 nm, for example.

The diffraction section 2 is provided between the laser light source 1 and the optical disc 4. From one light beam emitted from the laser light source 1, the diffraction section 2 generates one main beam (zero-th transmitted light) and two sub beams (positive first-order diffracted light and negative first-order diffracted light). In other words, the light beam emitted from the laser light source 1 is divided into three light beams by the diffraction section 2. In the present embodiment, the diffraction section 2 is provided between the laser light source 1 and the objective lens 3 (more specifically, between the laser light source 1 and the beam splitter 10). Also, the diffraction section 2 generates the two types of light beams in such a manner as to cause the luminous intensity of the main beam to be higher than those of the sub beams. More specifically, the diffraction section 2 generates the main beam and the sub beams in such a manner as to cause the total luminous intensity of two sub beams (positive first-order diffracted light and negative first-order diffracted light) to be lower than the luminous intensity of the main beam. In the present embodiment, the diffraction section 2 diffracts the light beam so that the luminous intensities of the respective beams satisfy the following equation: positive first-order diffracted light:zero-th transmitted light:negative first-order diffracted light)=1:10:1. In case where the diffraction section 2 is constituted by a diffraction grating, the ratio between the zero-th transmitted light and the positive and negative first-order diffracted lights can be controlled by changing the depth of the groove of the diffraction grating.

The objective lens 3 converges, on the optical disc 4, the three light beams diffracted by the diffraction section 2. The light beams reflected off the optical disc 4 pass through the objective lens 3 and then irradiate the hologram 5.

The beam splitter 10 guides the three light beams (one main light beam and two sub light beams), which have been reflected off the optical disc 4, to the hologram 5. In the present embodiment, the traveling directions of the three light beams having been reflected off the optical disc 4 and passed through the objective lens 3 are changed by the beam splitter 10, and the beams are guided to the hologram 5.

The hologram 5 splits the light beams having been reflected off the optical disc 4 and passed through the objective lens 3. The hologram 5 is separated into plural areas. The light beams having passed through the objective lens 3 are split by these areas and caused to irradiate the light-receiving section 6. More specifically, each of the light beams is split, by the hologram 5, into at least (i) a focusing-use light beam for figuring out a focus servo signal and (ii) a tracking-use light beam for figuring out a tracking servo signal. The splitting pattern of the hologram 5 and the details of the light-receiving section 6 will be given later.

The light-receiving section 6 has plural light-receiving elements. The light-receiving section 6 receives (detects) the light beams (the focusing-use light beam and tracking-use light beams) separated by the hologram 5, and converts the light beams into electric signals. The light-receiving section 6 detects the luminous intensities of the supplied light beams. The light-receiving section 6 includes a focusing-use light-receiving region AB which receives the focusing-use light beam and tracking-use light-receiving regions C, D, E, F, G, and H which receive the tracking-use light beams. The focusing-use light-receiving region AB generates a focus servo signal, while the tracking-use light-receiving regions C, D, E, F, G, and H generate a tracking servo signal. The tracking-use light-receiving regions are constituted by tracking-use main light-receiving regions C and D which receive the tracking-use main beams and the tracking-use sub light-receiving regions E, F, G, and H which receive the tracking-use sub beams.

In the above-described optical pickup device 7, the light beam emitted from the laser source 1 is diffracted by the diffraction section 2 so as to be separated into three light beams. These light beams then pass through the beam splitter 10, and are converged on the optical disc 4 by the objective lens 3. The light beams reflected off the optical disc 4 pass through the objective lens 3 again, and reflected off the beam splitter 10. Subsequently, each of the light beams is split into three or more light beams by the hologram 5, and the light beams thus split irradiate the light-receiving section 6.

Figure 1:
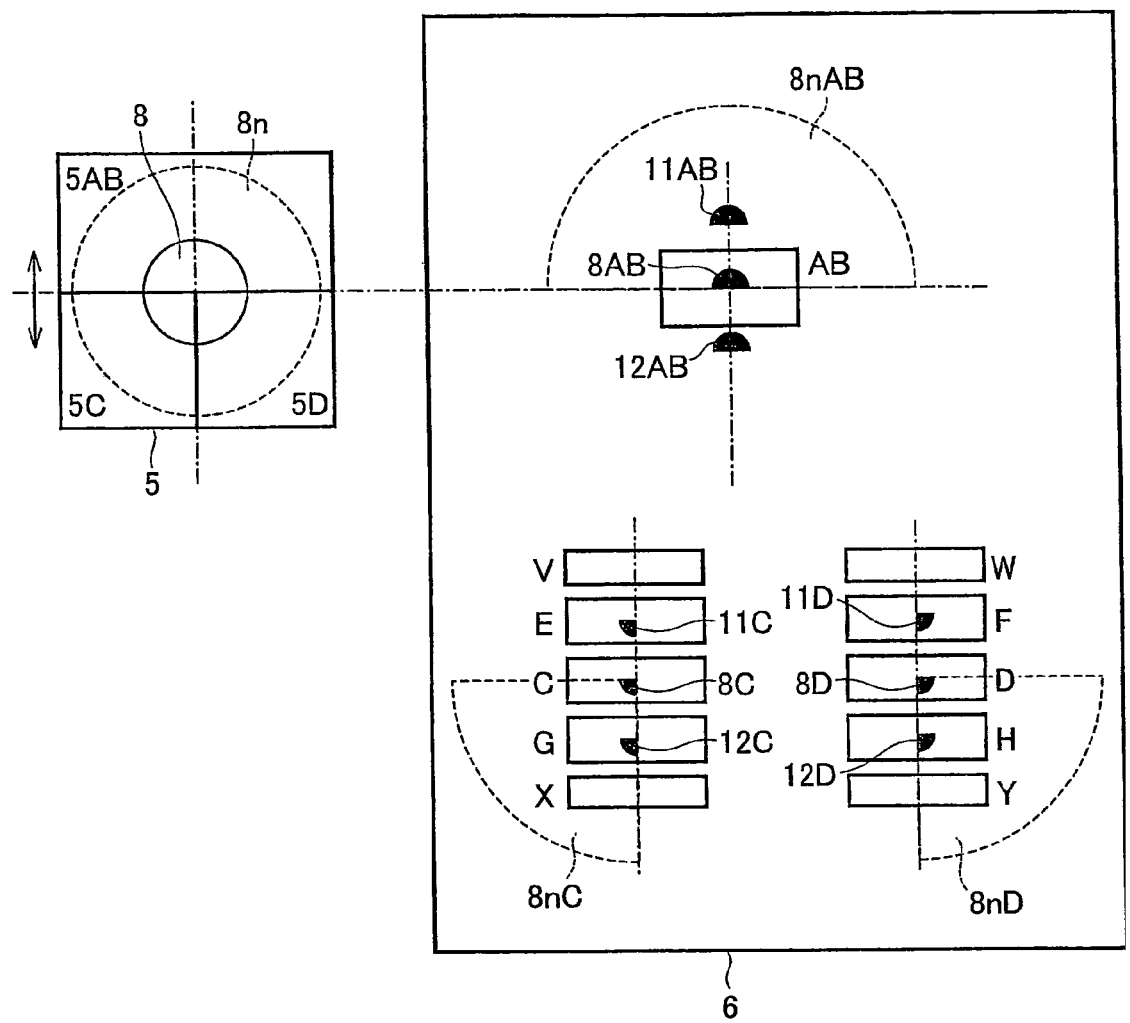
FIG. 1 is a frontal view of a hologram and a light-receiving section provided in an optical pickup device of Embodiment 1. For the light-receiving section in particular.

Now, the details of the hologram 5 and the light-receiving section 6 are given below. FIG. 1 is a frontal view showing split regions (splitting pattern) of the hologram 5 and the arrangement of the light-receiving regions in the light-receiving section 6. The arrows in the figure indicate the tracking directions.

As shown in FIG. 1, the hologram 5 is split into three regions (5AB, 5C, and 5D). The region 5AB is one of two regions divided by the straight line on which the optical axis of the main beam 8 irradiates the hologram 5. More specifically, the region 5AB is a split region of the hologram 5, which is one of two regions divided by the straight line (hereinafter, orthogonal line) which includes the optical axis of the main beam irradiating the hologram 5 and is orthogonal to the tracking directions.

The regions 5C and 5D are split regions of the hologram other than the region 5AB. The regions 5C and 5D are bounded by (i) the straight line (hereinafter, horizontal line) which includes the optical axis of the aforesaid light beam and is in parallel to the tracking directions and (ii) the orthogonal line. In other words, among four regions around the optical axis, which are divided by the orthogonal line and the horizontal line, the neighboring regions on the same side of the horizontal line are the regions 5C and 5D, whereas the region in which the orthogonal line passes through is the region 5AB.

Among these regions, a light beam split by the region 5AB is the focusing-use light beam for figuring out the focus servo signal, whereas two light beams split by the regions 5C and 5D, respectively, are the tracking-use light beams for figuring out the tracking servo signal. The focusing-use light beam irradiates the focusing-use light-receiving region AB, whereas the tracking-use light beams irradiate the tracking-use light-receiving regions C, D, E, F, G, and H.

The main beam which is split in the region 5AB is a focusing-use main beam 8AB for figuring out the focus servo signal, whereas two main beams which are split in the respective regions 5C and 5D are tracking-use main beams 8C and 8D for figuring out the tracking servo signal. The sub beams split in the region 5AB are other sub beams (termed focusing-use sub beams 11AB and 12AB for convenience). Two sub beams split in the region 5C are tracking-use sub beams 11C and 12C for figuring out the tracking servo signal, whereas two sub beams split in the region 5D are tracking-use sub beams 11D and 12D for figuring out the tracking servo signal. In the following, the light beams irradiating the light-receiving section 6 are a focusing-use light beam and tracking-use light beams, in case where main beams and sub beams are not distinguished from one another.

As shown in FIG. 1, the light-receiving section 1 includes a focusing-use light-receiving region AB which receives the focusing-use light beam and tracking-use light-receiving regions C, D, E, F, G, and H which receive the tracking-use light beams. More specifically, the focusing-use light-receiving region AB receives the focusing-use light beam (focusing-use main beam 8AB) which is split in the region 5AB of the hologram 5. Meanwhile, among the tracking-use light-receiving regions, the regions C, E, and G receive the tracking-use light beams 8C, 11C, and 12C split in the region 5C, whereas the regions D, F, and H receive the tracking-use light beams 8D, 11D, and 12D split in the region 5D.

Among the tracking-use light-receiving regions C, E, and G receiving the tracking-use light beams split in the region 5C, the region C is a tracking-use main light-receiving region receiving the tracking-use main beam 8C which is zero-th transmitted light, whereas the regions E and G are tracking-use sub light-receiving regions receiving respective tracking-use sub beams 11C and 12C which are positive first-order diffracted light and negative first-order diffracted light, respectively.

Among the tracking-use light-receiving regions D, F, and H which receive tracking-use light beams split in the region 5D, the region D is a tracking-use main light-receiving region receiving the tracking-use main beam 8D which is zero-th transmitted light, whereas the regions F and H are tracking-use sub light-receiving regions receiving the respective tracking-use sub beams 11D and 12D which are positive first-order diffracted light and negative first-order diffracted light, respectively.

The spots on the light-receiving section 6, where the light beams split by the hologram 5 irradiate the light-receiving section 6, are indicated by shadows in FIG. 1.

The tracking-use main light-receiving region C and the tracking-use sub light-receiving regions E and G (and D, F, and H) are arranged such that the tracking-use sub light-receiving regions E and G (F and H) sandwich the tracking-use main light-receiving region C (D) along the tracking directions. In the description above, the main beam and sub beams are the light beams reflected off the targeted layer.

In the optical pickup device 7, moreover, auxiliary light-receiving regions V and X (W and Y) are provided adjacent to the tracking-use sub light-receiving regions E and G (F and H), respectively. More specifically, the auxiliary light-receiving regions V (W) and the tracking-use main light-receiving region C (D) sandwich the tracking-use sub light-receiving region E (F) along the tracking directions, whereas the auxiliary light-receiving region X (Y) and the tracking-use main light-receiving region C (D) sandwich the tracking-use sub light-receiving region G (H) along the tracking directions.

The auxiliary light-receiving regions V and X (W and Y) receive only light beams (hereinafter, stray light) reflected off non-targeted layers. That is, in case where the optical disc 4 includes only a single layer, no light irradiates the auxiliary light-receiving regions V and X (W and Y).

The five light-receiving regions (auxiliary light-receiving region V, tracking-use sub light-receiving region E, tracking-use main light-receiving region C, tracking-use sub light-receiving region G, and auxiliary light-receiving region X) receiving the tracking-use light beams split in the region 5C and the five light-receiving regions (W, F, D, H, and Y) receiving the tracking-use light beams split in the region 5D are provided in the above-described order, along the tracking directions. Also, two groups each of which are constituted by the five light-receiving regions (i.e. the group of V, E, C, G, X and the group of W, F, D, H, Y) are provided in a parallel manner, on the opposite side of the focusing-use light-receiving region AB. Since these two groups are adjacent to each other and in parallel to each other, it is possible to reduce the size (area) of the light-receiving section 6. It is noted that, in FIG. 1, alternate long and short dash lines correspond to the straight lines (orthogonal line and horizontal line) in the hologram 5, on which straight lines the optical axis passes through.

The main beam 8 diffracted in the region 5AB irradiates the focusing-use light-receiving region AB, as the focusing-use main beam 8AB. The sub beams 11 and 12 (not illustrated) diffracted in the region 5AB irradiate, as sub beams 11AB and 12AB, regions which sandwich the focusing-use light-receiving region AB and are not light-receiving regions. In other words, the sub beams 11AB and 12AB diffracted in the region 5A are not used for figuring out the focus servo signal and tracking servo signal.

On the other hand, the main beam 8 diffracted in the region 5C (5D) irradiates the tracking-use main light-receiving region C (D). The sub beams 11 and 12 (not illustrated) diffracted in the region 5C (5D) irradiate the tracking-use sub light-receiving regions E and G (F and H), respectively.

Now, the following discusses the shape of the auxiliary light-receiving regions V and X (W and Y) of the present embodiment. In the present embodiment, the auxiliary light-receiving regions V and X (W and Y) are arranged such that, as shown in FIG. 1, the light-receiving areas thereof are smaller than the light-receiving areas of the tracking-use light receiving regions E and G (F and H). The following will give details of this.

Before describing the shape of the auxiliary light-receiving regions, the following will discuss how a tracking servo signal (tracking error signal, hereinafter, TES) in case where the optical disc 4 includes only a single layer is figured out by a differential push-pull method (hereinafter, DPP method). The DPP method is typically used for a recordable optical disc 4. According to the DPP method, provided that the light intensity detected by the tracking-use main light-receiving region C is "C", the light intensity detected by the tracking-use main light-receiving region D is "D", the light intensities detected by the respective tracking-use sub light-receiving regions E and G are "E" and "G", and the light intensities of the tracking-use sub light-receiving regions F and H are "F" and "H", the aforesaid TES is figured out by the following equation (1).

$$TES = ("C" - "D") - K \times \{("E" + "G") - ("F" + "H")\} \quad (1)$$

In the equation, indicated by K is an optional coefficient figured by the differences between the light intensities of the main beams and the light intensities of the sub beams.

In other words, the difference between the main beams split in the regions 5C and 5D and the differences among the sub beams split in the regions 5C and 5D are figured out, and the tracking servo signal is calculated by working out the difference between these differences.

Figure 3:
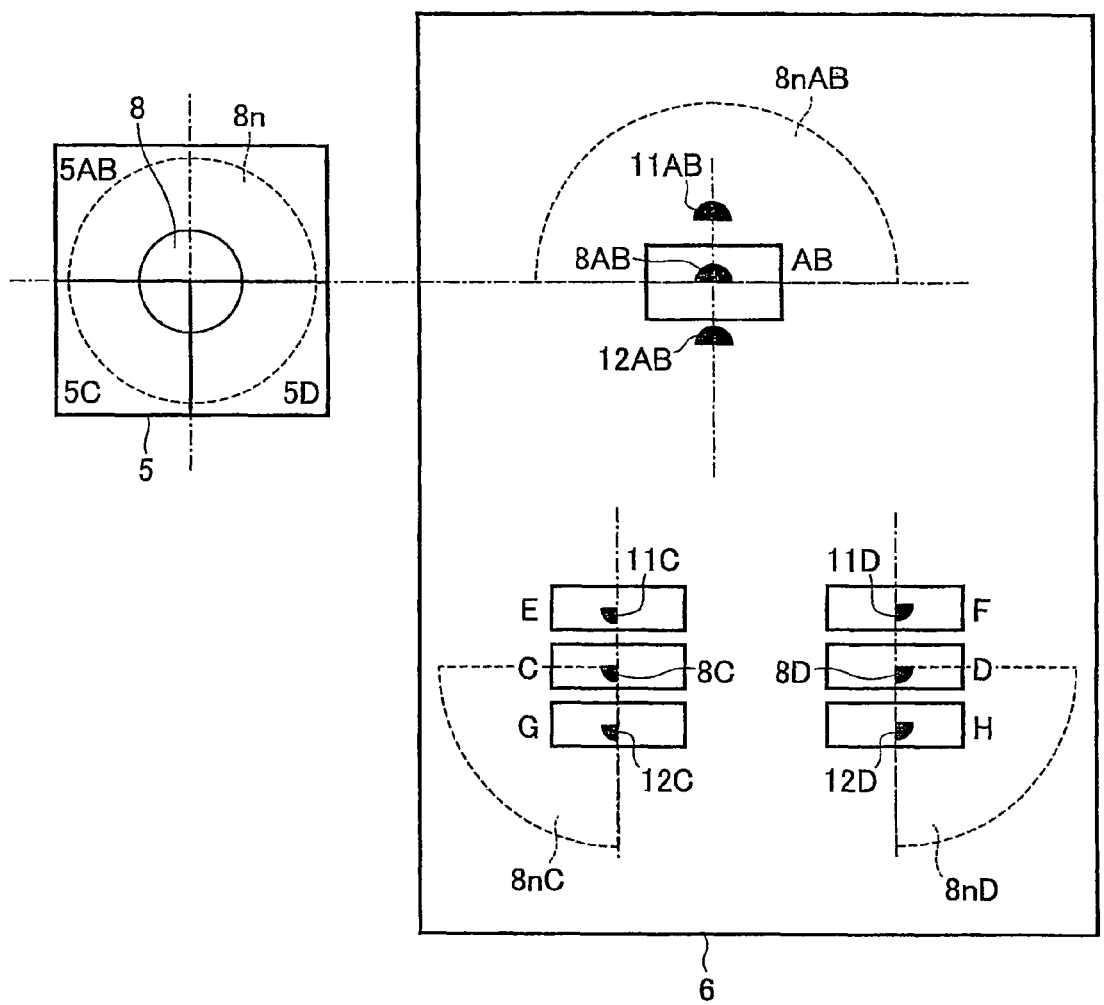
FIG. 3 is a frontal view of (i) a light-receiving section having no auxiliary light-receiving region and (ii) a hologram, and illustrates spots formed when the light-receiving section and the hologram are irradiated with a light beam having reflected off a targeted layer, and stray light from a non-targeted layer which is located closer to the objective lens than the targeted layer.

Now, the stray light (main beam and sub beams reflected off a non-targeted layer) generated on the optical disc 4 in which plural writing-target layers are laminated will be discussed. FIGS. 1 and 3 are frontal views showing the spots of the light beams reflected off the targeted layer and the spots of the stray light reflected off the layer which is closer to the objective lens 3 than the targeted layer, on the hologram 5 and the light-receiving section 6. FIG. 3 shows a case where the auxiliary light-receiving regions are not provided in the light-receiving section 6. In the figures, the spots of the light beams (stray light) reflected off the non-targeted layer are indicated by dotted lines. Although the optical disc in the following description is constituted by two layers, the number of the writing-target layers is not particularly limited in the present invention.

The area of a light beam (hereinafter, near-side stray light) 8*n* from the writing-target layer (non-target layer) closer to the objective lens 3 than the targeted layer is different from the area of the light beam 8 from the targeted layer, on the hologram 5 and the light-receiving section 6, because of the difference between the lengths of the optical paths. More specifically, as shown in FIG. 1, the near-side stray light 8*n* irradiating the hologram 8 and the light-receiving section 6 are larger in area than the light beam 8, because of the difference between the optical path lengths and the influence of the objective lens 33. That is, the spots of the near-side stray light 8*n* on the hologram 5 and the light-receiving section 6 are larger than the spots of the light beam 8.

In FIGS. 1 and 3, although the light beam 8 and the near-side stray light 8*n* are constituted by the main beams and the sub beams on account of the diffraction section 2, only the zero-th transmitted light is illustrated as to the near-side stray light 8*n*, for the sake of convenience. Since zero-th transmitted light is much more intense than positive and negative first-order diffracted lights in the embodiments, the following description only deals with the zero-th transmitted light which strongly influences on the offset.

As shown in FIG. 1, the near-side stray light 8*n* split in the region 5AB irradiates the focusing-use light-receiving region AB, as focusing near-side stray light 8*n*AB. In this case, the spot of the focusing near-side stray light 8*n*AB is larger than the spot of the light beam 8 split in the region 5AB, on the focusing-use light-receiving region AB. The near-side stray light 8*n* split in the region 5C (5D) irradiates, as tracking near-side stray light 8*n*C (8*n*D), the tracking-use main light-receiving region C (D). In this case, The spot of the tracking near-side stray light 8*n*C (8*n*D) is larger than the spot of the light beam 8 split in the region 5C (5D), on the tracking-use main light-receiving region C (D). On account of the large irradiating area, the tracking near-side stray light 8*n*C (8*n*D) also irradiates the tracking-use sub light-receiving region G (H) and the auxiliary light-receiving region X (Y).

Therefore, since the tracking near-side stray light 8*n*C (8*n*D) irradiates the tracking-use sub light-receiving region G (H), the offset is generated. The offset is similarly generated in the tracking-use main light-receiving region C (D). On this account, the aforesaid TES is worked out by the following equation (2).

$$\text{TES} = \{(``C"+\Delta c)-(``D"+\Delta d)\} - K \times \{(``E"+``G"+\Delta g) - (``F"+``H"+\Delta h)\} \quad (2)$$

Indicated by $\Delta c$ ($\Delta d$) is the offset generated because the tracking near-side stray light 8*n*C (8*n*D) irradiates the tracking-use main light-receiving region C (D). Indicated by $\Delta g$ ($\Delta h$) is the offset generated because the tracking near-side stray light 8*n*C (8*n*D) irradiates the tracking-use sub light-receiving region G (H).

If the amounts of the offsets caused by the stray light (tracking near-side stray light 8*n*C (8*n*D) are completely identical to each other, it is possible to cancel out the offsets without using the auxiliary light-receiving regions. In reality, however, the tracking near-side stray light 8*n*C (8*n*D) moves in the horizontal direction (radial direction) in the figure, on account of, for example, the manufacturing error of the optical pickup device 7. For this reason, $\Delta c \neq \Delta d$ and $\Delta g \neq \Delta h$.

Therefore, to obtain accurate TES, six auxiliary light-receiving regions corresponding to the respective light-receiving regions C, D, E, F, G, and H are required. However, the overall size of the light-receiving section 6 increases and the circuits connected to the light-receiving regions are complicated, when six auxiliary light-receiving regions are provided.

To solve this problem, in the present embodiment, the light-receiving areas of the auxiliary light-receiving regions V and X (W and Y) are smaller than the light-receiving areas of the tracking-use sub light-receiving regions E and G (F and H). Also, as shown in FIG. 1, in the light-receiving section 6, four auxiliary light-receiving regions are provided as below: the auxiliary light-receiving region V neighboring the tracking-use sub light-receiving region E; the auxiliary light-receiving region X neighboring the tracking-use sub light-receiving region G; the auxiliary light-receiving region W neighboring the tracking sub light-receiving region F; and the auxiliary light-receiving region Y neighboring the tracking-use sub light-receiving region H.

The above-described light-receiving area indicates the area of the light-receiving region, which area the light beam actually irradiates. The light-receiving area is therefore different from the overall area of the light-receiving region (i.e. the area where the light-receiving region can receive light). However, when the light-receiving regions are arranged as in the present embodiment, the overall areas of the auxiliary light-receiving regions V and X (W and Y) are, smaller than the overall areas of the tracking-use sub light-receiving regions E and G (F and H).

Provided that the output signals obtained from the respective auxiliary light-receiving regions X and Y are x and y in the above-described equation (2), the aforesaid TES is figured out by the following equation (3).

$$\text{TES} = \{(``C"+\Delta c)-(``D"+\Delta d)\} - K \times \{(``E"+``G"+\Delta g-x) - (``F"+``H"+\Delta h-y)\} \quad (3)$$

If x and y are determined so as to satisfy $\Delta c - K \times (\Delta g-x) = 0$ and $\Delta d - K \times (\Delta h-y) = 0$, it is possible to cancel out the offsets generated in the tracking-use main light-receiving region C (D) and in the tracking-use sub light-receiving regions E and G (F and H). In the present embodiment, (the shapes of) the light-receiving areas of the auxiliary light-receiving regions X and Y and the auxiliary light-receiving regions W and Y are determined so as to cause x and y to satisfy the condition above. In other words, the light-receiving areas of the auxiliary light-receiving regions X and Y of the present embodiment are arranged so that the offsets generated in the tracking-use main light-receiving region C (D) and the tracking-use sub light-receiving regions E and G (F and H) are cancelled out.

For example, provided that the light-receiving areas of the auxiliary light-receiving regions X and Y are identical with the light-receiving areas of the tracking-use sub light-receiving regions E and G and the light-receiving areas of the tracking-use sub light-receiving regions F and H, $\Delta g=x$ and $\Delta h=y$. On this account, the offsets in the parts of $K \times (\Delta g-x)$ and $K \times (\Delta h-y)$ are cancelled out. However, the offset of $\Delta c - \Delta d$ ($\Delta c \neq \Delta d$) remains. In the present embodiment, to cancel out the offset generated in the tracking-use main light-receiving region C (D), i.e. to achieve Δg−x>0 and Δh−y>0, the light-receiving areas of the auxiliary light-receiving regions X and Y are arranged so as to be smaller than the light-receiving areas of the tracking-use sub light-receiving regions G and H. Also, to restrain the generation of an error by strain light from the layer farther away from the objective lens than the targeted layer, the light-receiving areas of the auxiliary light-receiving regions V and W are arranged so as to be smaller than the light-receiving areas of the tracking-use sub light-receiving regions E and F.

It is noted that described above is a case where the stray light (near-side stray light) from the layer closer to the objective lens 3 than the targeted layer irradiates the light-receiving section 6. On the other hand, in case where stray light (far-side stray light) from the layer farther away form the objective lens 3 than the targeted layer irradiates the light-receiving section 6, the shape of the far-side stray light irradiating the light-receiving section 6 is opposite to the shape of the near-side stray light (i.e. the shape of the far-side stray light is the inversion of the shape of the near-side stray light, in the tracking directions). On this account, the far-side stray light irradiates the auxiliary light-receiving region V (W). Also in this case, the light-receiving area of the auxiliary light-receiving region V (X) is smaller than the light-receiving area of the tracking-use sub light-receiving region E (F). On this account, as is the case with the near-side stray light, the offsets generated in the tracking-use main light-receiving region and the tracking-use sub light-receiving region are cancelled out using the output signals obtained from the auxiliary light-receiving regions V and W.

Figure 4:
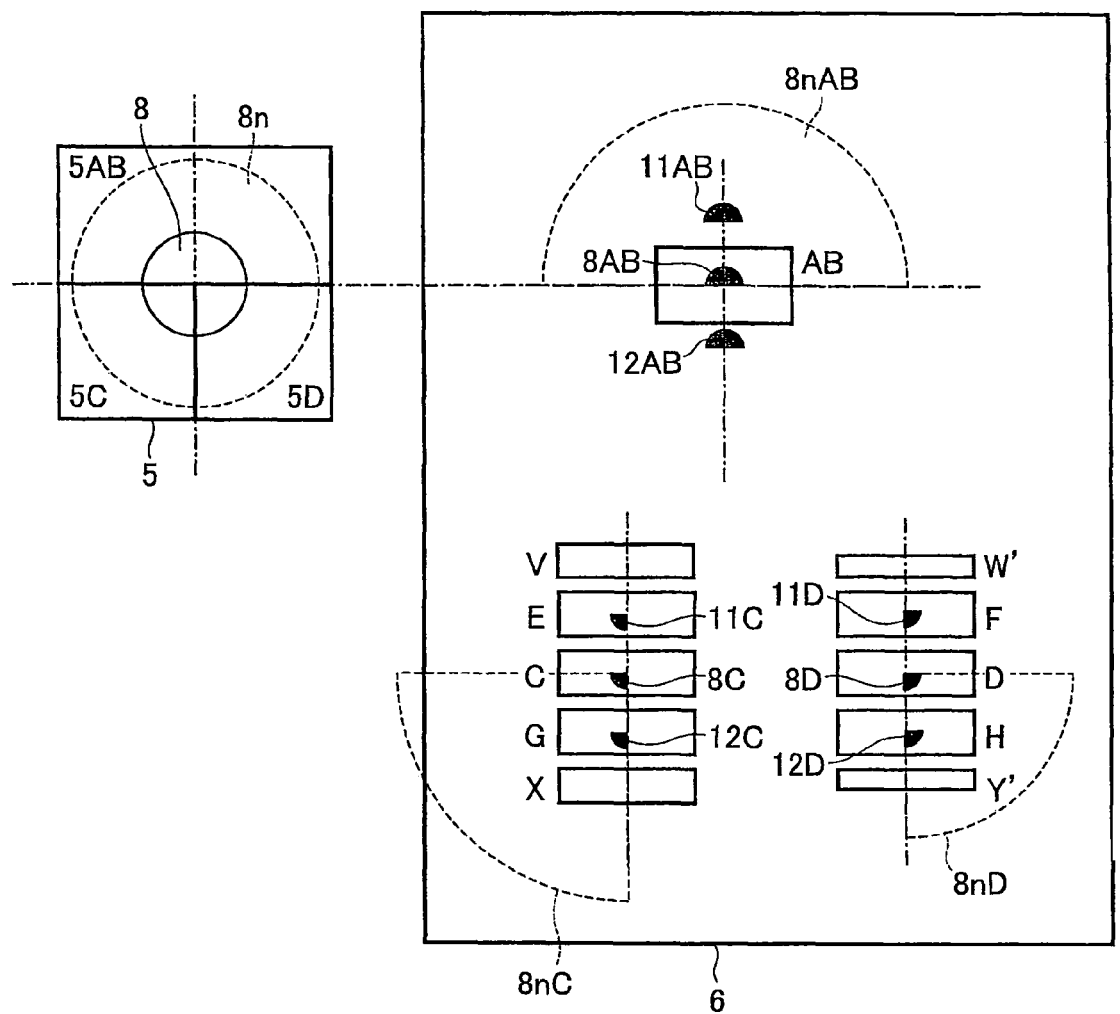
FIG. 4 is a frontal view illustrating a hologram and a light-receiving section whose auxiliary light-receiving regions each has a different light-receiving area.

In the optical pickup device 7 of the present embodiment, as shown in FIG. 4, the light-receiving area of the auxiliary light-receiving region X (V) which only receives the tracking near-side stray light $8nC$ split in the region 5C of the hologram 5 is different from the light-receiving area of the auxiliary light-receiving region Y' (W') which only receives the tracking near-side stray light $8nD$ split in the region 5D of the hologram 5. More specifically, the respective light-receiving areas of the auxiliary light-receiving region X (V) and the auxiliary light-receiving region Y' (W') are in proportion to the densities (light intensities per unit areas) of the light beams irradiating the respective regions. The following will discuss this point.

In the hologram 5, in case where the light beams reflected off the targeted layer and the stray lights are split and irradiate the light-receiving sections 6, the light beams split in the regions 5C and 5D of the hologram 5 may have different split angles and different optical path lengths from the hologram 5 to the light-receiving sections 6, depending on the splitting pattern of the hologram 5 and the arrangements of the splitting pattern and the light-receiving regions 6. For example, in case where the light beams split in the regions 5C and 5D of the hologram 5 irradiate, at different angles, the respective light-receiving regions 6, the diameter of the light beams on the respective light-receiving regions 6 are different from one another.

More specifically, the diameter of a light beam increases as the split angle increases. In the case above, the density (light intensity per a unit area) of the stray light irradiating the tracking-use main light-receiving region C is different from the density of the stray light irradiating the tracking-use main light-receiving region D. Also, the densities of the light beams irradiating the tracking-use sub light-receiving regions E and G are different from the densities of the light beams irradiating the tracking-use sub light-receiving regions F and H. Furthermore, the densities of the light beams irradiating the auxiliary light-receiving regions V and X are different from the densities of the light beams irradiating the auxiliary light-receiving regions W and Y.

Therefore, in the light-receiving section 6 shown in FIG. 4, the light-receiving areas of the auxiliary light-receiving regions V and X and the light-receiving areas of the auxiliary light-receiving regions W' and Y' are determined so as to cause the intensities of the stray lights irradiating the auxiliary light-receiving regions V and X to be identical with the intensities of the stray lights irradiating the auxiliary light-receiving regions W' and Y'. More specifically, the light-receiving areas of the auxiliary light-receiving regions V and X are arranged so as to be different from the light-receiving areas of the auxiliary light-receiving regions W' and Y', with the result that the densities of the lights irradiating the corresponding regions are equal even if the light beams irradiate at different split angles.

Figure 9:
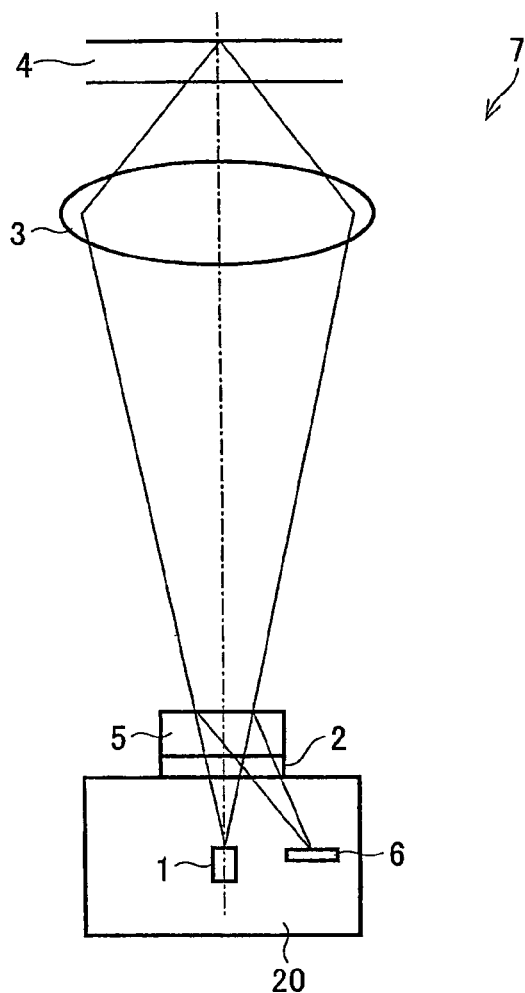
FIG. 9 is a frontal view illustrating a schematic configuration of optical pickup device formed as an integrated unit in which a hologram, a light-receiving section, a laser light source, and a diffraction section are integrated.

The optical pickup device of the present embodiment can be downsized, as shown in FIG. 9, by adopting an integrated unit (optical pickup unit) 20 in which the laser light source 1, the diffraction section 2, the hologram 5, and the light-receiving section 6 are integrated. Such an optical pickup device 7 includes the integrated unit 20 and the objective lens 3 (and the driving power source for driving the objective lens 3). Instead of the hologram 5, a prism may be used as the splitting section.

The following will describe an information writing/reading device including the optical pickup device 7 of the present embodiment.

Figure 10:
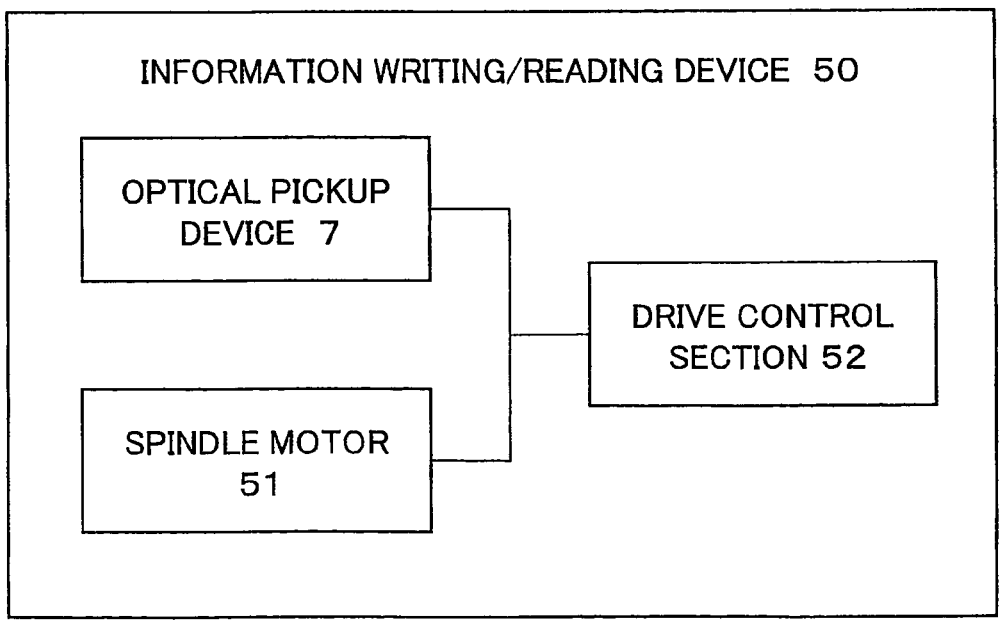
FIG. 10 is a block diagram illustrating a schematic configuration of an information writing/reading device.

As shown in FIG. 10, the information writing/reading device 50 of the present embodiment includes a spindle motor 51 which rotates the optical disc 4, the optical pickup device 7 which writes/reads information into/from the optical disc 4, and a drive control section 52 which drives and controls the spindle motor 51 and the optical pickup device 7.

The drive control section 52 includes a spindle motor drive circuit which drives and controls the spindle motor 51, a focus drive circuit which drives and controls a focus actuator which moves the objective lens in the focusing directions, and a tracking drive circuit which controls and drives a tracking actuator which moves the objective lens in the radial directions. The drive control section 52 further includes a control signal generation circuit which generates, from signals supplied from the optical pickup device 7, control signals for the above-described control circuits, and an information reproduction circuit which (i) reproduces information recorded on the optical disc 4, from the signals obtained from the optical pickup device 7, and (ii) generates a reproduction signal.

Embodiment 2

The following will describe Embodiment 2 of the present invention. In the embodiment, members identical with those described in Embodiment 1 are given the same numbers, so that the descriptions are omitted for the sake of convenience.

An optical pickup device 7 (see FIG. 2) of the present embodiment is arranged such that an arithmetic circuit for calculating a tracking servo signal based on the light intensity in each light-receiving region is connected to the light-receiving section 6, and the arithmetic circuit is provided with a gain adjuster which adds gain to an output signal generated based on the light intensity in each light-receiving region.

Figure 5:
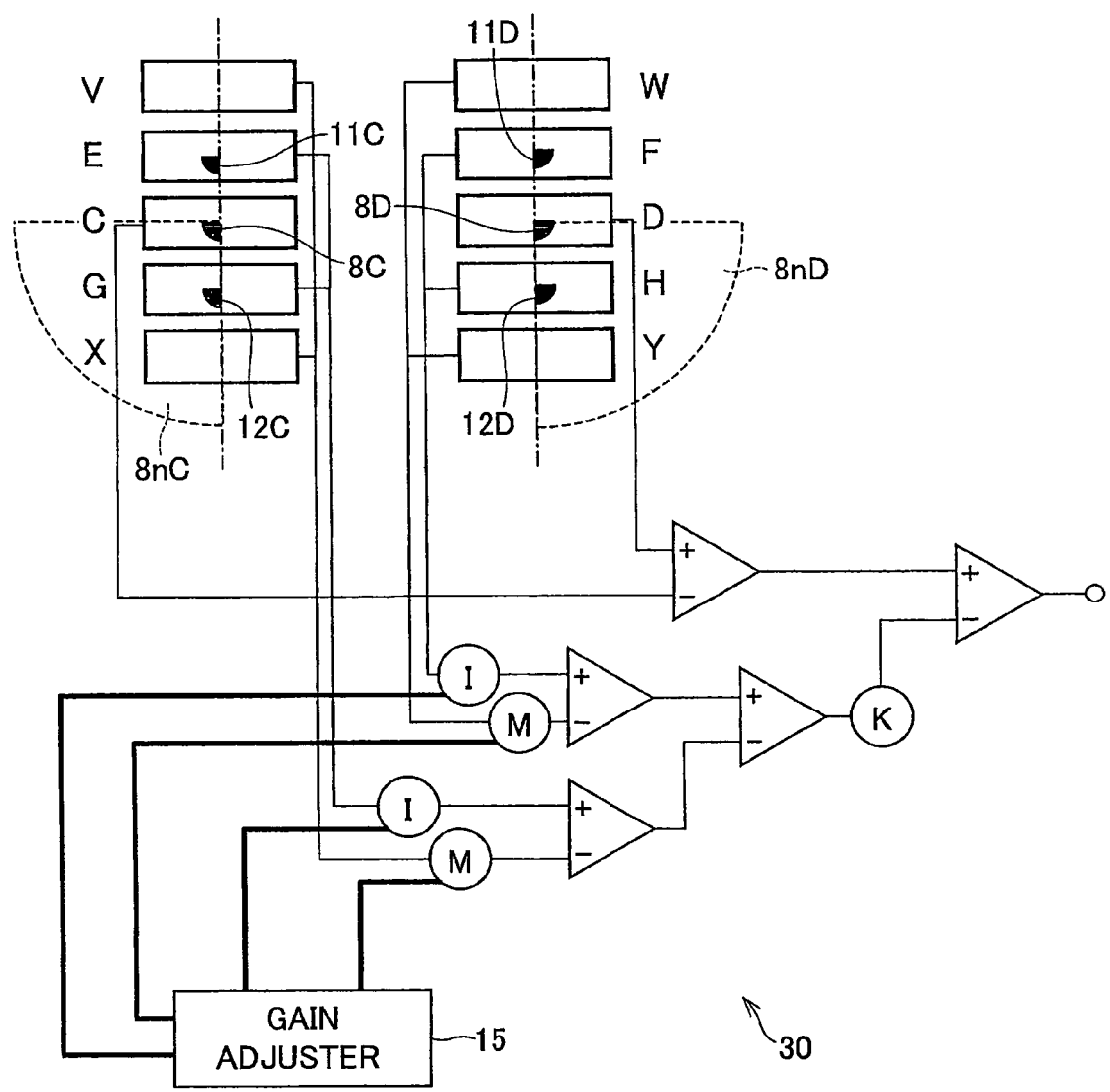
FIG. 5 shows a hologram and a light-receiving section provided in the optical pickup device of Embodiment 2, and is a frontal view illustrating a configuration including a gain adjuster for adding gain to an output signal from an auxiliary-light-receiving region.

FIG. 5 shows a part of the light-receiving section 6 of the present embodiment and the arithmetic circuit 30 which is connected to the light-receiving regions of the light-receiving section 6. Since the light-receiving section 6 is identical with that of Embodiment 1 except the shape of an auxiliary light-receiving region, the description thereof is simplified.

As shown in FIG. 5, the optical pickup device 7 of the present embodiment is arranged such that the arithmetic circuit 30, which figures out a tracking servo signal based on the light intensities in the respective light-receiving regions of the light-receiving section 6, is connected to the light-receiving section 6. The arithmetic circuit 30 is provided with a gain regulator 15 which adds gains to output signals generated based on the light intensities in the respective light-receiving regions (i.e. tracking-use main light-receiving regions C and G, tracking-use sub light-receiving regions E, G, F, and H, and auxiliary light-receiving regions V, X, W, and Y). In the gain regulator 15, gains smaller than those added to the output signals from the tracking-use sub light-receiving regions E, G, F, and H are added to the output signals from the auxiliary light-receiving regions V, X, W, and Y.

The following gives details of how the gains are added in the present embodiment.

As shown in FIG. 5, the optical pickup device 7 of the present embodiment is provided with the gain adjuster 15 which adds gains to the output signals from the tracking-use sub light-receiving regions E and G (F and H) and the auxiliary light-receiving regions V and X (W and Y). The aforesaid gain adjuster can independently add gains to the output signals supplied from the tracking-use sub light-receiving regions E and G (F and H), the output signal supplied from the auxiliary light-receiving region X (or V), and the output signal supplied from the auxiliary light-receiving region Y (or W).

First, a case where the same gains are added to the output signals from the auxiliary light-receiving regions X and Y will be discussed below.

Provided that the output signals obtained in the respective auxiliary light-receiving regions X and Y are x and y, the above-described TES is figured out by the following equation (3), as described in Embodiment 1.

$$TES=\{(\text{``}C\text{''}+\Delta c)-(\text{``}D\text{''}+\Delta d)\}-K\times[\{(\text{``}E\text{''}+\text{``}G\text{''}+\Delta g)\times I-x\times M\}-\{(\text{``}F\text{''}+\text{``}H\text{''}+\Delta h)\times I-y\times M\}] \quad (3)$$

In the equation, indicated by I is gain added to the output signals supplied from the tracking-use sub light-receiving regions E and G (F and H), whereas indicated by M is gain added to the output signals supplied from the auxiliary light-receiving regions X and Y.

The gain M is determined so as to satisfy the equations:

$$\Delta c-K\times(\Delta g\times I-x\times M)=0 \text{ and } \Delta d-K\times(\Delta h\times I-y\times M)=0.$$

With this, it is possible to cancel out the offsets generated in the tracking-use main light-receiving region C (D) and the tracking-use sub light-receiving regions E and G (F and H).

Provided that the light-receiving areas of the auxiliary light-receiving regions X and Y are identical with the light-receiving areas of the tracking-use sub light-receiving regions E and G (F and H), $\Delta g=x$ and $\Delta h=y$. If the gains added to the respective output signals are identical to each other (i.e. I=M), it is possible to cancel out the offsets of $K\times(\Delta g\times I-x\times M)$ and $K\times(\Delta h\times I-y\times M)$. However, the offset of $\Delta c-\Delta d$ (i.e. $\Delta c\neq\Delta d$) remains.

In the present embodiment, to cancel out the offset generated in the tracking-use main light-receiving region C (D), gain which is smaller than the gain added to the output signal of the tracking-use sub light-receiving region G (H) is added to the output signal of the auxiliary light-receiving region X (Y). That is, I>M is required in order to achieve $\Delta g\times I-x\times M>0$ and $\Delta h\times I-y\times M>0$.

Figure 6:
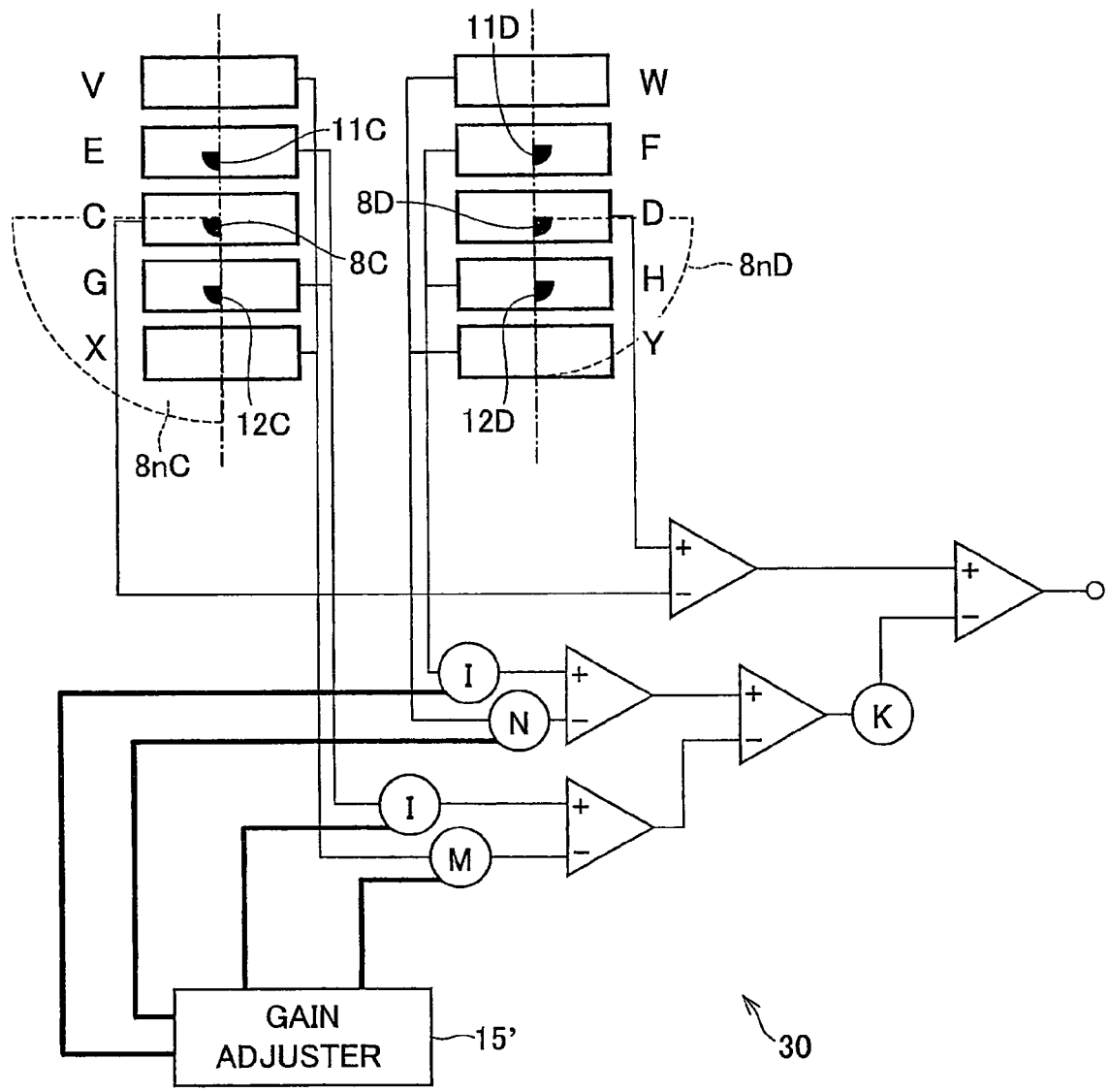
FIG. 6 shows the hologram and a light-receiving section provided in the optical pickup device of Embodiment 2, and is a frontal view illustrating a configuration including a gain adjuster for adding gain to an output signal from an auxiliary light-receiving region.

Now, referring to FIG. 6, the following will discuss a case where the gain added to the output signal supplied from the auxiliary light-receiving region X is different from the gain added to the output signal from the auxiliary light-receiving region Y.

In the light-receiving section 6 of the optical pickup device, an arithmetic circuit 30 used for calculating a tracking servo signal based on the light intensity in each light-receiving region of the light-receiving section 6 is connected to the light-receiving section 6. This arithmetic circuit 30 is provided with a gain adjuster 15' which adds gains to the output signals generated based on the light intensities in the respective light-receiving regions (i.e. tracking-use main light-receiving regions C and D, tracking-use sub light-receiving regions E, G, F, and H, and auxiliary light-receiving regions V, X, W, and Y). The gain regulator 15' adds gains, which are smaller than the gains added to the output signals from the tracking-use sub light-receiving regions E, G, F, and H, to the output signals from the auxiliary light-receiving regions V, X, W, and Y.

The tracking-use main light-receiving regions C and D shown in FIG. 6 receive respective tracking-use main beams split in the regions 5C and 5D of the hologram 5 (not illustrated). The tracking-use sub light-receiving regions E and G receive respective tracking-use sub beams split in the region 5C of the hologram 5, whereas the tracking-use sub light-receiving regions F and H receive respective tracking-use sub beams split in the region 5D of the hologram 5.

The light-receiving section 6 shown in FIG. 6 is provided with auxiliary light-receiving regions V and X corresponding to the tracking-use main beam and the tracking-use sub beam which are split in the region 5C, respectively. The light-receiving section 6 shown in FIG. 6 is also provided with auxiliary light-receiving regions W and Y corresponding to the tracking-use main beam and the tracking-use sub beam which are split in the region 5D, respectively. The gains, which are added to the respective output signals from the two types of light-receiving regions (auxiliary light-receiving regions V and X and the auxiliary light-receiving regions W and Y) respectively corresponding to the tracking-use main beam and the tracking-use sub beam generated as a result of splitting, are different from one another.

The following gives details of how the gains are added in the light-receiving section 6 shown in FIG. 6.

As shown in FIG. 6, the addition of the gains which are different from one another is preferably conducted in a case where the density of stray light $8nC$ irradiating the tracking-use light-receiving regions C, E, and G is different from the density of stray light $8nD$ irradiating the tracking-use light-receiving regions D, F, and H. Provided that the gain added to the output signal from the auxiliary light-receiving region X is M whereas the gain added to the output signal from the auxiliary light-receiving region Y is N, M and N are determined so as to be different from each other, in this case. More specifically, M>N, I>M, and I>N.

In the case above, the gains M, N, and I are determined to satisfy the following equations.

$$\Delta c-K\times(\Delta g\times I-x\times M)=0 \text{ and } \Delta d-K\times(\Delta h\times I-y\times N)=0$$

With this, it is possible to cancel out the offsets generated in the tracking-use main light-receiving region C (D) and the tracking-use sub light-receiving region G (H).

As shown in FIGS. 5 and 6, a concrete calculation method in the present embodiment for figuring out TES is as follows: the difference between an output signal (i) obtained by adding gain M to the output signal from the auxiliary light-receiving region X and an added signal (ii) calculated by adding the output signals from the tracking-use sub light-receiving regions G and E to each other is figured out, so that a resultant output (iii) is obtained; the difference between an output signal (iv) obtained by adding gain M (or N) to the output signal from the auxiliary light-receiving region Y and an added signal (v) obtained by adding the output signals from the tracking-use sub light-receiving regions H and F to each other is figured out, so that a resultant output (vi) is obtained; the difference between the outputs (iii) and (vi) is figured out, so that a resultant output (vii) is obtained; gain K is added to the output (vii); the difference between the tracking-use main light-receiving regions C and D is figured out, so that a resultant output (viii) is obtained; and the difference between the output (viii) and the result of adding the gain K to the output (vii) is figured out. The method of calculating the TES (calculation method) is not limited to the above.

Because of the above, it is possible to cancel out the offsets generated in the tracking-use main light-receiving region C (D) and the tracking-use sub light-receiving region G (H).

To set the gains as above, for example, the gains are determined so as to minimize the jitter and error rate of a reproduced signal, for each optical disc 4 read by the optical pickup device 7. To achieve the optimization more easily, using a reference multilayer optical disc 4, the best gains are determined in reference to the measurements of the offset of the tracking signal and the jitter and error rate of the reproduced signal, at the time of manufacturing the pickup device.

In the above-described case, stray light (near-side stray light) from the non-targeted layer closer to the objective lens 3 than the targeted layer irradiates the light-receiving section 6. On the other hand, in case where stray light (far-side stray light) from the non-targeted layer farther away from the objective lens 3 than the targeted layer irradiates the light-receiving section 6, the shape of the far-side stray light irradiating the light-receiving section 6 is the inversion of the shape of the near-side stray light (i.e. the shape of the far-side stray light is the inversion of the shape of the near-side stray light, in the tracking directions). On this account, the far-side stray light irradiates the auxiliary light-receiving region V (W). Also in this case, the gain regulator adds gain, which is smaller than the gain added to the signal from the tracking-use sub light-receiving region E (F), to the signal from the auxiliary light-receiving region V (W). Therefore, as with the near-side stray light, the offsets generated in the tracking-use main light-receiving region and the tracking-use sub light-receiving region are cancelled out using the output signals obtained in the auxiliary light-receiving region V and the auxiliary light-receiving region W.

As shown in FIG. 9, the optical pickup device of the present embodiment includes the integrated unit (optical pickup unit) 20 in which the laser light source 1, the diffraction section 2, the hologram 5, and the light-receiving section 6 are integrated. On this account, the optical pickup device is small in size. The optical pickup device 7 includes the above-described integrated unit 20 and the objective lens 3 (and the driving power source for driving the objective lens 3). Instead of the hologram 5, a prism may be used as the splitting section.

An information writing/reading device including the optical pickup device 7 of the present embodiment is described below.

As shown in FIG. 10, an information writing/reading device 50 of the present embodiment includes a spindle motor 51 which drives and rotates the optical disc 4, an optical pickup device 7 which writes/reads information to/from the optical disc 4, and a drive control section 52 which drives and controls the spindle motor 51 and the optical pickup device 7.

Embodiment 3

The following will describe Embodiment 3 of the present invention. In the embodiment, members identical with those described in Embodiment 1 are given the same numbers, so that the descriptions are omitted for the sake of convenience.

Figure 7:
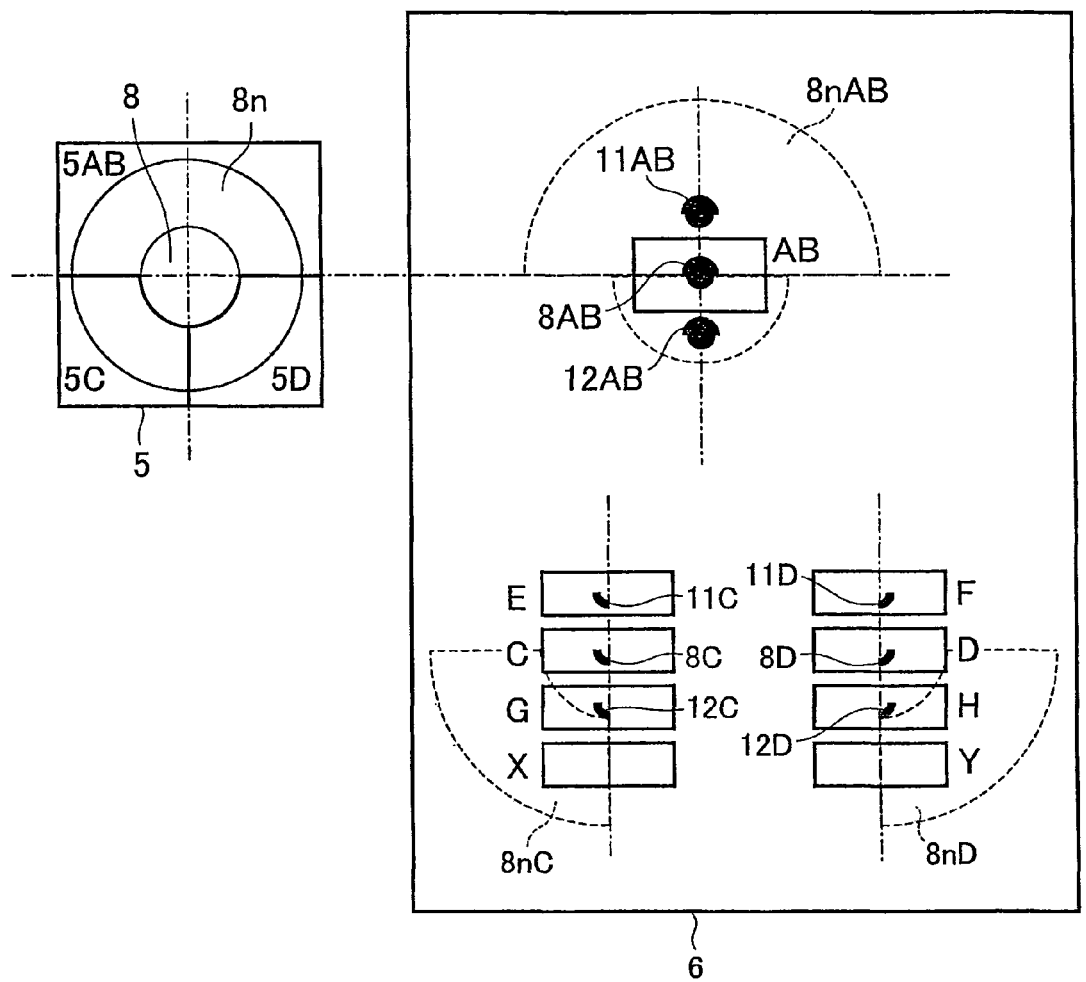
FIG. 7 is a frontal view of a hologram and a light-receiving section provided in the optical pickup device of Embodiment 3. For the light-receiving section in particular.
Figure 8:
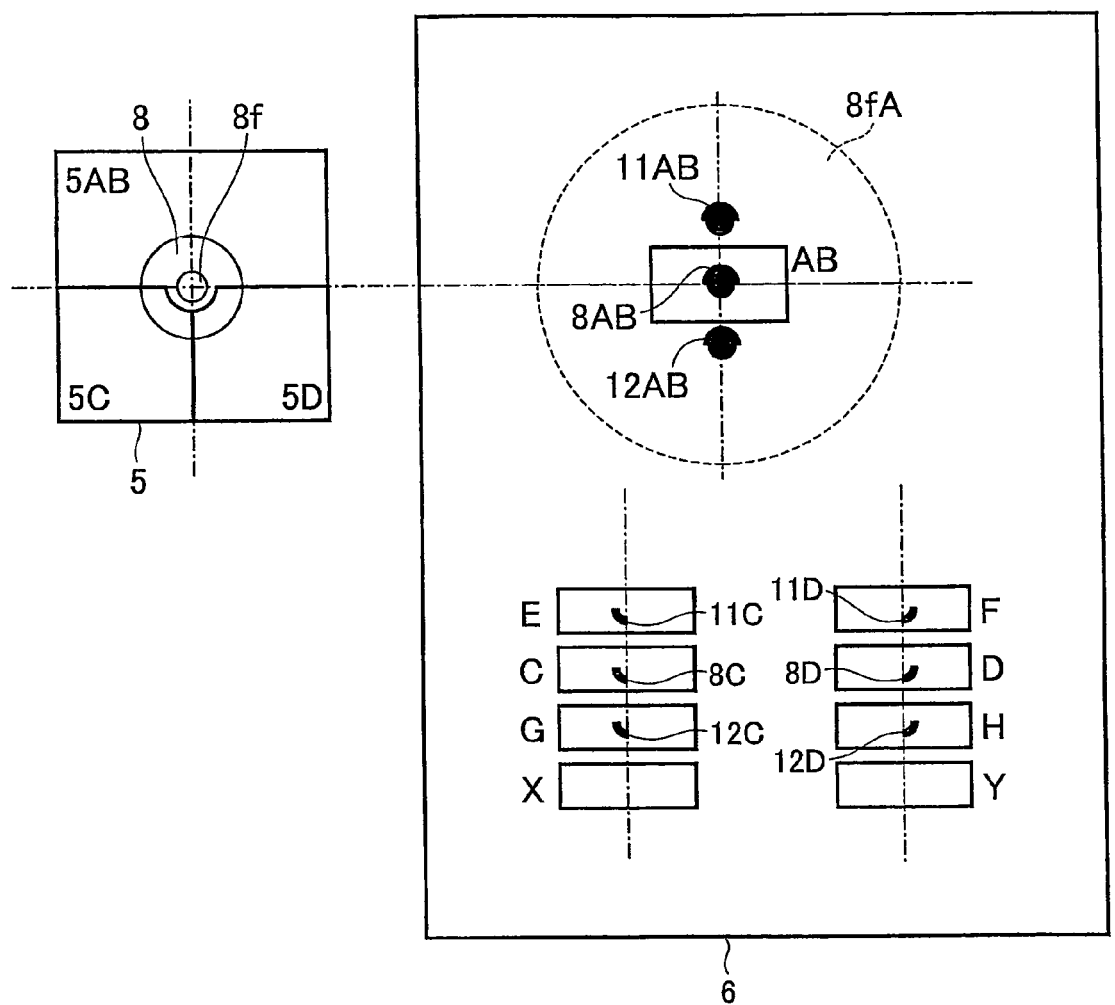
FIG. 8 is a frontal view of a hologram and a light-receiving section provided in an optical pickup device. For the light-receiving section in particular.

An optical pickup device 7 (see FIG. 2) of the present embodiment is arranged in such a manner that the regions 5C and 5D of the hologram 5, by which regions light beams are split in order to obtain a tracking servo signal, do not include a region around the optical axis of the main beam. FIGS. 7 and 8 show the hologram 5 and the light-receiving section 6 of the optical pickup device of the present embodiment. As shown in these figures, the shapes of the regions 5AB, 5C, and 5D of the hologram 5 are different from those of the hologram 5 of Embodiment 1. Other than this, the present embodiment is identical with Embodiment 1.

FIG. 7 is a frontal view showing the spots of the light beams reflected off the targeted layer and the spots of the stray light from the non-targeted layer which is closer to the objective lens 3 than the targeted layer, on the hologram 5 and the light-receiving section 6. In the figure, the light beams reflected off the non-targeted layer are indicated by dotted lines.

As described above, the hologram 5 is arranged such that the regions 5C and 5D splitting the light beams in order to figure out a tracking servo signal do not include the region around the optical axis of the main beam. That is to say, the regions 5C and 5D of the hologram 5, where the light beams reflected off the optical disc 4 are split, do not include a region where the main beam and sub beams, which are reflected off the non-targeted layer farther away from the objective lens 3 than the targeted layer, converge. More specifically, a tracking servo signal is obtained in a region excluding a part which is larger than the maximum beam diameter of the stray light from the non-targeted layer farther away from the objective lens 3 than the targeted layer. The aforesaid part is arranged such that stray light from the non-targeted layer farther away from the objective lens 3 than the targeted layer does not go beyond the part even if the objective lens 3 moves for tracking.

More specifically, in case where, on the hologram 5, the diameter of the light beam reflected off the optical disc 4 is 600 μm, a tracking servo signal is obtained using regions excluding the circle about 130 μm in radius (260 μm in diameter) around the optical axis. It is noted that the numerical values change in accordance with the arrangements (e.g. the focal length and numerical aperture of the objective lens 3 and the splitting pattern of the hologram 5) of the optical system.

Therefore, the shape of each of the tracking-use light beams having passed through the regions 5C and 5D is a quarter of a doughnut, on the tracking-use main light-receiving region C (D) and the tracking-use sub light-receiving regions E and G (F and H). Therefore, as shown in FIG. 7, each of the tracking-use light beams reflected off the targeted layer passes through the region 5C (5D) of the hologram 5 and irradiates the tracking-use main light-receiving region X (Y) and the tracking-use sub light-receiving regions E and G (F and H) on the light-receiving section 6, with the shape of a quarter of a doughnut. Tracking near-side stray light 8nC (8nD) also irradiates the section 6 in a similar manner.

In the meanwhile, the region 5AB of the hologram 5 includes the aforesaid region around the optical axis. The focusing-use light beam reflected off the targeted layer passes through the region 5AB and forms, on the focusing-use light-receiving region AB, a spot which is shaped such that a small semicircle is joined with a large semicircle. At the same time, stray light also irradiates the focusing-use light-receiving region AB, with the same shape as the focusing-use light beam reflected off the targeted layer.

FIG. 8 is a frontal view showing the spots of the light beams reflected off the targeted layer and the spots of the stray light from the non-targeted layer farther away from the objective lens 3 than the targeted layer, on the hologram 5 and the light-receiving section 6. As shown in FIG. 8, the stray light (both the main beam and sub beams) irradiates only the region 5AB of the hologram 5. In other words, the stray light does not irradiate the regions 5C and 5D which split the light beams in order to figure out a tracking servo signal. Even if the objective lens 3 is moved for tracking control, the stray light does not irradiate the regions 5C and 5D.

Therefore, for example, the tracking far-side stray light 8f irradiates only the focusing-use light-receiving region AB, so as not to irradiate the tracking-use main light-receiving region C (D), the tracking-use sub light-receiving regions E and G (F and H) and the auxiliary light-receiving region X (Y).

That is to say, the regions 5C and 5D of the hologram 5, which are used for figuring out a tracking servo signal, are shaped so that the tracking far-side stray light 8f does not irradiate the tracking-use light-receiving regions C, E, and G (D, F, and H). On this account, it is unnecessary to provide auxiliary light-receiving regions V and W for detecting the offsets due to the tracking far-side stray light 8f/D and the tracking far-side stray light 8f/C. The number of the auxiliary light-receiving regions is therefore reduced, and hence the device is downsized.

As shown in FIG. 9, the optical pickup device of the present embodiment includes the integrated unit (optical pickup unit) 20 in which the laser light source 1, the diffraction section 2, the hologram 5, and the light-receiving section 6 are integrated. On this account, the optical pickup device is small in size. The optical pickup device 7 includes the above-described integrated unit 20 and the objective lens 3 (and the driving power source for driving the objective lens 3). Instead of the hologram 5, a prism may be used as the splitting section.

An information writing/reading device including the optical pickup device 7 of the present embodiment is described below.

As shown in FIG. 10, an information writing/reading device 50 of the present embodiment includes a spindle motor 51 which drives and rotates the optical disc 4, an optical pickup device 7 which writes/reads information to/from the optical disc 4, and a drive control section 52 which drives and controls the spindle motor 51 and the optical pickup device 7.

Embodiment 4

The following will describe an embodiment of the present invention. An optical pickup device of the present embodiment, which is used for recording/reading information to/from an optical disc (storage medium) having plural information writing layers (hereinafter, writing-target layers), includes (i) a light-receiving section having a main beam light-receiving region which receives a main beam reflected off the optical disc, passing through a converging section, and split, by a splitting section, into at least a focusing-use light beam and a tracking-use light beam and (ii) sub beam light-receiving regions receiving sub beams whose luminous intensities (light densities) are lower than the light intensity of the main beam, and the sub beam light-receiving regions are arranged in such a manner as to prevent the main beam of a focusing-use light beam, which is reflected off a writing-target layer different from the above-described writing-target layer where information recording/reading is carried out, from irradiating the sub light-receiving regions.

In the following, plural writing-target layers of a storage medium are termed as follows: a writing-target layer to/from which information is not written/read by the optical pickup device is a non-targeted layer, whereas a writing-target layer to/from which information is written/read by the optical pickup device is a targeted layer. In other words, writing-target layers other than the target layer are non-targeted layers.

FIG. 2 is a side view which outlines an optical pickup device 7 of the present embodiment. The optical pickup device 7 includes a laser light source (laser source) 1, a diffraction section (generating section) 2, an objective lens (converging section) 3, a beam splitter 10, a hologram (splitting section) 5, and a light-receiving section 6.

The laser light source 1 applies laser light onto an optical disc 4. The laser source 1 emits, for example, a laser beam with the wavelength of 650 nm. Since the wavelength of the laser beam emitted from the laser light source 1 is not particularly limited, the wavelength may be 405 nm, for example.

The diffraction section 2 is provided between the laser light source 1 and the optical disc 4. From one light beam emitted from the laser light source 1, the diffraction section 2 generates one main beam (zero-th transmitted light) and two sub beams (positive first-order diffracted light and negative first-order diffracted light). In other words, the light beam emitted from the laser light source 1 is divided into three light beams by the diffraction section 2. In the present embodiment, the diffraction section 2 is provided between the laser light source 1 and the objective lens 3 (more specifically, between the laser light source 1 and the beam splitter 10). Also, the diffraction section 2 generates two types of light beams in such a manner as to cause the luminous intensity of the main beam to be higher than those of the sub beams. More specifically, the diffraction section 2 generates the main beam and the sub beams in such a manner as to cause the total luminous intensity of two sub beams (positive first-order diffracted light and negative first-order diffracted light) to be lower than the luminous intensity of the main beam. In the present embodiment, the diffraction section 2 diffracts the light beam such that the luminous intensities of the respective beams satisfy the following equation: positive first-order diffracted light:zero-th transmitted light:negative first-order diffracted light)=1:10:1. In case where the diffraction section 2 is constituted by a diffraction grating, the ratio between the zero-th transmitted light and the positive and negative first-order diffracted lights can be controlled by changing the depth of the groove of the diffraction grating.

The objective lens 3 converges, on the optical disc 4, three light beams diffracted by the diffraction section 2. The light beams reflected off the optical disc 4 pass through the objective lens 3 and then irradiate the hologram 5.

The beam splitter 10 guides the three light beams (one main light beam and two sub light beams), which have been reflected off the optical disc 4, to the hologram 5. In the present embodiment, the traveling directions of the three light beams having been reflected off the optical disc 4 and passed through the objective lens 3 are changed by the beam splitter 10, and the beams are guided to the hologram 5.

The hologram 5 splits the light beams having been reflected off the optical disc 4 and passed through the objective lens 3. The hologram 5 is separated into plural areas. The light beams having passed through the objective lens 3 are split by these areas and caused to irradiate the light-receiving section 6. More specifically, each of the light beams is split, by the hologram 5, into at least (i) a focusing-use light beam for figuring out a focus servo signal and (ii) a tracking-use light beam for figuring out a tracking servo signal. The splitting pattern of the hologram 5 and the details of the light-receiving section 6 will be given later.

The light-receiving section 6 has plural light-receiving elements. The light-receiving section 6 receives (detects) the light beams (the focusing-use light beams and tracking-use light beams) split by the splitting section, and converts the light beams into electric signals. The light-receiving section 6 detects the luminous intensities of the supplied light beams. The light-receiving section 6 includes a focusing-use light-receiving region 6A which receives the focusing-use light beams and tracking-use light-receiving regions (tracking light-receiving regions) 6B and 6C which receive the tracking-use light beams. The focusing-use light-receiving region 6A generates a focus servo signal, while the tracking-use light-receiving regions 6B and 6C generate a tracking servo signal.

The light beams emitted form the laser light source 1 are discussed. The light beam emitted from the laser light source 1 is diffracted by the diffraction section 2 into three light beams. The three light beams pass through the beam splitter 10, and converge on the optical disc 4 by the objective lens 3.

The light beams reflected off the optical disc 4 pass through the objective lens 3 again, and are reflected off the beam splitter 10. Each of the light beams is then split into three or more light beams by the hologram 5, and irradiate the light-receiving section 6.

Figure 12:
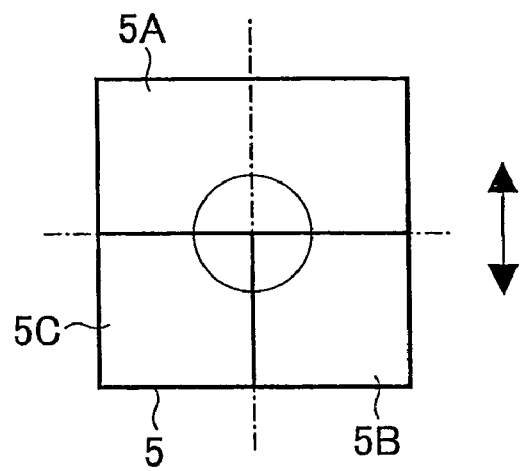
FIG. 12 is a frontal view illustrating split regions (i.e. splitting pattern) of a hologram.

Details of the hologram 5 and the light-receiving section 6 are given below. FIG. 12 is a frontal view showing the split regions (splitting pattern) of the hologram 5. In the figure, arrows indicate tracking directions.

As shown in FIG. 12, the hologram 5 is split into three regions (5A, 5B, and 5C). The region 5A is one of two regions divided by the straight line on which the optical axis of the light beam (indicated by dotted lines) irradiating the hologram 5. More specifically, the region 5A is a split region of the hologram 5, which is one of two regions divided by the straight line (hereinafter, orthogonal line) which includes the optical axis of the main beam irradiating the hologram 5 and is orthogonal to the tracking directions.

The regions 5B and 5C are split regions of the hologram 5 other than the region 5A. The regions 5B and 5C are bounded by (i) the straight line (hereinafter, parallel line) which includes the optical axis of the aforesaid light beam and is in parallel to the tracking directions and (ii) the orthogonal line. In other words, among four regions around the optical axis, which are divided by the orthogonal line and the horizontal line, the neighboring regions divided by the horizontal line are the regions 5B and 5C, whereas the region divided by the orthogonal line is the region 5A.

Among these regions, a light beam split by the region 5A is the focusing-use light beam for figuring out the focus servo signal, whereas two light beams split by the regions 5B and 5C, respectively, are the tracking-use light beams for figuring out the tracking servo signal. The focusing-use light beam irradiates the focusing-use light-receiving region 6A, whereas the tracking-use light beams irradiate the tracking-use light-receiving regions 6B and 6C.

The main beam split in the region 5A is a focusing-use main beam for figuring out the focus servo signal, whereas two main beams split in the respective regions 5B and 5C are tracking-use main beams for figuring out the tracking servo signal. The sub beams split in the region 5A are other sub beams (termed focusing-use sub beams for convenience). Two sub beams split in the region 5B and 5C are tracking-use sub beams for figuring out the tracking servo signal. In the following, the light beams irradiating the light-receiving section 6 are a focusing-use light beam and tracking-use light beams, in case where main beams and sub beams are not distinguished from one another.

Figure 13:
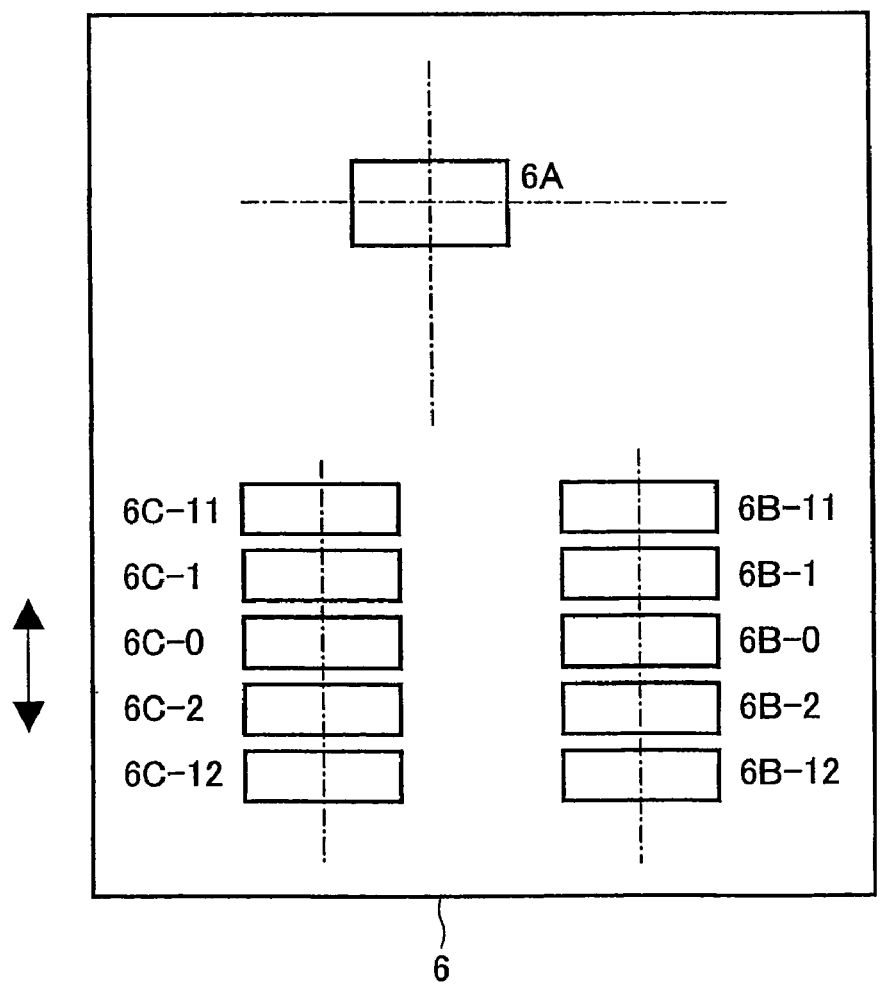
FIG. 13 is a frontal view illustrating in detail a configuration of a light-receiving section.

FIG. 13 is a frontal view showing the details of the light-receiving section 6. As shown in FIG. 13, the light-receiving section 6 includes a focusing-use light-receiving region 6A receiving the focusing-use light beam and tracking-use light-receiving regions 6B and 6C receiving the tracking-use light beams. More specifically, the focusing-use light-receiving region A receives the focusing-use light beam (focusing-use main beam) split in the region 5A of the hologram 5, the tracking-use light-receiving region 6B receives the tracking-use light beam split in the region 5B, and the tracking-use light-receiving region 6C receives the tracking-use light beam split in the region 5C.

Each of the tracking-use light-receiving regions 6B and 6C is provided with light-receiving elements receiving one main beam and two sub beams, respectively, which are diffracted by the diffraction section 2. More specifically, the tracking-use light-receiving region 6B has (i) a main light receiving region 6B-0 receiving the tracking-use main beam which is the aforesaid zero-th transmitted light and (ii) sub light-receiving regions 6B-1 and 6B-2 respectively receiving the tracking-use sub beams which are the aforesaid positive/negative first-order diffracted lights, whereas the tracking-use light-receiving region 6C has (i) a main light receiving region 6C-0 receiving the tracking-use main beam which is the aforesaid zero-th transmitted light and (ii) sub light-receiving regions 6C-1 and 6C-2 respectively receiving the tracking-use sub beams which are the aforesaid positive/negative first-order diffracted lights. The main light-receiving region 6B-0 (6C-0) and the sub light-receiving regions 6B-1 and 6B-2 (6C-1 and 6C-2) are arranged in such a manner that the sub light-receiving regions 6B-1 and 6B-2 (6C-1 and 6C-2) sandwich the main light-receiving region 6B-0 (6C-0), in the tracking directions. In the arrangement above, the main beam and the sub beams are light beams reflected off the targeted layer.

In the present embodiment, furthermore, the tracking-use light-receiving region 6B (6C) has auxiliary light-receiving regions 6B-11 and 6B-12 (6C-11 and 6C-12) which are on the respective sides of the region 6B (6C) opposite to the sub light-receiving regions 6B-1 and 6B-2 (6C-1 and 6C-2). The auxiliary light-receiving regions 6B-11 and 6B-12 (6C-11 and 6C-12) receive only light beams reflected off the non-targeted layer (hereinafter, such light beams will be referred to as stray light). For this reason, no light irradiates the auxiliary light-receiving regions 6B-11 and 6B-12 (6C-11 and 6C-12) in case where the optical disc 4 has only a single layer.

The five light-receiving regions (auxiliary light-receiving region 6B-11, sub light-receiving region 6B-1, main light-receiving region 6B-0, sub light-receiving region 6B-2, and auxiliary light-receiving region 6B-22) receiving the tracking-use light beams split in the region 5B and the five light-receiving regions (6C-11, 6C-1, 6C-0, 6C-2, and 6C-22) receiving the tracking-use light beams split in the region 5C are arranged in the above-described order, along the tracking directions. The tracking-use light receiving regions 6B and 6C are both on the side of the section 6 opposite to the focusing-use light-receiving region 6A. Since the tracking-use light-receiving regions 6B and 6C are adjacent to one another, it is possible to reduce the size of the light-receiving section 6. In the description above, the stray light indicates the main beam and sub beams reflected off the non-targeted layer.

Figure 14:
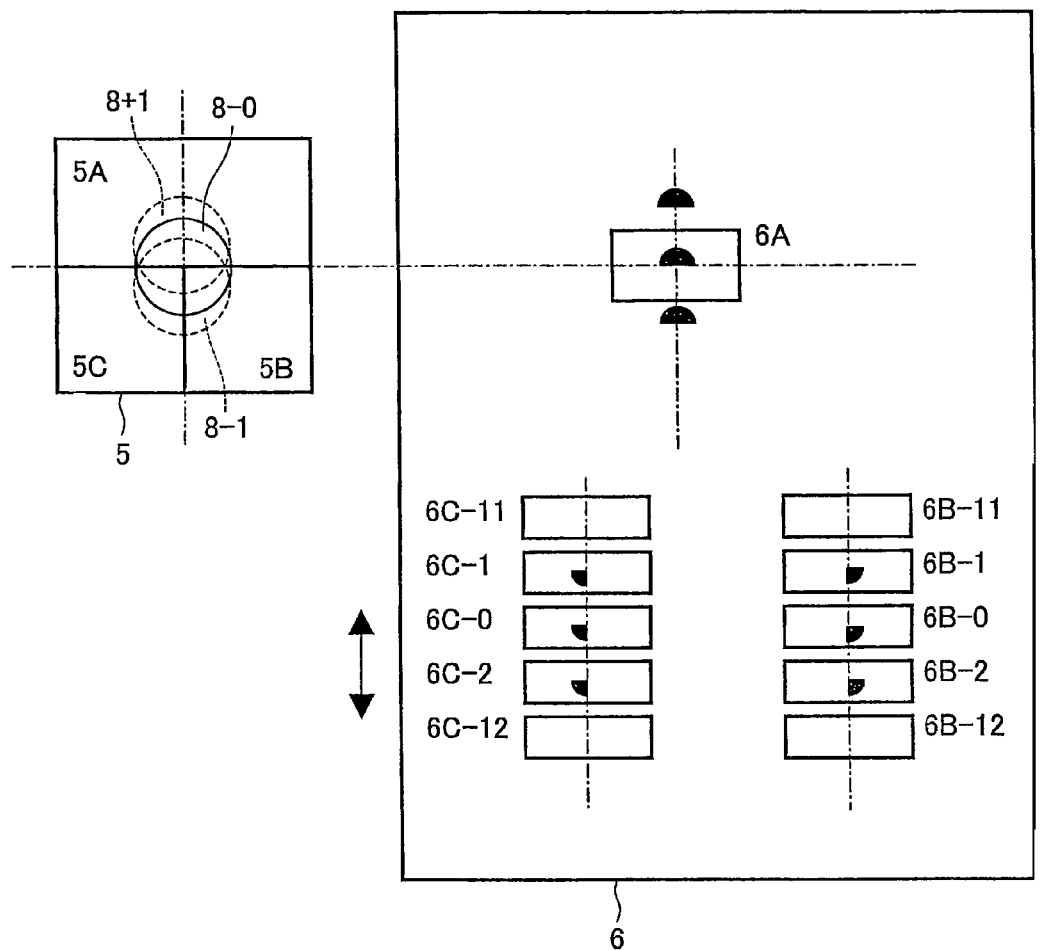
FIG. 14 is an explanatory diagram of a light beam incident on a light-receiving section, when a main beam and sub beams having reflected off a targeted layer enter a hologram.

FIG. 14 illustrates light beams on the light-receiving section 6, in case where the main beam and sub beams reflected off the targeted layer irradiate the hologram 5. As shown in the figure, the optical axis of the main beam 8, which is zero-th transmitted light, locates at the center of the hologram 5. The sub beams 8+1 and 8−1 which are positive and negative first-order diffracted lights are partly overlapped with the zero-th transmitted light. The dotted lines in the figure indicate straight lines (orthogonal line and horizontal line) including the optical axis.

The main beam diffracted in the region 5A irradiates the focusing-use light-receiving region 6A. The sub beams 8+1 and 8−1 diffracted in the region 5A irradiate areas sandwiching the focusing-use light-receiving region 6A, in which areas a light-receiving region is not provided. In other words, the sub beams 8+1 and 8−1 are not used for figuring out the focus servo signal and tracking servo signal.

On the other hand, the main beam 8 diffracted in the region 5B (5C) irradiates the main light-receiving region 6B-0 (6C-0) which is a part of the tracking-use light-receiving region 6B (6C). The sub beams 8+1 and 8−1 diffracted in the region 5B (5C) irradiate the sub light-receiving regions 6B-1 and 6B-2 (6C-1 and 6C-2), respectively.

The following will discuss how a tracking servo signal (tracking error signal, hereinafter, TES) in case where the optical disc 4 includes only a single layer is figured out by a differential push-pull method (hereinafter, DPP method). The DPP method is typically used for a recordable optical disc 4. According to the DPP method, provided that the light intensity detected in the main light-receiving region 6B-0 is "6B-0", the light intensity detected in the main light-receiving region 6C-0 is "6C-0", the light intensities detected in the respective sub light-receiving regions 6B-1 and 6B-2 are "6B-1" and "6B-2", and the light intensities detected in the respective sub light-receiving regions 6C-1 and 6C-2 are "6C-1" and "6C-2", the aforesaid TES is figured out by the following equation (4).

$$\text{TES} = (\text{"}6B\text{-}0\text{"} - \text{"}6C\text{-}0\text{"}) - K \times \{(\text{"}6B\text{-}1\text{"} + \text{"}6B\text{-}2\text{"}) - (\text{"}6C\text{-}1\text{"} + \text{"}6C\text{-}2\text{"})\} \quad (4)$$

In the equation, indicated by K is an optional coefficient calculated from the difference between the light intensities of the main beams and sub beams.

That is, the difference between the main beams split in the respective regions 5B and 5C and the differences between the sub beams split in the respective regions 5B and 5C are calculated, and the tracking servo signal is figured out by working of the difference between these differences.

Figure 15:
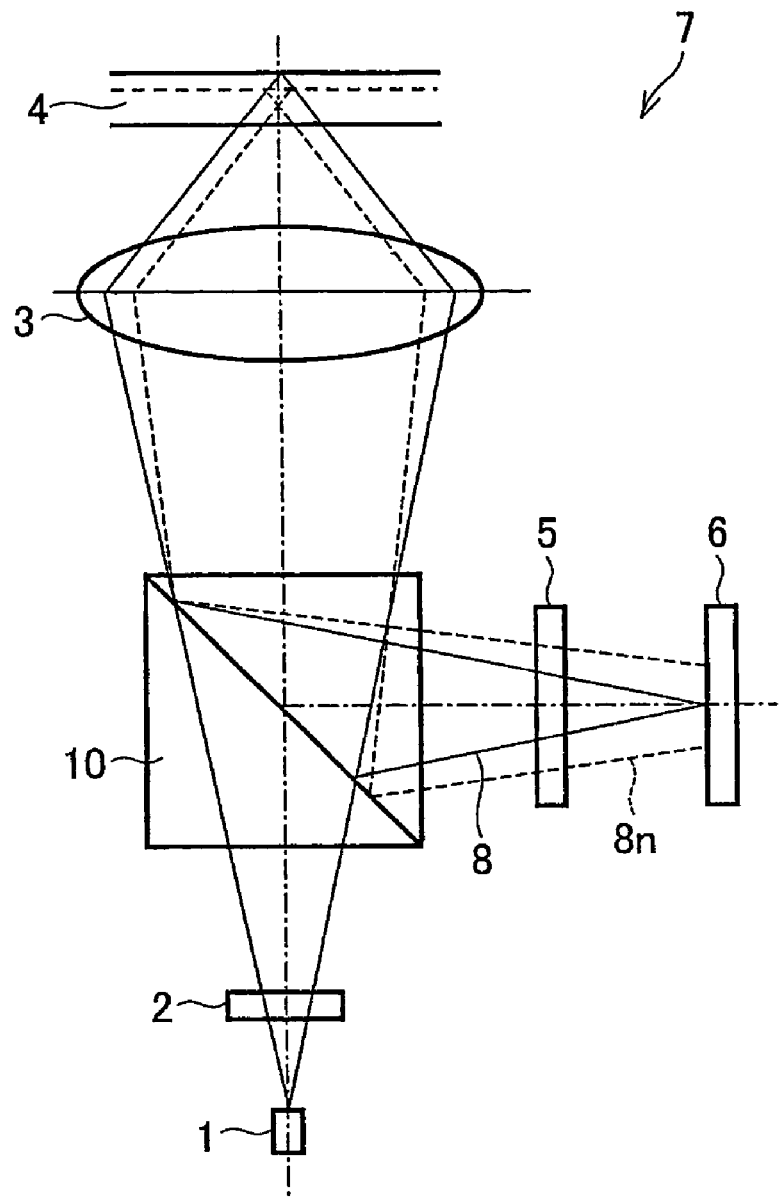
FIG. 15 is a side view illustrating a difference between a light path of a light beam having reflected off a targeted layer and a light beam having reflected off a non-targeted layer which is located closer to the objective lens than the targeted layer.
Figure 16:
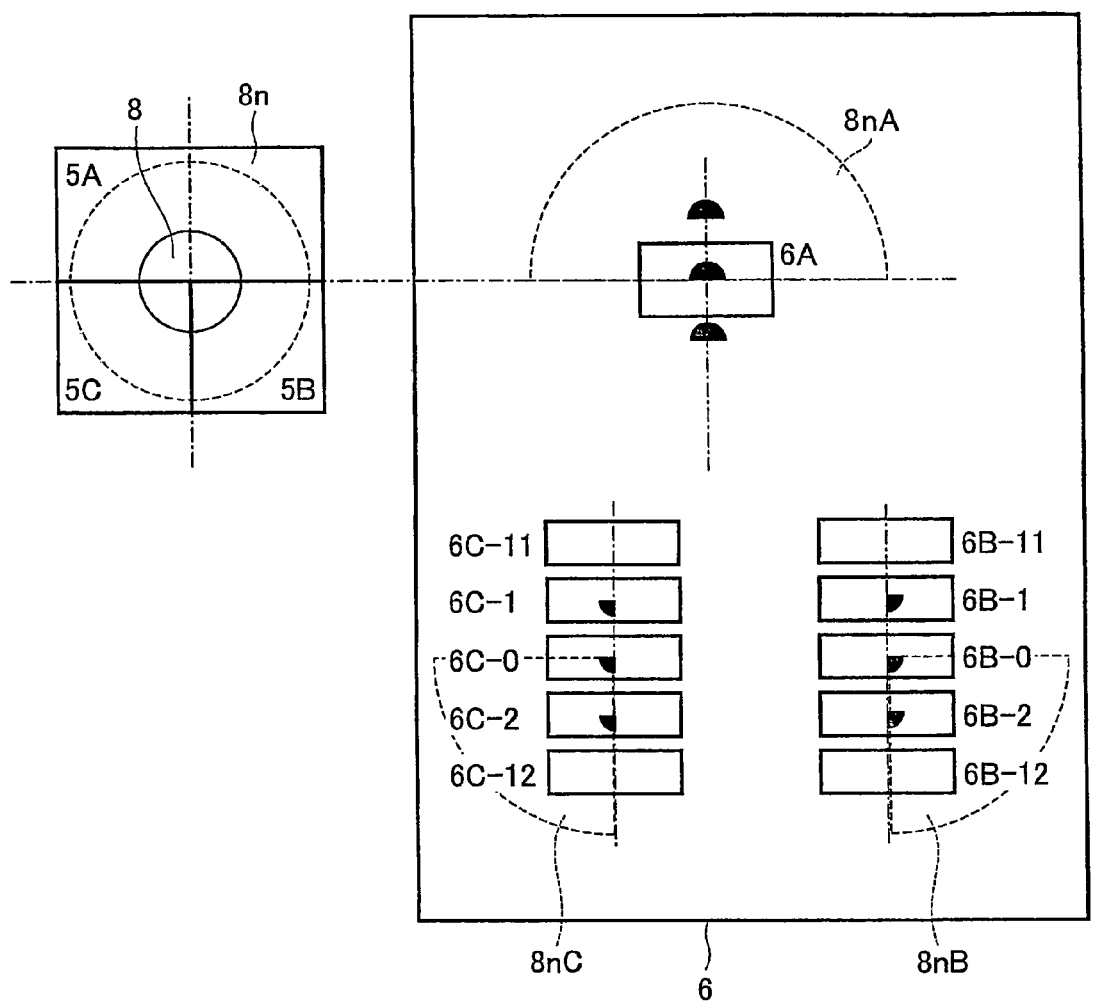
FIG. 16 illustrates spots formed when a light-receiving section and a hologram are irradiated with a light beam having reflected off a targeted layer, and a light beam having reflected off a non-targeted layer which is located closer to the objective lens than the targeted layer.

The following will describe stray light (main beam and sub beams reflected off the non-targeted layer) generated in the optical disc 4 in which plural writing layers are laminated. FIG. 15 is a side view showing the difference between the optical path of the light beam reflected off the targeted layer and the optical path of the stray light reflected off the non-targeted layer closer to the objective lens 3 than the targeted layer. FIG. 16 is a frontal view showing the spots of the light beam reflected off the targeted layer and the spots of the stray light from the non-targeted layer which is closer to the objective lens 3 than the targeted layer, on the hologram 5 and the light-receiving section 6. In the figure, the light beam reflected off the targeted layer is indicated by dotted lines. Although the following will discuss a case where the optical disc 4 has two layers, the number of the writing-target layers is not limited to two.

On the hologram 5 and the light-receiving section 6, the light beam (hereinafter, near-side stray light) 8n from the writing-target layer (non-targeted layer) closer to the objective lens 3 than the targeted layer is different in area from the light beam 8 supplied from the targeted layer, because of the difference between the optical path lengths, as shown in FIG. 15. More specifically, as shown in FIG. 16, the near-side stray light 8n irradiating the hologram 5 and the light-receiving section 6 has a larger irradiating area than the light beam 8, because of the difference between the optical path lengths and the influence of the objective lens 33. In other words, the spots of the near-side stray light 8n are larger than the spots of the light beam 8, on the hologram 5 and the light-receiving section 6.

In FIG. 16, although each of the light beam 8 and the near-side stray light 8n includes a main beam and sub beams on account of the diffraction section 2, only the zero-th transmitted light is illustrated as to the near-side stray light, for the sake of convenience. Since the zero-th transmitted light is much more intense than positive and negative first-order diffracted lights in the embodiments, the following description only deals with the zero-th transmitted light which strongly influences on the offset (i.e. has high light intensity).

As shown in FIG. 16, the near-side stray light 8n split in the region 5A irradiates the light-receiving region 6A, as focusing near-side stray light 8nA. On the light-receiving region 6A, the spot of the focusing near-side stray light 8nA is larger than the spot of the light beam 8 split in the region 5A. The near-side stray light 8n split in the region 5B (5C) irradiates the main light-receiving region 6B-0 (6C-0), as tracking near-side stray light 8nB (8nC). On the main light-receiving region 6B-0 (6C-0), the spot of the tracking near-side stray light 8nB (8nC) is larger than the spot of the light beam 8 split in the region 5B (5C). Because of its larger irradiating area, the tracking-near stray light 8nB (8nC) also irradiates the sub light-receiving region 6B-2 (6C-2) and the auxiliary light-receiving region 6B-12 (6C-12).

Therefore, because the tracking near-side stray light 8nB (8nC) irradiates the sub light-receiving region 6B-2 (6C-2), the TES is figured out by the following equation (5).

$$\text{TES} = (\text{"}6B\text{-}0\text{"} - \text{"}6C\text{-}0\text{"}) - K \times \{(\text{"}6B\text{-}1\text{"} + \text{"}6B\text{-}2\text{"} + \Delta b2) - (\text{"}6C\text{-}1\text{"} + \text{"}6C\text{-}2\text{"} + \Delta c2)\} \quad (5)$$

In the equation above, indicated by $\Delta b2$ ($\Delta c2$) is the offset generated because the tracking near-side stray light 8nB (8nC) irradiates the sub light-receiving region 6B-2 (6C-2).

Unnecessary offsets are not generated in the TES if $\Delta b2 = \Delta c2$. In reality, however, the tracking near-side stray light 8nB (8nC) moves in the horizontal directions (radial directions) in the figure, on account of, for example, the influence of the manufacturing error of the pickup. For this reason, the offset of $K \times (\Delta b2 - \Delta c2)$ is generated because $\Delta b2 \neq \Delta c2$.

This offset can be cancelled out by subtracting, from the output "6B-2" ("6C-2"), the output of the auxiliary light-receiving region 6B-12 (6C-12) which only detects the tracking near-side stray light 8nB (8nC).

Figure 17:
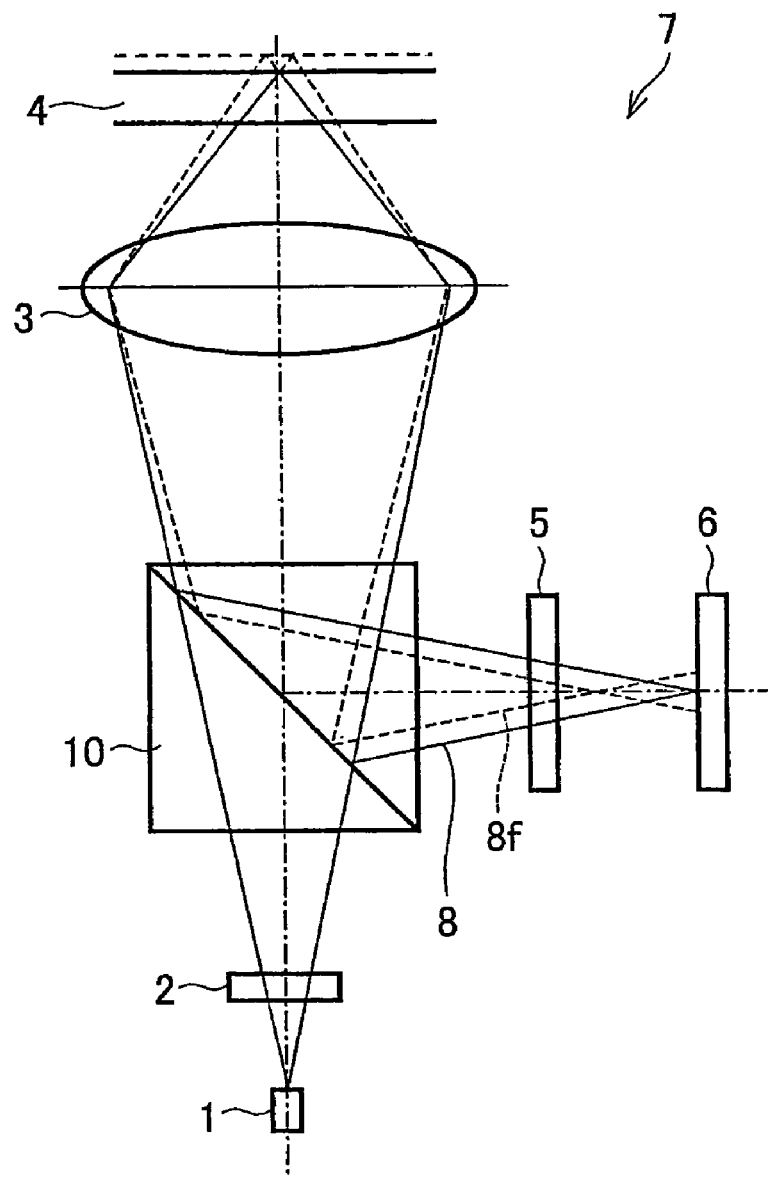
FIG. 17 is a side view illustrating a difference between a light path of a light beam having reflected off a targeted layer and a light beam having reflected off a non-targeted layer which is located farther from the objective lens than the targeted layer.
Figure 18:
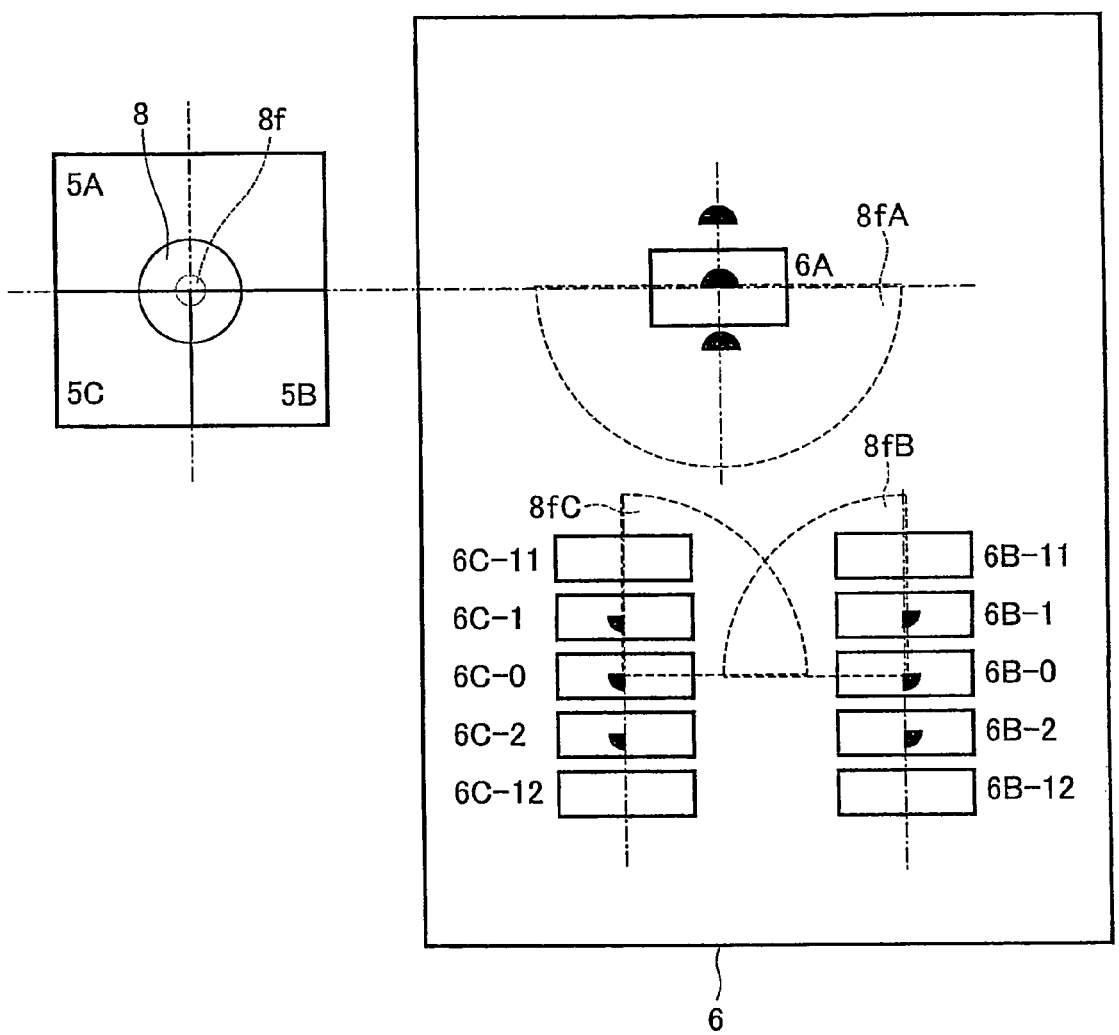
FIG. 18 is a frontal view illustrating spots formed when a light-receiving section and a hologram are irradiated with a light beam having reflected off a targeted layer, and a light beam having reflected off a non-targeted layer which is located farther from the objective lens than the targeted layer.

FIG. 17 is a side view showing the difference between the optical path of the light beam reflected off the targeted layer and the optical path of the stray light from the non-targeted layer which is farther away from the objective lens 3 than the targeted layer. FIG. 18 is a frontal view showing the spots of the light beam reflected off the targeted layer and the spots of the stray light from the non-targeted layer which is closer to the objective lens 3 than the targeted layer, on the hologram 5 and the light-receiving section 6. In the figure, the light beam reflected off the targeted layer is indicated by dotted lines.

As shown in FIG. 17, on the hologram 5 and the light-receiving section 6, the area of the light beam (hereinafter, far-side stray light) from the writing-target layer (non-targeted layer) on the side of the targeted layer opposite to the objective lens 3 is different from the area of the light beam 8 from the targeted layer, on account of the difference between the optical path lengths. More specifically, as shown in FIG. 18, the far-side stray light 8f irradiating the hologram 5 focuses at a position falling short of the light-receiving section 6 (i.e. a position between the light-receiving section 6 and the hologram 5), on account of the difference between the optical path lengths and the influence of the optical lens 33. For this reason, the area of the far-side stray light irradiating the hologram 5 is smaller than the area of the light beam 8, whereas the area of the far-side stray light 8f irradiating the light-receiving section 6 is larger than the area of the light beam 8. That is to say, on the hologram 5, the spot of the far-side stray light 8f is smaller than the spot of the light beam 8. On the other hand, on the light-receiving section 6, the spots of the far-side stray light 8f are larger than the spots of the light beam 8.

As shown in FIG. 18, the far-side stray light 8f split in the region 5A irradiates the light-receiving region 6A, as focusing far-side stray light 8fA. On the light-receiving region 6A, the spot of the focusing far-side stray light 8fA is larger than the spot of the light beam 8 split in the region 5A. The far-side stray light 8f split in the region 5B (5C) irradiates the main light-receiving region 6B-0 (6C-0). On this occasion, on the main light-receiving region 6B-0 (6C-0), the spot of the tracking far-side stray light 8fB (8fC) is larger than the spot of the light beam 8 split in the region 5B (5C). On account of the large irradiating area, the tracking far-side stray light 8fB (8fC) also irradiates the sub light-receiving region 6B-1 (6C-1) and the auxiliary light-receiving region 6B1-11 (6C-11).

To cause the tracking far-side stray light 8fB (8fC) to irradiate the sub light-receiving 6B-1 (6C-1), the TES is determined by the following equation (6).

$$TES=(\text{``}6B\text{-}0\text{''}-\text{``}6C\text{-}0\text{''})-K\times\{(\text{``}6B\text{-}1\text{''}+\Delta b1+\text{``}6B\text{-}2\text{''})-(\text{``}6C\text{-}1\text{''}+\Delta c1+\text{``}6C\text{-}2\text{''})\} \quad (6)$$

Indicated by $\Delta b1$ ($\Delta c1$) is the offset generated when the tracking far-side stray light 8fB (8fC) irradiates the sub light-receiving region 6B-1 (6C-1).

Unnecessary offset is not generated in the TES if $\Delta b1 = \Delta c1$. In reality, however, the offset of $K\times(\Delta b1-\Delta c1)$ is generated because $\Delta b1 \neq \Delta c1$, on account of, for example, a manufacturing error of the pickup.

The offset can be cancelled out by subtracting, from the output "6B-1" ("6C-1"), the output of the auxiliary light-receiving region 6B-11 (6C-11) which only detects the tracking far-side stray light 8fB (8fC).

The following will discuss the positional relationship between the focusing-use light-receiving region 6A and the tracking-use light-receiving regions 6B and 6C.

In the light-receiving section 6 of the present embodiment, the focusing-use light-receiving region 6A and the tracking-use light-receiving regions 6B and 6C are arranged so as to prevent the focusing main beam reflected off the non-targeted layer from irradiating the sub light-receiving regions 6B-1 and 6B-2 (6C-1 and 6C-2).

Figure 11:
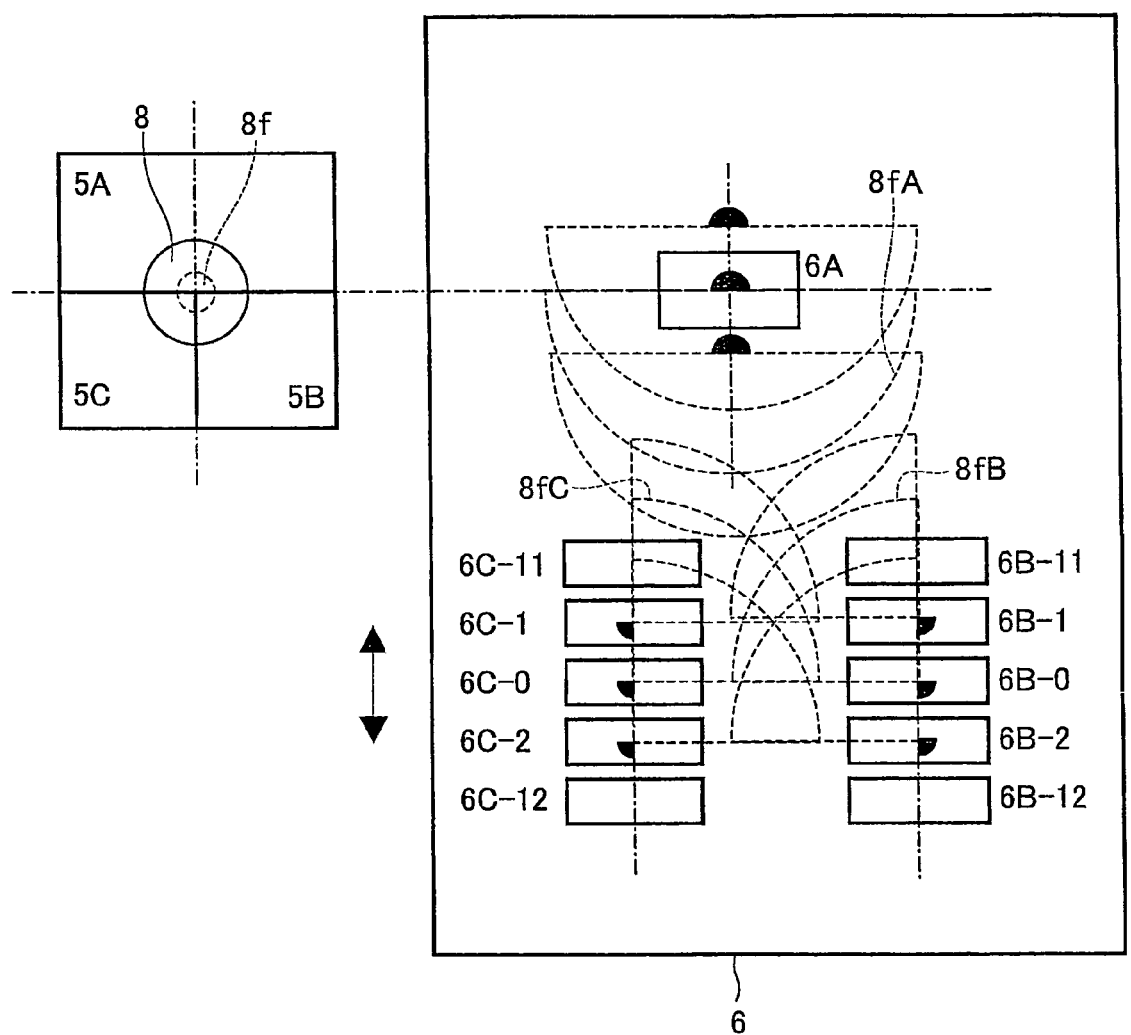
FIG. 11 is a frontal view illustrating an arrangement of focusing-use light-receiving regions and tracking-use light-receiving regions of Embodiment 4.

FIG. 11 is a frontal view showing the arrangement of the focusing-use light-receiving region 6A and the tracking-use light-receiving regions 6B and 6C of the present embodiment. The arrows in the figure indicate the tracking directions.

In the present embodiment, as shown in FIG. 11, the main light-receiving region 6B-0 (6C-0), the sub light-receiving regions 6B-1 and 6B-2 (6C-1 and 6C-2), and the auxiliary light-receiving regions 6B-11 and 6B-12 (6C-11 and 6C-12) are arranged so as not to receive the focusing far-side stray light 8fA irradiating the light-receiving section 6. More specifically, the tracking light-receiving region 6B (6C) is positioned so as not to receive the focusing-use main beam and the focusing-use sub beams which are reflected off the non-targeted layer.

Since this makes it possible to prevent the focusing-use main beam and the focusing-use sub beams which are reflected off the non-targeted layer from irradiating the tracking light-receiving region 6B (6C), the offset generated because the focusing-use main beam and the focusing-use sub beams irradiate the tracking light-receiving region 6B (6C) does not occur. It is therefore possible to obtain an accurate tracking servo signal, and hence stable and secure tracking control is achieved as compared to the conventional arrangement. In other words, in case where information is written/read to/from an optical disc 4 in which plural writing-target layers are laminated, it is possible to restrain the influence of reflected light from a non-targeted layer, and realize tracking control which is stable as compared to the conventional art.

An information writing/reading device including the above-described optical pickup device 7 can perform secure and stable tracking control as compared to the conventional arrangement.

Moreover, the optical pickup device is downsized by adopting an integrated unit (optical pickup unit) 20 in which the laser light source 1, the diffraction section 2, the hologram 5, and the light-receiving section 6 are integrated. In the present embodiment, the integrated unit 20 is arranged such that at least the laser light source 1, the diffraction section 2, the hologram 5, and the light-receiving section 6 are integrated. The optical pickup device includes the integrated unit 20 and an objective lens 3 (and a driving power source for driving the objective lens 3).

Embodiment 5

The following will describe still another embodiment of the present invention. In the embodiment, members identical with those described in Embodiment 4 are given the same numbers, so that the descriptions are omitted for the sake of convenience.

The present embodiment discusses a case where, in the optical pickup device 7, the splitting pattern of the hologram 5 is different.

Figure 19:
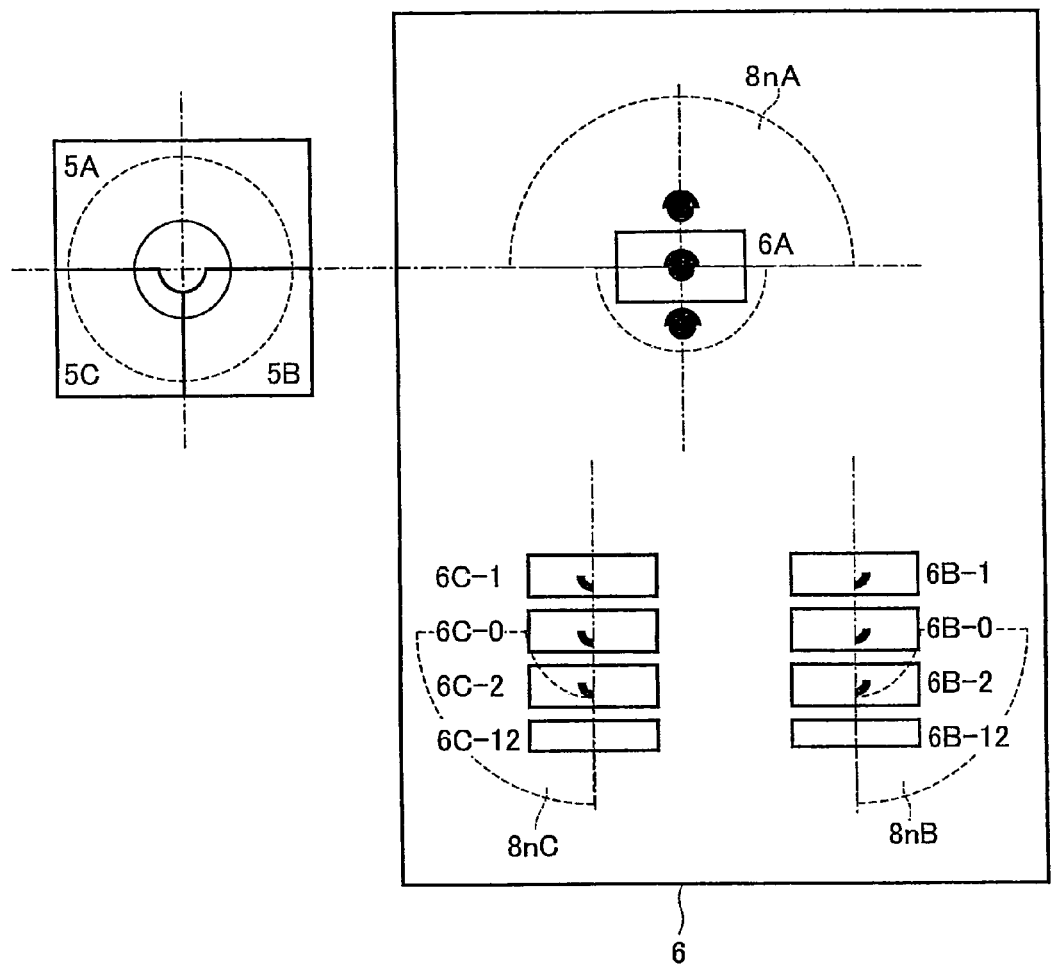
FIG. 19 illustrates spots formed when a light-receiving section and a hologram are irradiated with a light beam having reflected off a targeted layer, and a light beam having reflected off a non-targeted layer which is located closer to the objective lens than the targeted layer.

FIG. 19 is a frontal view showing the spots of the light beams reflected off the targeted layer and the spots of the stray light from the non-targeted layer which is closer to the objective lens 3 than the targeted layer, on the hologram 5 and the light-receiving section 6. In the figure, the light beams reflected off the non-targeted layer are indicated by dotted lines.

The hologram 5 of the present embodiment is arranged such that the regions 5B and 5C splitting the light beams in order to figure out a tracking servo signal do not include the region around the optical axis of the main beam. That is to say, the regions 5B and 5C of the hologram 5, where the light beams reflected off the optical disc 4 are split, do not include a region where the main beam and sub beams, which are reflected off the non-targeted layer farther away from the objective lens 3 than the targeted layer, converge. More specifically, a tracking servo signal is obtained in a region excluding a part which is large than the maximum beam diameter of the stray light from the non-targeted layer farther away from the objective lens 3 than the targeted layer. The aforesaid part is arranged such that stray light from the non-targeted layer farther away from the objective lens 3 than the targeted layer does not go beyond the part even if the objective lens 3 moves for tracking.

More specifically, in case where, on the hologram 5, the diameter of the light beam reflected off the optical disc 4 is 600 μm, a tracking servo signal is obtained using regions excluding the circle about 130 μm in radius (260 μm in diameter) around the optical axis. It is noted that the numerical values change in accordance with the arrangements (e.g. the focal length and numerical aperture of the objective lens 3 and the splitting pattern of the hologram 5) of the optical system.

Therefore, the shape of each of the tracking-use light beams having passed through the regions 5B and 5C is a quarter of a doughnut, on the main light-receiving region 6B-0 (6C-0), the sub light-receiving region 6B-2 (6C-2), and the auxiliary light-receiving region 6B-12 (6C-12). Therefore, as shown in FIG. 19, the tracking-use light beams reflected off the targeted layer pass through the region 5B (5C) of the hologram 5 and irradiate the main light-receiving region 6B-0 (6C-0) and the sub light-receiving region 6B-2 (6C-2) on the light-receiving section 6, with the shape of a quarter of a doughnut. Tracking near-side stray light 8nB (8nC) also irradiates the section 6 in a similar manner.

In the meanwhile, the region 5A of the hologram 5 includes the aforesaid region-around the optical axis. The focusing-use light beam reflected off the targeted layer passes through the region 5A and forms, on the focusing-use light-receiving region 6A, a spot which is shaped such that a small semicircle is joined with a large semicircle. At the same time, stray light also irradiates the focusing-use light-receiving region 6A, with the same shape as the focusing-use light beam reflected off the targeted layer.

Figure 20:
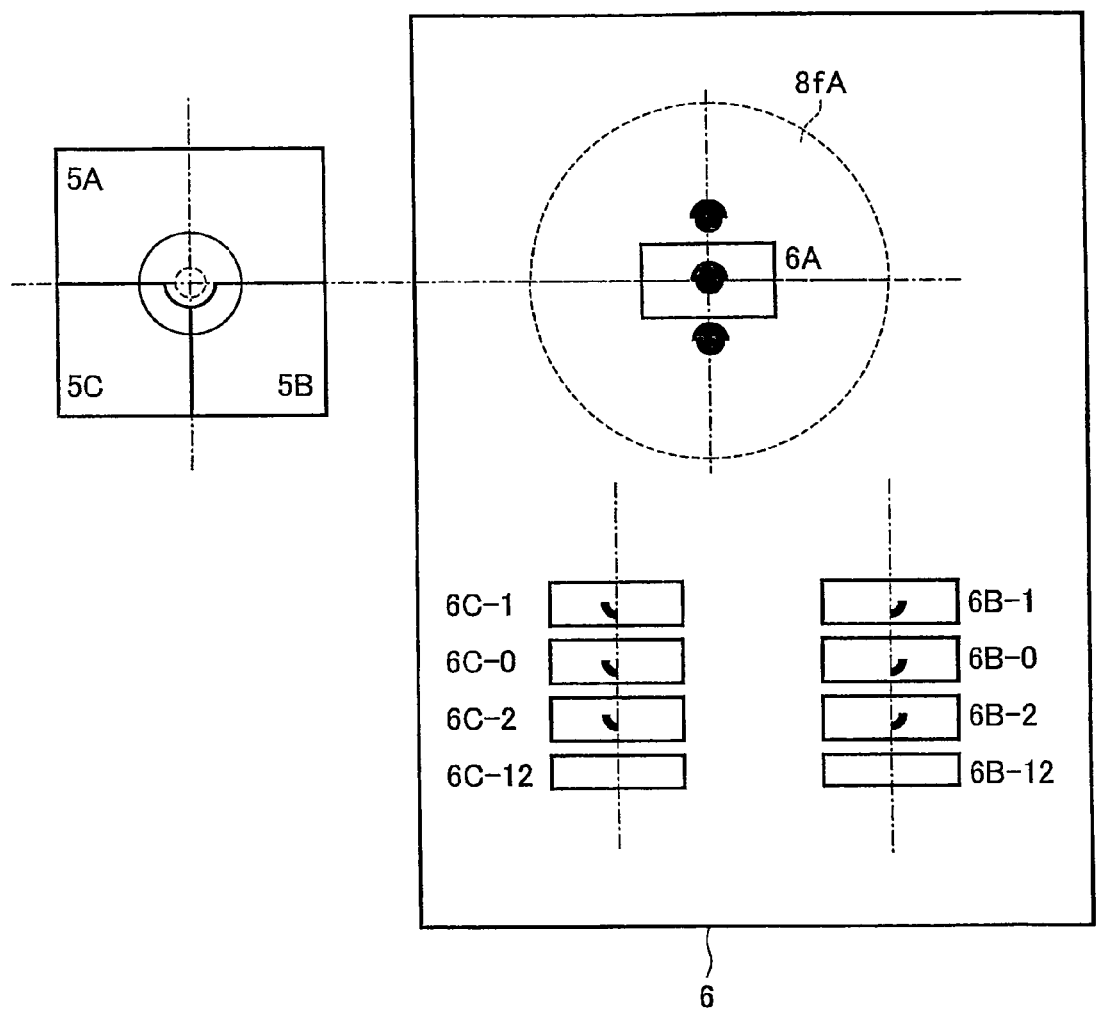
FIG. 20 is a frontal view illustrating spots formed when a light-receiving section and a hologram are irradiated with a light beam having reflected off a targeted layer, and a light beam having reflected off a non-targeted layer which is located farther from the objective lens than the targeted layer.

FIG. 20 is a frontal view showing the spots of the light beams reflected off the targeted layer and the spots of the stray light from the non-targeted layer farther away from the objective lens 3 than the targeted layer, on the hologram 5 and the light-receiving section 6. As shown in FIG. 20, the stray light (both the main beam and sub beams) irradiates only the region 5A of the hologram 5. In other words, the stray light does not irradiate the regions 5B and 5C which split the light beams in order to figure out a tracking servo signal. Even if the objective lens 3 is moved for tracking control, the stray light does not irradiate the regions 5B and 5C.

Therefore, for example, the tracking far-side stray light 8f irradiates only the focusing-use light-receiving region 6A, so as not to irradiate the main light-receiving region 6B-0 (6C-0), the sub light-receiving regions 6B-1 and 6B-2 (6C-1 and 6C-2), and the auxiliary light-receiving region 6B-12 (6C-12).

On this account, when the regions 5B and 5C of the hologram 5, which are used for figuring out a tracking servo signal, are shaped so as not to receive the tracking far-side stray light 8f, it is unnecessary to provide the auxiliary light-receiving regions 6B-11 and 6C-11 which are used for detecting the offsets generated on account of the tracking far-side stray light 8fB and the tracking far-side stray light 8fC. As a result, the number of the auxiliary light-receiving regions is reduced, and hence the device is downsized.

The following will describe the shape of the auxiliary light-receiving region 6B-12 (6C-12) of the present embodiment.

Figure 21:
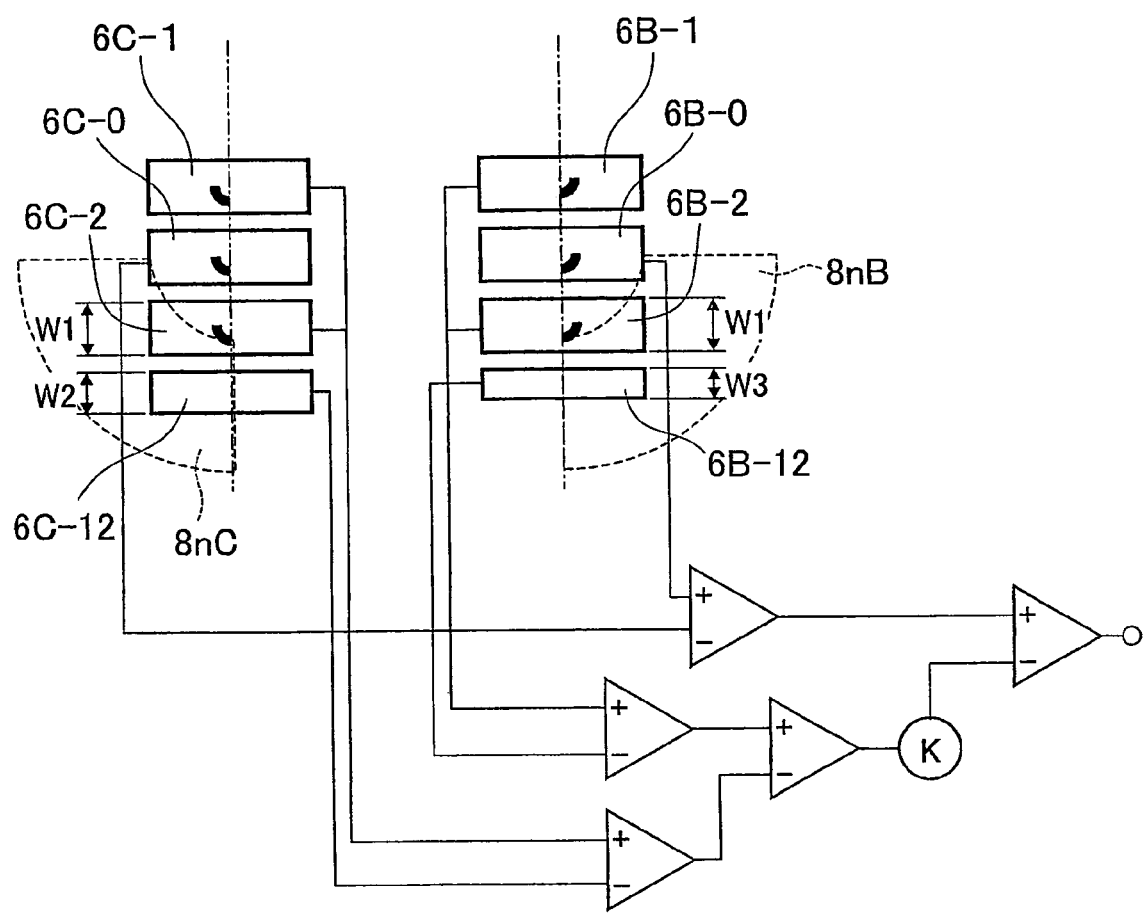
FIG. 21 is a frontal view illustrating the shape of each auxiliary light-receiving section in a tracking-use light-receiving region.

FIG. 21 is a frontal view showing the shape of the auxiliary light-receiving region 6B-12 (6C-12) of the tracking-use light-receiving region 6B (6C).

In the present embodiment, as shown in FIG. 21, the light-receiving area of the auxiliary light-receiving region 6B-12 (6C-12) is smaller than those of the sub light-receiving regions 6B-1 and 6B-2 (6C-1 and 6C-2). The following description relates to this point.

As shown in FIG. 21, offset is generated because the tracking near-side stray light 8nB (8nC) irradiates the sub light-receiving region 6B-2 (6C-2). Offset is similarly generated in the main light-receiving region 6B-0 (6C-0). Therefore, the aforesaid TES is figured out by the following equation (7).

$$TES = (\text{``}6B\text{-}0\text{''} + \Delta b - \text{``}6C\text{-}0\text{''} + \Delta c) - K \times \{(\text{``}6B\text{-}1\text{''} + \text{``}6B\text{-}2\text{''} + \Delta b2) - (\text{``}6C\text{-}1\text{''} + \text{``}6C\text{-}2\text{''} + \Delta c2)\} \quad (7)$$

In the equation, indicated by $\Delta b$ ($\Delta c$) is the offset generated because the tracking near-side stray light 8nB (8nC) irradiates the main light-receiving region 6B-0 (6C-0), whereas indicated by $\Delta b2$ ($\Delta c2$) is the offset generated because the tracking near-side stray light 8nB (8nC) irradiates the sub light-receiving region 6B-2 (6C-2).

If the amounts of the offsets caused by the stray light (tracking near-side stray light 8nB (8nC)) are identical to one another, the offsets can be cancelled out without providing an auxiliary light-receiving region. In reality, $\Delta b \neq \Delta c$ and $\Delta b2 \neq \Delta c2$ because of, for example, the manufacturing error of the optical pickup device 7.

In consideration of the above, the present embodiment is arranged such that the light-receiving area of the auxiliary light-receiving region 6B-12 (6C-12) is arranged so as to be smaller than those of the sub light-receiving regions 6B-1 and 6B-2 (6C-1 and 6C-2).

Provided that, in the above-described equation (7), the output signals obtained from the auxiliary light-receiving regions 6B-12 and 6C-12 are x and y, the aforesaid TES is figured out by the following equation (8).

$$TES = (\text{``}6B\text{-}0\text{''} + \Delta b - \text{``}6C\text{-}0\text{''} + \Delta c) - K \times \{(\text{``}6B\text{-}1\text{''} + \text{``}6B\text{-}2\text{''} + \Delta b2 - x) - (\text{``}6C\text{-}1\text{''} + \text{``}6C\text{-}2\text{''} + \Delta c2 - y)\} \quad (8)$$

If x and y are determined to satisfy $\Delta b - K \times (\Delta b2 - x) = 0$ and $\Delta c - K \times (\Delta c2 - y) = 0$, it is possible to cancel out the offsets generated in the main light-receiving region 6B-0 (6C-0) and the sub light-receiving regions 6B-1 and 6B-2 (6C-1 and 6C-2). In the present embodiment, the auxiliary light-receiving region 6B-12 and the light-receiving area (shape) of the auxiliary light-receiving region 6B-12 are arranged so as to satisfy x and y as above. In other words, the auxiliary light-receiving region 6B-12 and the light-receiving area thereof are arranged so a to cancel out the offsets generated in the main light-receiving region 6B-0 (6C-0) and the sub light-receiving regions 6B-1 and 6B-2 (6C-1 and 6C-2).

For example, provided that the light receiving region 6B-12 has the identical light-receiving area with the sub light-receiving regions 6B-1 and 6B-2 (6C-1 and 6C-2), the offsets of $K \times (\Delta b2 - x)$ and $K \times (\Delta c2 - y)$ are canceled out because $\Delta b2 = x$ and $\Delta c2 = y$. However, the offset of $\Delta b - \Delta c$ remains (i.e. $\Delta b \neq \Delta c$). In the present embodiment, to cancel out the offset generated in the main light-receiving region 6B-0 (6C-0), i.e. to achieve $\Delta b2 - x > 0$ and $\Delta c2 - y > 0$, the light-receiving area of the auxiliary light-receiving region 6B-12 (6C-12) is arranged so as to be smaller than those of the sub light-receiving regions 6B-1 and 6B-2 (6C-1 and 6C-2).

In the present embodiment, the regions 5B and 5C which are the split regions of the hologram 5 exclude the region where the stray light from the non-targeted layer farther away from the objective lens 3 than the targeted layer converges. On this account, the shape of the tracking near-side stray light 8nB (8nC) irradiating the light-receiving section 6 is a quarter of a doughnut. The light intensity of the tracking near-side stray light 8nB (8nC) irradiating the light-receiving section 6 is therefore lower than the light intensity in the auxiliary light-receiving region 6B-12 (6C-12). Taking account of this, the offset generated in the sub light-receiving region 6B-2 (6C-2) is cancelled out by arranging the light-receiving area of the auxiliary light-receiving region 6B-12 (6C-12) in such a manner as to cause the light intensity of the stray light irradiating the sub light-receiving region 6B-2 (6C-2) to be identical with the light intensity of the stray light irradiating the auxiliary light-receiving region 6B-12 (6C-12). As in the description above, to also cancel out the offset generated in the main light-receiving region 6B-0 (6C-0), the light-receiving area of the auxiliary light-receiving region 6B-12 (6C-12) is arranged so as to be smaller than the light-receiving area, of the sub light-receiving region 6B-2 (6C-2), where the stray light irradiates. More specifically, as shown in FIG. 21, provided that the length of the sub light-receiving region 6B-2 (6C-2) is identical with the lengths of the auxiliary light-receiving regions 6B-12 and 6C-12, the widths of these regions are set so as to satisfy W1>W3 and W1>W2 (W1 indicates the width of the sub light-receiving region 6B-2 (6C-2), W3 indicates the width of the auxiliary light-receiving region 6B-12, and W2 indicate the width of the auxiliary light-receiving region 6C-12). With this, it is possible to cancel out the offsets generated in the main light-receiving region 6B-0 (6C-0) and the sub light-receiving region 6B-2 (6C-2), only by two auxiliary light-receiving regions.

In the present embodiment, the light-receiving area of the auxiliary light-receiving region 6C-12 which receives only the tracking near-side stray light 8nC split in the region 5C of the hologram 5 is arranged so as to be different from the light-receiving area of the auxiliary light-receiving region 6B-12 which receives only the tracking near-side stray light 8nB split in the region 5B of the hologram 5. More specifically, the light receiving areas of the respective auxiliary light-receiving regions 6C-12 and 6B-12 are in proportion to the densities (light intensity per a unit area) of the light beams irradiating the respective regions. This point is discussed below.

In case where the light beam reflected off the targeted layer and the stray light are split in the hologram 5 and irradiate the light-receiving section 6, the light beams split in the respective regions 5B and 5C of the hologram 5 may have different split angles and different optical path lengths from the hologram 5 to the light-receiving section 6, depending on the splitting pattern of the hologram 5 and the positions of the splitting pattern and the light-receiving regions. For example, in case where the light beams split in the respective regions 5B and 5C irradiate, at different angles, the respective light-receiving regions, the beam diameters of the light beams irradiating the respective light-receiving regions are different from one another. More specifically, the larger the split angle is, the larger the beam diameter is. In the case above, the density (light intensity per a unit area) of the stray light irradiating the main light-receiving region 6B-0 is different from the density of the stray light irradiating the main light-receiving region 6C-0. Also, the densities of the light beams irradiating the sub light-receiving regions 6B-1 and 6B-2 and the sub light-receiving regions 6C-1 and 6C-2, respectively, are different from one another. Furthermore, the densities of the light beams irradiating the respective auxiliary light-receiving regions 6C-12 and 6B-12 are also different from one another. Therefore, the light-receiving areas of the auxiliary light-receiving regions 6C-12 and 6B-12 are arranged so as to cause the density of the light beam irradiating the auxiliary light-receiving region 6C-12 to be equal to the density of the light beam irradiating the auxiliary light-receiving region 6B-12. More specifically, the light-receiving areas of the auxiliary light-receiving regions 6C-12 and 6B-12 are arranged so as to be different from one another. By doing so, the densities of the light beams irradiating these regions are equal to one another even if the light beams with different split angles irradiate the regions. It is noted that the light-receiving area indicates not an area capable of receiving light but an area where the light beam actually irradiates.

In the present embodiment, to cancel out the offsets generated in the main light-receiving region 6B-0 (6C-0) and the sub light-receiving region 6B-2 (6C-2) by using only two auxiliary light-receiving regions, a gain adjuster which adds gains to the output signals from the respective auxiliary light-receiving regions 6C-12 and 6B-12 may be provided.

Figure 22:
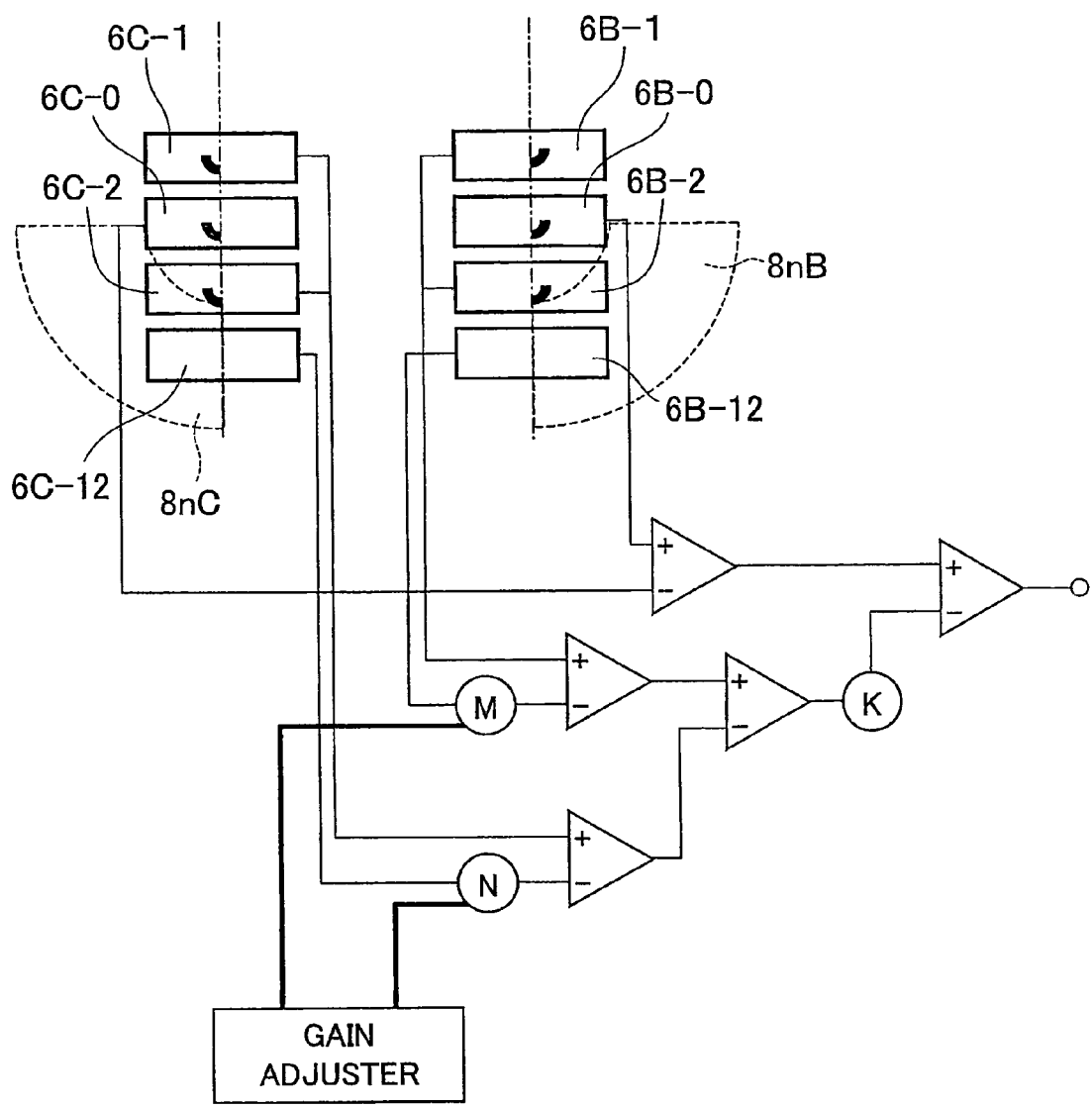
FIG. 22 is a frontal view illustrating a configuration including a gain adjuster for adding gain to an output signal from an auxiliary light-receiving region in a tracking-use light-receiving region.

FIG. 22 is a frontal view showing a case where a gain adjuster which adds gain to the output signal from the auxiliary light-receiving region 6B-12 (6C-12) of the tracking-use light-receiving region 6B (6C) is provided.

The gain adjuster can individually add gain to each of the output signals supplied from the auxiliary light-receiving regions 6B-12 and 6C-12.

In FIG. 22, provided that the gain added to the output signal from the auxiliary light-receiving region 6B-12 is M whereas the gain added to the output signal from the auxiliary light-receiving region 6C-12 is N, the aforesaid TES is figured out by the following equation (9).

$$\text{TES} = (\text{``}6B\text{-}0\text{''} + \Delta b - \text{``}6C\text{-}0\text{''} + \Delta c) - K \times \{(\text{``}6B\text{-}1\text{''} + \text{``}6B\text{-}2\text{''} + \Delta b2 - x \times M) - (\text{``}6C\text{-}1\text{''} + \text{``}6C\text{-}2\text{''} + \Delta c2 - y \times N)\} \quad (9)$$

Moreover, the gains M and N are determined so as to satisfy $\Delta b - K \times (\Delta b2 - x \times M) = 0$ and $\Delta c - K \times (\Delta c2 - y \times N) = 0$.

With this, it is possible to cancel out the offsets generated in the main light-receiving region 6B-0 (6C-0) and the sub light-receiving regions 6B-1 and 6B-2 (6C-1 and 6C-2).

As described above, in case where the densities of the stray lights irradiating the respective tracking-use light-receiving regions 6B and 6C are different from one another, the gain adjuster may add, to the output signals from the sub light-receiving regions 6B-1, 6B-2, 6C-1, and 6C-2, gain different from the gains M and N added to the respective output signals from the respective auxiliary light-receiving regions 6B-12 and 6C-12. More specifically, provided that the gain added to the output signals from the sub light-receiving regions 6B-1, 6B-2, 6C-1, and 6C-2 is I, the aforesaid TES is figured-out by the following equation (10).

$$\text{TES} = (\text{``}6B\text{-}0\text{''} + \Delta b - \text{``}6C\text{-}0\text{''} + \Delta c) - K \times [\{(\text{``}6B\text{-}1\text{''} + \text{``}6B\text{-}2\text{''} + \Delta b2) \times I - x \times M\} - \{(\text{``}6C\text{-}1\text{''} + \text{``}6C\text{-}2\text{''} + \Delta c2) \times I - y \times N\}] \quad (10)$$

In the equation (10), M>N, I>M, and I>N. Also, the gains M, N, and I are determined so as to satisfy $\Delta b - K \times (\Delta b2 \times I - x \times M) = 0$, $\Delta c - K \times (\Delta c2 \times I - y \times N) = 0$.

With this, it is possible to cancel out the offsets generated in the main light-receiving region 6B-0 (6C-0) and the sub light-receiving regions 6B-1 and 6B-2 (6C-1 and 6C-2).

As shown in FIG. 22, a specific calculation method in the present embodiment for figuring out TES is as follows: the difference between an output signal (i) obtained by adding gain M to the output signal from the auxiliary light-receiving region 6B-12 and an added signal (ii) calculated by adding the output signals from the tracking-use sub light-receiving regions 6B-1 and 6B-2 to each other is figured out, so that a resultant output (iii) is obtained; the difference between an output signal (iv) obtained by adding gain N to the output signal from the auxiliary light-receiving region 6C-12 and an added signal (v) obtained by adding the output signals from the tracking-use sub light-receiving regions 6C-1 and 6C-2 to each other is figured out, so that a resultant output (vi) is obtained; the difference between the outputs (iii) and (vi) is figured out, so that a resultant output (vii) is obtained; gain K is added to the output (vii); the difference between the main light-receiving regions 6B-0 and 6C-0 is figured out, so that a resultant output (viii) is obtained; and the difference between the output (viii) and the result of adding the gain K to the output (vii) is figured out. The method of calculating the TES (calculation method) is not limited to the above.

As a result of this, it is possible to cancel out the offsets generated in the main light-receiving region 6B-0 (6C-0) and the sub light-receiving regions 6B-2 (6C-2), without changing the light-receiving area of the auxiliary light-receiving region 6B-12 (6C-12).

To set the gains as above, for example, the gains are determined so as to minimize the jitter and error rate of a reproduced signal, for each optical disc 4 read by the optical pickup device 7. To achieve the optimization more easily, using a reference multilayer optical disc 4, the best gains are determined in reference to the measurements of the offset of the tracking signal and the jitter and error rate of the reproduced signal, at the time of manufacturing the pickup device.

In the case above, the gain adjuster adds gains to the respective output signals from the auxiliary light-receiving regions 6C-12 and 6B-12. In case where, for example, an auxiliary light-receiving region is provided in addition to the auxiliary light-receiving regions 6C-12 and 6B-12, the gain adjuster may add gain to the output signal of the additional auxiliary light-receiving region. The aforesaid gain adjuster may add gains to the output signals from the respective auxiliary light-receiving regions so as to differentiate the gains.

Although the description above deals with the auxiliary light-receiving regions 6C-12 and 6B-12, the present invention is not limited to this case. Auxiliary light-receiving regions in the optical pickup device 7 may be arranged so as to satisfy the conditions above. That is to say, the light-receiving areas of the auxiliary light-receiving regions in the light-receiving section 6 may be different from one another. Furthermore, the light-receiving areas of the auxiliary light-receiving regions may be smaller than the light-receiving areas of the sub light-receiving regions.

As shown in FIG. 18, the optical pickup device 7 includes an integrated unit 20 in which the laser light source 1, the diffraction section 2, the hologram 5, and the light-receiving section 6 are integrated. Since the laser light source 1, the diffraction section 2, the hologram 5, and the light-receiving section 6 are integrated in the integrated unit 20. it is possible to further downsize the optical pickup device 7.

The hologram 5 may be a prism, for example.

In the optical pickup device 7 of the present embodiment, a gain adjuster which adds gain to the output signal from an auxiliary light-receiving region may be provided.

The optical pickup device 7 of the present embodiment may be arranged such that the sizes of the light-receiving regions, receiving the light beams, of the aforesaid auxiliary light-receiving regions are different from one another. Alternatively, the light-receiving areas of the auxiliary light-receiving regions may be identical to one another.

Embodiment 6

The following will describe still another embodiment of the present invention. In the embodiment, members identical with those described in Embodiment 4 are given the same numbers, so that the descriptions are omitted for the sake of convenience.

Figure 23:
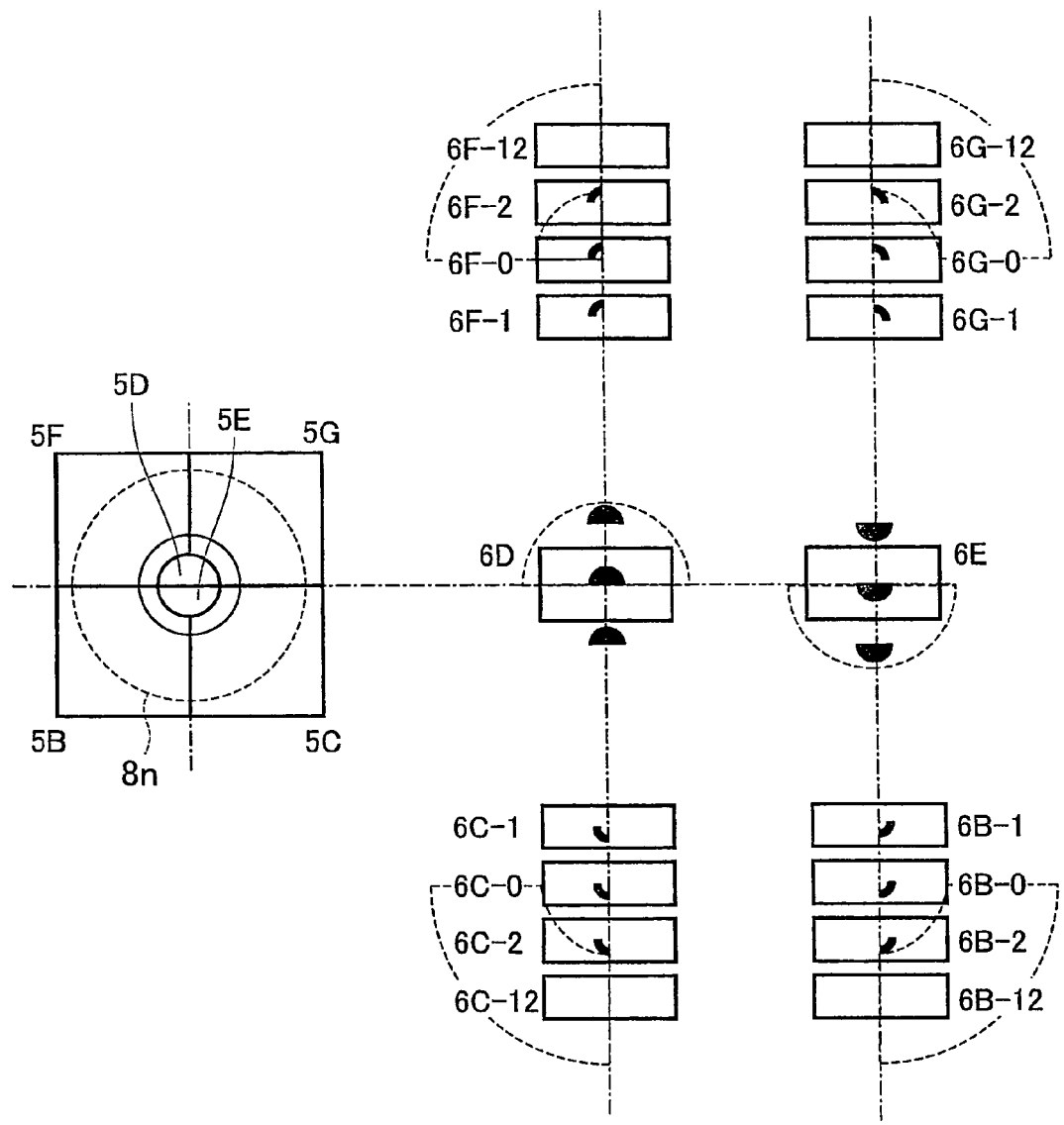
FIG. 23 is a frontal view illustrating another splitting pattern of a hologram, and regions of a light-receiving section, on which regions light beam having passed through the hologram is incident.
Figure 24:
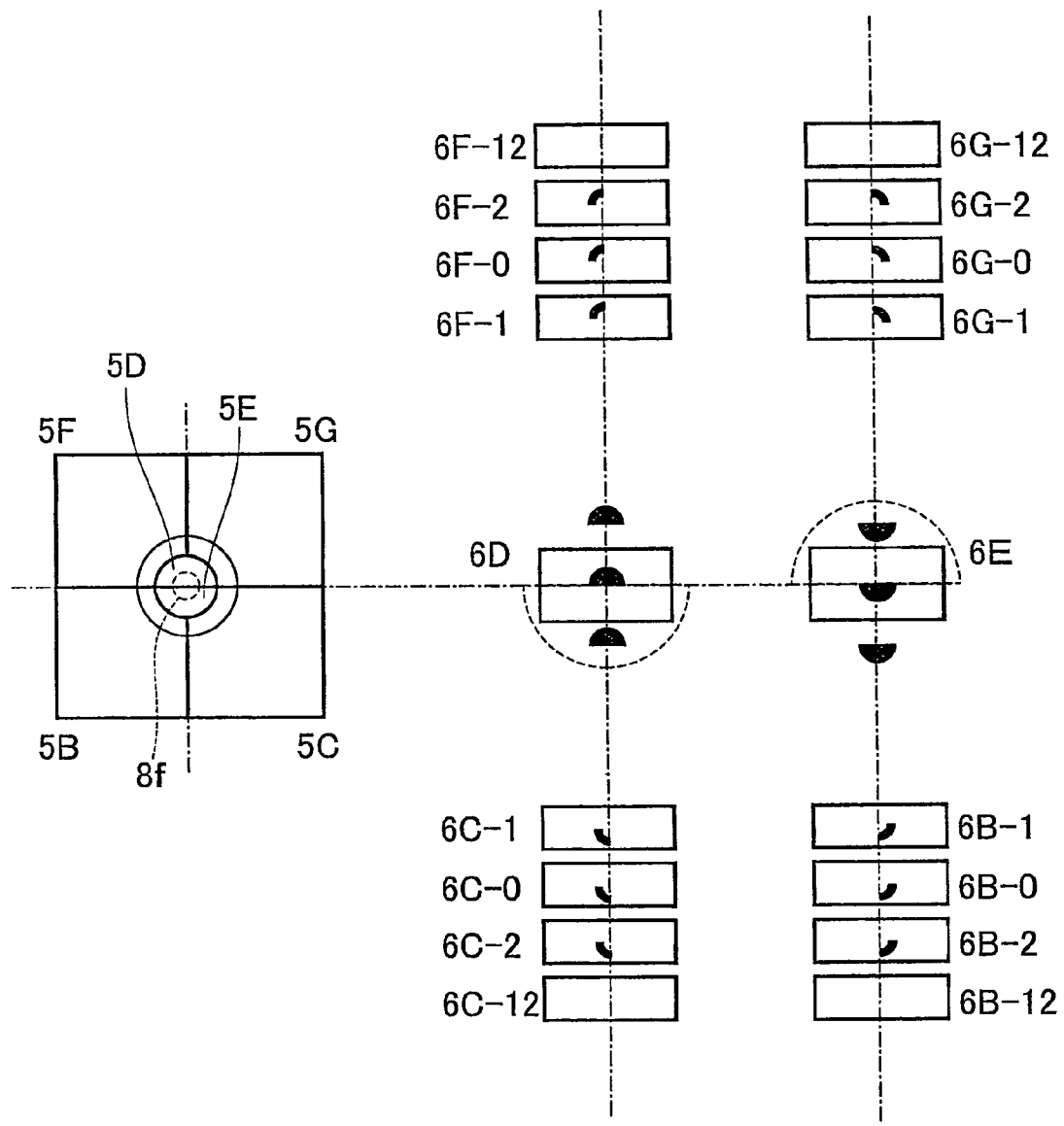
FIG. 24 is a frontal view illustrating another splitting pattern of a hologram, and regions of a light-receiving section, on which regions light beam having passed through the hologram is incident.

The present embodiment describes another splitting pattern of the hologram 5. Each of FIGS. 23 and 24 shows another example of the splitting pattern of the hologram 5 and is a frontal view of regions on the light-receiving section 6, which regions receive light beams having passed through the hologram 5. FIG. 23 shows a case where the near-side stray light 8n irradiates the hologram 5. FIG. 24 shows a case where the far-side stray light 8f irradiates the hologram 5. In the figures, dotted spots indicate stray light.

As shown in FIGS. 23 and 24, the hologram 5 of the present embodiment is divided into six regions, and hence light-receiving regions 6B-6G are provided so as to correspond to six regions 5B-5G. Four regions 5B, 5C, 5F, and 5G are identical in shape. On the other hand, the regions 5D and 5E are semicircle-shaped and include the optical axis of the main beam. The regions 5D and 5E form a circle. The radius of each of the aforesaid semicircles is determined in such a manner that the regions 5D and 5E of the hologram 5, where the light beam reflected off the optical disc 4 is split, include a region where stray light from the non-targeted layer which is farther away from the objective lens 3 than the targeted layer converges. In other words, the far-side stray light 8f irradiates the regions 5D and 5E.

The light-receiving regions 6B, 6C, 6F, and 6G include main beam light-receiving region 6B-0, 6C-0, 6F-0, and 6G-2 receiving zero-th transmitted light, sub beam light-receiving regions 6B-1, 6B-2 to 6G-1, and 6G-2, and auxiliary light-receiving regions 6B-12, 6C-12, 6F-12, and 6G-12, respectively. The auxiliary light-receiving regions 6B-12, 6C-12, 6F-12, and 6G-12 one-to-one correspond to the light-receiving regions 6B, 6C, 6F, and 6G.

In the present embodiment, a focusing error signal is figured out from the region 5D, a tracking error signal is figured out from the regions 5B, 5C, 5F, and 5G, and a total signal are figured out from all regions. According to the arrangement above, the beam diameter of the far-side stray light 8f is smaller than the regions 5D and 5E. On this account, no stray light is generated from the regions 5B, 5C, 5F, and 5G which perform the split for generating the tracking error signal. Furthermore, because of the arrangement above, the areas, on the light-receiving regions 6D and 6E, which are irradiated by the stray light are consistent. For this reason, it is possible to bring the focusing-use light-receiving regions and the tracking-use light-receiving regions to one another, without allowing the focusing-use light beam reflected off the non-targeted layer to irradiate the tracking-use light-receiving regions 6B and 6C.

An information writing/reading device including the optical pickup device 7 of the present embodiment is described below.

As shown in FIG. 19, an information writing/reading device 50 of the present embodiment includes a spindle motor 51 which drives and rotates the optical disc 4, an optical pickup device 7 which writes/reads information to/from the optical disc 4, and a drive control section 52 which drives and controls the spindle motor 51 and the optical pickup device 7.

The drive control section 52 includes a spindle motor drive circuit which drives and controls the spindle motor 51, a focus drive circuit which drives and controls a focus actuator which moves the objective lens in the focusing directions, and a tracking drive circuit which controls and drives a tracking actuator which moves the objective lens in the radial directions. The drive control section 52 further includes a control signal generation circuit which generates, from signals supplied from the optical pickup device 7, control signals for the above-described control circuits, and an information reproduction circuit which (i) reproduces information recorded on the optical disc 4, from the signals obtained from the optical pickup device 7, and (ii) generate a reproduction signal.

In order to achieve the foregoing object, an optical pickup unit of the present invention includes: a splitting section for at least (i) splitting at least one tracking-use main beam from a main beam which has been reflected off a storage medium and passed through a converging section and (ii) splitting at least one tracking-use sub beam from each of sub beams having lower light intensity than the main beam, the tracking-use main beam and the tracking-use sub beam used for figuring out a tracking servo signal, the storage section including plural information writing layers being laminated; and a light-receiving section for receiving the tracking-use main beam and the tracking-use sub beam, the light-receiving section including: (A) at least one tracking-use main light-receiving region for receiving the tracking-use main beam, (B) tracking-use sub light-receiving regions each for receiving the tracking-use sub beam, and (C) auxiliary light-receiving regions each for receiving only a light beam reflected off an information writing layer other than the information writing layer subjected to an information reading/writing process, each of the auxiliary light-receiving regions serving as a light-receiving region for use in error amount calculation for restraining an error in the tracking servo signal, and each of the auxiliary light-receiving regions having a smaller light-receiving area than that of each of the tracking-use sub light-receiving regions.

Here, a light beam (main beam or sub beams) reflected off the information writing layer (Hereinafter, non-targeted layer) other than the information writing layer (Hereinafter, targeted layer) being subject to an information writing/reading process irradiates a larger area of the light-receiving section than a light beam which has been reflected off the targeted layer, and which passed through the converging section. This is attributed to a difference between the respective optical path lengths of the light beams. Accordingly, the intensity per unit area of the light beam reflected off the non-targeted layer is lower than the light beam reflected off the targeted layer.

However, the main beam has a stronger light intensity than each of the sub beams, and the light intensity of the main beam reflected off the non-targeted layer is close to that of each sub beam reflected off the targeted layer. On this account, when the main beam reflected off the non-targeted layer enters each of the tracking-use sub light-receiving regions and the tracking-use main light-receiving region each being provided for finding out the tracking servo signal, an error occurs in a light quantity of the received light. Consequently, an accurate tracking signal is not obtained.

In view of this problem, the optical pickup unit of the present invention is provided with the auxiliary light-receiving regions each serves as a light-receiving region for use in calculating an error amount for restraining an error in the tracking servo signal, and which region receives only a light beam reflected off an information writing layer other than an information writing layer subjected to an information writing/reading process: i.e. receives only a light beam reflected off the non-targeted layer.

Here, in a case of figuring out a tracking signal by using the both main beam and sub beams as in the case of the optical pickup unit of the present invention, it is necessary to provide each tracking-use sub light-receiving region and the tracking-use main light-receiving region with an auxiliary light-receiving region for use in calculating an error amount. However, the provision of the auxiliary light-receiving region to each tracking-use sub light-receiving region and the tracking-use main light-receiving region causes an increase in the area of the entire light-receiving section, and causes complication of the associated circuits. This is disadvantageous in terms of cost.

In view of that, in the optical pickup unit of the present invention, the light-receiving area of each auxiliary light-receiving region is made smaller than that of the tracking-use sub light-receiving region, so that it is possible to more accurately cancel out the light quantity (i.e. error amount) of a light beam (stray light) reflected off the non-targeted layer, which light beam is included in a light quantity received by the tracking-use sub light-receiving regions and the tracking-use main light-receiving region. In this way, the offset occurring when figuring out a tracking servo signal is more surely cancelled out, and more accurate tracking servo signal is obtained. Note that the above mentioned light-receiving area is a planar dimension of a region which actually receives a light beam.

With the configuration, it is no longer necessary to provide an auxiliary light-receiving region for each of the tracking-use main light-receiving region and the tracking-use sub light-receiving region, at the time of calculating a tracking servo signal, and yet it is possible to restrain an error caused by stray light entered the both tracking-use main light-receiving region and the tracking-use sub light-receiving region. Thus, an accurate tracking servo signal is obtained without a need of increasing the entire area of the light-receiving section, or without a need of a complicated circuit associated with the light-receiving regions.

Furthermore, an accurate and stable tracking control is possible without a need of increasing the number of the auxiliary light-receiving regions, in a case of writing information by using plural beams (e.g. in a case of writing information into a DVD± disc by using three beams).

In addition to the above configuration, the optical pickup unit of the present invention is adapted so that the splitting section splits the main beam and each of the sub beams into a plurality of the tracking-use main beams and a plurality of the tracking-use sub beams respectively; the light-receiving section includes (i) a plurality of the tracking-use main light-receiving regions, (ii) the tracking-use sub light-receiving regions, and (iii) the auxiliary light-receiving regions, for the respective tracking-use main beams or the respective tracking-use sub beams; and the auxiliary light-receiving regions provided for the tracking-user main beams or the tracking-use sub beams have different light receiving areas.

In the above configuration, the respective areas of the auxiliary light-receiving regions are different from one another. Thus it is possible to calculate an error amount, according to the beam diameter, despite variation in diameter of stray light beams respectively stemming from the plurality of tracking-use main beams split from the main beam This allows more accurate tracking control.

Note that an area of each auxiliary light-receiving region is preferably determined, in accordance with a light quantity per unit of stray light incident thereon.

Further, in order to achieve the foregoing object, an optical pickup unit of the present invention includes: a splitting section for at least (i) splitting at least one tracking-use main beam from a main beam which has been reflected off a storage medium and passed through a converging section and (ii) splitting at least one tracking-use sub beam from each of sub beams having lower light intensity than the main beam, the tracking-use main beam and the tracking-use sub beam used for figuring out a tracking servo signal, the storage section including plural information writing layers being laminated; and a light-receiving section for receiving the tracking-use main beam and the tracking-use sub beam, the light-receiving section including: (A) at least one tracking-use main light-receiving region for receiving the tracking-use main beam, (B) tracking-use sub light-receiving regions each for receiving the tracking-use sub beam, and (C) auxiliary light-receiving regions each for receiving only a light beam reflected off an information writing layer other than the information writing layer subjected to an information reading/writing process, each of the auxiliary light-receiving regions serving as a light-receiving region for use in error amount calculation for restraining an error in the tracking servo signal; and the light-receiving section is connected to a calculating circuit for calculating out the tracking servo signal based on a light quantity in the light-receiving sections, the calculating circuit being provided with a gain adjuster for adding gain to a signal output based on the light quantity in the light-receiving sections, the gain adjuster adds, to a signal derived from the auxiliary light-receiving regions, a smaller gain than gain added to a signal derived from the tracking-use sub light-receiving regions.

Here, a light beam (main beam or sub beams) reflected off the information writing layer (Hereinafter, non-targeted layer) other than the information writing layer (Hereinafter, targeted layer) being subject to an information writing/reading process irradiates a larger area of the light-receiving section than a light beam which has been reflected off the targeted layer, and which passed through the converging section. This is attributed to a difference between the respective optical path lengths of the light beams. Accordingly, the intensity per unit area of the light beam reflected off the non-targeted layer is lower than the light beam reflected off the targeted layer.

However, the main beam has a stronger light intensity than each of the sub beams, and the light intensity of the main beam reflected off the non-targeted layer is close to that of each sub beam reflected off the targeted layer. On this account, when the main beam reflected off the non-targeted layer enters each of the tracking-use sub light-receiving regions and the tracking-use main light-receiving region each being provided for finding out the tracking servo signal, an error occurs in a light quantity of the received light. Consequently, an accurate tracking signal is not obtained.

In view of this problem, the optical pickup unit of the present invention is provided with the auxiliary light-receiving regions each serves as a light-receiving region for use in calculating an error amount for restraining an error in the tracking servo signal, and which region receives only a light beam reflected off an information writing layer other than an information writing layer subjected to an information writing/reading process: i.e. receives only a light beam reflected off the non-targeted layer.

Here, in a case of figuring out a tracking signal by using the both main beam and sub beams as in the case of the optical pickup unit of the present invention, it is necessary to provide each tracking-use sub light-receiving region and the tracking-use main light-receiving region with an auxiliary light-receiving region for use in calculating an error amount. However, the provision of the auxiliary light-receiving region to each tracking-use sub light-receiving region and the tracking-use main light-receiving region causes an increase in the area of the entire light-receiving section, and causes complication of the associated circuits. This is disadvantageous in terms of cost.

In view of that, the optical pickup unit of the present invention includes the calculating circuit connected to the light-receiving section, which circuit is for calculating a tracking servo signal based on a light quantity having received by each of the light-receiving regions. This calculating circuit is provided with the gain adjuster which adds gain to a signal output from each of the light-receiving regions. The gain adjuster adds, to a signal originated in the auxiliary light-receiving regions, smaller gain than gain added to a signal originated in the tracking-use sub light-receiving regions.

In this way, it is possible to more accurately cancel out a light quantity (i.e. error amount) of a light beam (stray light) having been reflected off the non-targeted layer, which light beam is included in a light quantity entered the tracking-use sub light-receiving regions and the tracking-use main light-receiving region. Thus, the offset occurring when obtaining a tracking servo signal is more surely cancelled out, and more accurate tracking servo signal is obtained.

With the configuration, it is no longer necessary to provide an auxiliary light-receiving region for each of the tracking-use main light-receiving region and the tracking-use sub light-receiving region, at the time of calculating a tracking servo signal, and yet it is possible to restrain an error caused by stray light entered the both tracking-use main light-receiving region and the tracking-use sub light-receiving region. Thus, an accurate tracking servo signal is obtained without a need of increasing the entire area of the light-receiving section, or without a need of a complicated circuit associated with the light-receiving regions.

Furthermore, an accurate and stable tracking control is possible without a need of increasing the number of the auxiliary light-receiving regions, in a case of writing information by using plural beams (e.g. in a case of writing information into a DVD± disc by using three beams).

In addition to the above configuration, the optical pickup unit of the present invention is so adapted that the splitting section splits the main beam and each of the sub beams into a plurality of the tracking-use main beams and a plurality of the tracking-use sub beams respectively; the light-receiving section includes (i) a plurality of the tracking-use main light-receiving regions, (ii) the tracking-use sub light-receiving regions, and (iii) the auxiliary light-receiving regions, for the respective tracking-use main beams or the respective tracking-use sub beams; and the gains respectively added by the gain adjuster to signals of the auxiliary light-receiving regions provided for the tracking-use main beams or the tracking-use sub beams are different from one another.

Diameters of stray light beams respectively stemming from the tracking-use main beams split via the splitting section from the main beam are different from each other, and the an error varies according to the beam diameters. With the above configuration, however, the gains to be added by the gain adjuster are different from one another. This makes it possible to calculate an error amount, according to the beam diameters. Thus, more accurate tracking control is possible.

Note that a gain to be added to a signal derived from each auxiliary light-receiving region is preferably determined, in accordance with a light quantity per unit area of stray light incident on the auxiliary light-receiving region.

In addition to the above configuration, the optical pickup unit of the present invention is so adapted that the splitting section splits the tracking-use main beam and the tracking-use sub beam respectively from the main beam and each of the sub beams, in a region other than a region on which the main beam and the sub beams are converged, the main beam and the sub beams having been reflected off an information writing layer which is more distant from the converging section than an information writing layer subjected to an information reading/writing process is from the same.

Amongst the non-targeted layers, a light beam reflected off the information writing layer which is more distant from the converging section than the targeted layer is from the same is converged on a smaller region than a region of the splitting section on which region a light beam having reflected off the targeted layer is converged. This is due to a difference between the respective light path lengths of the two beams. With the splitting section of the above configuration, splitting of a light beam into the tracking-use light beams is performed by using a region other than the region on which the light beam reflected off the information writing layer which is more distant from the converging section than the targeted layer is from the same (i.e. by using a region other than the above mentioned smaller region). Thus, the light beam reflected off the information writing layer which is more distant from the converging section than the targeted layer is from the same is kept from entering the tracking light-receiving region. Accordingly, it is no longer necessary to provide an auxiliary light-receiving region for receiving only a light beam (stray light) reflected off the information writing layer which is more distant from the converging section than the targeted layer is from the same.

It is possible to adapt the above splitting section so that a light beam having been reflected off the storage medium is split into tracking-use light beams (tracking-use main beams and tracking-use sub beams) in regions other than regions nearby the optical axis of the light beam.

Further, the tracking light-receiving regions may be so adapted as to receive only beams split from the main beam and sub beams in the splitting regions of the splitting section, however amongst which regions being other than regions on which the main beam and the sub beams having been reflected off an information writing layer which is more distant from the converging section than the information writing layer subjected to an information writing/reading process, is converged.

The optical pickup unit may be adapted so that each of the auxiliary light-receiving regions is arranged adjacent to the tracking-use sub light-receiving regions.

In the configuration, the auxiliary light-receiving regions are respectively arranged adjacent to the tracking-use sub light-receiving regions. With this configuration, it is possible to accurately obtain the light density of the stray light received by the tracking-use sub light-receiving regions. Further, the respective light-receiving areas of the auxiliary light-receiving areas are smaller than the light-receiving areas of the tracking-use sub light-receiving regions. Therefore, it is possible to cancel out an error caused by stray light received by the tracking-use main light-receiving region.

The optical pickup unit may be adapted so that the tracking servo signal is obtained by using a differential push-pull method.

In the optical pickup unit of the present invention, the respective light-receiving areas of the auxiliary light-receiving regions are smaller than the light-receiving areas of the tracking-use sub light-receiving regions. Further, if the optical pickup unit obtains a tracking servo signal by using a differential push-pull method as described above, the optical pickup unit is able to cancel interlayer crosstalk by using a light quantity detected by the auxiliary light-receiving regions, in such a manner that offsets in the tracking-use sub light-receiving regions and offsets in the tracking-use main light-receiving regions are cancelled all together. In other words, there is no need for providing an auxiliary light-receiving region for each tracking-use main light-receiving region and each tracking-use sub light-receiving region, and an accurate tracking servo signal is obtained by canceling out, with the use of a single auxiliary light-receiving region, an offset occurring when figuring out the tracking servo signal The optical pickup unit may be adapted so that the splitting section is a hologram.

With the above configuration, a light beam can be split with a simple configuration. This allows downsizing of a device.

Further, the optical pickup may further include: a light source for irradiating the storage medium with a light beam; and a generating section for generating the main beam and the sub beam from the light beam emitted from the light source.

With the above configuration, an accurate tracking servo signal is obtained with a use of differential push-pull method using three beams.

Further, in the optical pickup unit of the present invention, the splitting section, light-receiving section, light source, and generating section are integrated.

Since the splitting section, the light-receiving section, the light source, and the generating section are integrated, the optical pickup device can be downsized.

Further, an information writing/reading device of the present invention includes any one of the above described optical pickup units.

The above configuration includes the above described optical pickup unit, and as such is able to perform good information writing/reading no matter if a storage medium has plural information writing layers or not.

As described, in an optical pickup device of the present invention, the light-receiving section includes: (A) at least one tracking-use main light-receiving region for receiving the tracking-use main beam, (B) tracking-use sub light-receiving regions each for receiving the tracking-use sub beam, and (C) auxiliary light-receiving regions each for receiving only a light beam reflected off an information writing layer other than the information writing layer subjected to an information reading/writing process, each of the auxiliary light-receiving regions serving as a light-receiving region for use in error amount calculation for restraining an error in the tracking servo signal, and each of the auxiliary light-receiving regions having a smaller light-receiving area than that of each of the tracking-use sub light-receiving regions.

Further, as described, in an optical pickup device of the present invention, the light-receiving section includes: (A) at least one tracking-use main light-receiving region for receiving the tracking-use main beam, (B) tracking-use sub light-receiving regions each for receiving the tracking-use sub beam, and (C) auxiliary light-receiving regions each for receiving only a light beam reflected off an information writing layer other than the information writing layer subjected to an information reading/writing process, each of the auxiliary light-receiving regions serving as a light-receiving region for use in error amount calculation for restraining an error in the tracking servo signal; and the light-receiving section is connected to a calculating circuit for calculating out the tracking servo signal based on a light quantity in the light-receiving sections, the calculating circuit being provided with a gain adjuster for adding gain to a signal output based on the light quantity in the light-receiving sections, the gain adjuster adds, to a signal derived from the auxiliary light-receiving regions, a smaller gain than gain added to a signal derived from the tracking-use sub light-receiving regions.

With one of the above described configurations, an error which is caused by stray light entered a tracking-use main light-receiving regions and the tracking-use sub light-receiving regions is restrained when calculating a tracking servo signal, without a need of providing an auxiliary light-receiving region for each tracking-use main light-receiving regions and each tracking-use sub light-receiving region. Thus, an accurate tracking servo signal is obtained without a need of increasing the entire area of the light-receiving section, or without a need of a complicated circuit associated with the light-receiving regions.

In order to achieve the foregoing object, an optical pickup unit of the present invention includes: a splitting section for (i) splitting a main beam reflected off a storage medium and passed through a converging section into a focusing-use main beam for use in figuring out a focus servo signal and at least one tracking-use main beam for use in figuring out a tracking servo signal, the storage medium having plural information writing layers being laminated, and (ii) splitting at least one tracking-use sub beam for use in figuring out the tracking servo signal, from each of sub beams each having a lower light intensity than the main beam; and a tracking light-receiving region for receiving the tracking-use main beam and the tracking-use sub beam, the tracking light-receiving region including a sub light-receiving region for receiving the tracking-use sub beam, and the tracking light-receiving region being arranged so that a focusing-use main beam reflected off an information writing layer other than an information writing layer subjected to an information writing/reading process is kept from entering the sub light-receiving region.

Each of the sub beams has lower intensity than the main beam, and each of the sub light-receiving regions receives such a sub beam whose light intensity is low. Accordingly, when the sub light-receiving regions receives stray light (unwanted light) other than the tracking-use sub beams, an error occurs in a signal generated in the sub light-receiving regions.

Further, a light beam (main beam or sub beams) reflected off the information writing layer (Hereinafter, non-targeted layer) other than the information writing layer (Hereinafter, targeted layer) being subject to information writing/reading process irradiates a larger area of the light-receiving section than a light beam reflected off the targeted layer and passed through the converging section, due to a difference between the respective optical path lengths of the light beams. Accordingly, the intensity per unit area of the light beam reflected off the non-targeted layer is lower than the light beam reflected off the targeted layer. However, the main beam has a stronger light intensity than each of the sub beams, and the light intensity of the main beam reflected off the non-targeted layer is close to that of each sub beam reflected off the targeted layer. Further, when the focusing-use main beam having reflected off the non-targeted layer enters the sub light-receiving regions, the sub light-receiving region is not able to obtain an accurate signal due to the light intensity of the focusing-use main beam.

In the above configuration, the tracking light-receiving regions are arranged so that the focusing-use main beam having been reflected off the non-targeted layer does not enter the sub light-receiving regions. In short, the sub light-receiving regions do not allow entering of the focusing-use main beam having been reflected off the non-targeted layer. Accordingly, it is possible to perform more accurate and stable tracking control than a conventional configuration which does not take into account the entering of the focusing-use main beam into the sub light-receiving region.

Note that the splitting section may be adapted so that, for example, a light beam is split into (i) a focusing-use light beam, (ii) a tracking-use light beam, and (iii) a reading-use light beam for obtaining a reproduced signal. In a case where the splitting section splits a light beam into the focusing-use light beam and the tracking-use light beam, the splitting section may obtain the reproduced signal by using the focusing-use light beam, or by using the both focusing-use light beam and the tracking-use light beam.

An optical pickup unit of the present invention is more preferably adapted so that the splitting section splits each of the sub beams into the tracking-use sub beam for obtaining a tracking servo signal, and another sub beam which is not the tracking-use sub beam; and the tracking light-receiving region is arranged so that the focusing-use main beam and the other sub beam each reflected off an information writing layer other than an information writing layer subjected to an information writing/reading process are kept from entering the sub light-receiving region.

The wording "the other sub beam" means one of the sub beams having been split via the splitting section, which beam is not a tracking-use sub beam for obtaining a tracking servo signal.

With the configuration, each tracking-use sub beam for obtaining a tracking servo signal and the light beam other than the tracking-use main beam (focusing-use main beam and the other sub beam) are kept from entering the sub light-receiving regions. More specifically, amongst light beams reflected off the non-targeted layer, a light beam other than the tracking-use light beam are kept from entering the sub light-receiving regions. This allows more accurate and stable tracking control.

The tracking light-receiving region of the optical pickup unit of the present invention more preferably includes an auxiliary light-receiving area for receiving only a tracking-use main beam and/or a tracking-use sub beam reflected off an information writing layer other than an information writing layer subjected to an information writing/reading process.

The tracking-use main beam and/or the tracking-use sub beam reflected off the non-targeted layer enter(s) a larger area than a tracking-use sub beam reflected off the targeted layer. Therefore, the tracking-use main beam and/or the tracking-use sub beam reflected off the non-targeted layer enter(s) the sub light-receiving region along with the tracking-use sub beam reflected off the targeted layer. Accordingly, a light quantity (light intensity) received by each sub light-receiving region is influenced by the tracking-use main beam and/or the tracking-use sub beam reflected off the non-targeted layer.

The above configuration, however, includes the auxiliary light-receiving region for receiving only the tracking-use main beam and/or the tracking-use sub beam reflected off the non-targeted layer. With this configuration, it is possible to know the degree of influence from the tracking-use main beam and/or the tracking-use sub beam reflected off the non-targeted layer. Therefore, it is possible to remove such influence.

The pickup unit of the present invention is more preferably adapted so that each of tracking light-receiving regions further includes a main light-receiving region for receiving the tracking-use main beam, and that the light-receiving area of each auxiliary light-receiving region is smaller than the light-receiving area of the sub light-receiving region.

Here, the tracking servo signal is calculated out, by using a differential push-pull method (Method for obtaining tracking servo signal by using three beams), in accordance with a light quantity entered the main light-receiving region and the sub light-receiving region.

In the configuration, the light-receiving area of the auxiliary light-receiving region is made smaller than the light-receiving area of the sub light-receiving region. With this configuration, interlayer crosstalk can be removed, in such a manner that offsets in the tracking-use sub light-receiving regions and offsets in the tracking-use main light-receiving regions are cancelled all together, by using a differential push-pull method using a light quantity detected by the auxiliary light-receiving region. Since the interlayer crosstalk is removed without a need of a detector (light-receiving section) for detecting an offset occurring in the main light-receiving region, it is possible to down size the optical pickup unit. Note that the above mentioned light-receiving area is an area of a region which actually receives a light beam.

The tracking light-receiving regions of the optical pickup unit of the present invention are more preferably arranged so that the focusing-use main beam and the other sub beams reflected from the information writing layer other than the information writing layer subjected to an information writing/reading process are kept from entering the auxiliary light-receiving regions.

In the configuration, the auxiliary light-receiving regions are arranged in such positions that the focusing-use main beam and the sub beams reflected off the non-targeted layer are not able to enter. Therefore, each of the auxiliary light-receiving regions are able to receive only the tracking-use main beam and/or the tracking-use sub beams. This allows even more accurate and stable tracking control.

The splitting section of the optical pickup unit of the present invention is more preferably adapted so that the tracking-use main beam and the tracking-use sub beams are obtained respectively from the main beam and the sub beams reflected off an information writing layer which is more distant from the converging section than the information layer subjected to an information writing/reading process is from the same, by splitting the main beam and the sub beams in regions other than the regions on which the main beam and the sub beams are converged.

Amongst the non-targeted layers, a light beam reflected off the information writing layer which is more distant from the converging section than the targeted layer is from the same is converged on a smaller region than a region of the splitting section on which region a light beam having reflected off the targeted layer is converged. This is due to a difference between the respective light path lengths of the two beams. With the splitting section of the above configuration, splitting of a light beam into the tracking-use light beams is performed by using a region other than the region on which the light beam reflected off the information writing layer which is more distant from the converging section than the targeted layer is from the same (i.e. by using a region other than the above mentioned smaller region). Thus, the light beam reflected off the information writing layer which is more distant from the converging section than the targeted layer is from the same is kept from entering the tracking light-receiving region. Accordingly, it is no longer necessary to provide an auxiliary light-receiving region for receiving only a light beam reflected off the information writing layer which is more distant from the converging section than the targeted layer is from the same.

It is possible to adapt the above splitting section so that a light beam having been reflected off the storage medium is split into tracking-use light beams (tracking-use main beams and tracking-use sub beams) in regions other than regions nearby the optical axis of the light beam.

Further, the tracking light-receiving regions may be so adapted as to receive only beams split from the main beam and sub beams in the splitting regions of the splitting section, however amongst which regions being other than regions on which the main beam and the sub beams having been reflected off an information writing layer which is more distant from the converging section than the information writing layer subjected to an information writing/reading process, is converged.

In the optical pickup unit of the present invention, the splitting section is more preferably a hologram.

With the above configuration, a light beam can be split with a simple configuration. This allows downsizing of a device.

In an optical pickup unit of the present invention, it is more preferable that the a splitting section, a light-receiving section, a light source for irradiating a storage medium with a light beam, and a generating section for generating a main beam and sub beams from the light beam emitted from the light source be integrated.

Since the splitting section, the light-receiving section, the light source, and the generating section are integrated, the optical pickup device can be downsized.

An optical pickup device of the present invention includes the above described optical pickup unit.

The above configuration includes the above described optical pickup unit, and as such is able to perform good information writing/reading no matter if a storage medium has plural information writing layers or not.

Further, an information writing/reading device of the present invention includes the above described optical pickup unit.

The above configuration includes the above described optical pickup unit, and as such is able to perform good information writing/reading no matter if a storage medium has plural information writing layers or not.

An optical pickup unit of the present invention includes: a splitting section for (i) splitting a main beam reflected off a storage medium and passed through a converging section into a focusing-use main beam for use in figuring out a focus servo signal and at least one tracking-use main beam for use in figuring out a tracking servo signal, the storage medium having plural information writing layers being laminated, and (ii) splitting at least one tracking-use sub beam for use in figuring out the tracking servo signal, from each of sub beams each having a lower light intensity than the main beam; and a tracking light-receiving region for receiving the tracking-use main beam and the tracking-use sub beam, the tracking light-receiving region including a sub light-receiving region for receiving the tracking-use sub beam, and the tracking light-receiving region being arranged so that a focusing-use main beam reflected off an information writing layer other than an information writing layer subjected to an information writing/reading process is kept from entering the sub light-receiving region.

Therefore, the sub light-receiving regions do not allow entering of the focusing-use main beam having been reflected off the non-targeted layer. Accordingly, it is possible to perform more accurate and stable tracking control than a conventional configuration which does not take into account the entering of the focusing-use main beam into the sub light-receiving region.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

An optical pickup device of the present invention is particularly suitable for writing-type information writing/reading device which is capable of writing information into a multi-layered optical disc.

The invention claimed is:
1. An optical pickup unit comprising:
a splitting section for at least (i) splitting at least one tracking-use main beam from a main beam which has been reflected off a storage medium and passed through a converging section and (ii) splitting at least one tracking-use sub beam from each of sub beams having lower light intensity than the main beam, the tracking-use main beam and the tracking-use sub beam used for determining a tracking servo signal, the storage section including plural information writing layers being laminated; and a light-receiving section for receiving the tracking-use main beam and the tracking-use sub beam, the light-receiving section including:

(A) at least one tracking-use main light-receiving region for receiving the tracking-use main beam, (B) tracking-use sub light-receiving regions each for receiving the tracking-use sub beam, and (C) auxiliary light-receiving regions each for receiving only a light beam reflected off an information writing layer other than the information writing layer subjected to an information reading/writing process, each of the auxiliary light-receiving regions serving as a light-receiving region for use in error amount calculation for restraining an error in the tracking servo signal, and each of the auxiliary light-receiving regions having a smaller light-receiving area than that of each of the tracking-use sub light-receiving regions, wherein in a case where a gain is added to a signal output based on a light quantity in the light-receiving section, a gain added to a signal derived from the auxiliary light-receiving regions is equal to a gain added to a signal derived from the tracking-use sub light-receiving regions.

2. The optical pickup unit as set forth in claim 1, wherein:

the splitting section splits the main beam and each of the sub beams into a plurality of the tracking-use main beams and a plurality of the tracking-use sub beams respectively;

the light-receiving section includes (i) a plurality of the tracking-use main light-receiving regions, (ii) the tracking-use sub light-receiving regions, and (iii) the auxiliary light-receiving regions, for the respective tracking-use main beams or the respective tracking-use sub beams; and the auxiliary light-receiving regions provided for the tracking-user main beams or the tracking-use sub beams have different light receiving areas.

3. The optical pickup unit as set forth in claim 1, wherein:

the splitting section splits the main beam and each of the sub beams into a plurality of the tracking-use main beams and a plurality of the tracking-use sub beams respectively;

the light-receiving section includes (i) a plurality of the tracking-use main light-receiving regions, (ii) the tracking-use sub light-receiving regions, and (iii) the auxiliary light-receiving regions, for the respective tracking-use main beams or the respective tracking-use sub beams; and gains added by a gain adjuster to signals of the auxiliary light-receiving regions provided for the tracking-use main beams or the tracking-use sub beams are different from one another.

4. An optical pickup unit comprising:

a splitting section for at least (i) splitting at least one tracking-use main beam from a main beam which has been reflected off a storage medium and passed through a converging section and (ii) splitting at least one tracking-use sub beam from each of sub beams having lower light intensity than the main beam, the tracking-use main beam and the tracking-use sub beam used for determining a tracking servo signal, the storage section including plural information writing layers being laminated; and a light-receiving section for receiving the tracking-use main beam and the tracking-use sub beam, the light-receiving section including:

(A) at least one tracking-use main light-receiving region for receiving the tracking-use main beam, (B) tracking-use sub light-receiving regions each for receiving the tracking-use sub beam, and (C) auxiliary light-receiving regions each for receiving only a light beam reflected off an information writing layer other than the information writing layer subjected to an information reading/writing process, each of the auxiliary light-receiving regions serving as a light-receiving region for use in error amount calculation for restraining an error in the tracking servo signal; and the light-receiving section is connected to a calculating circuit for calculating out the tracking servo signal based on a light quantity in the light-receiving sections, the calculating circuit being provided with a gain adjuster for adding gain to a signal output based on the light quantity in the light-receiving sections, the gain adjuster adds, to a signal derived from the auxiliary light-receiving regions, a smaller gain than gain added to a signal derived from the tracking-use sub light-receiving regions.

5. An optical pickup unit as set forth in claim 1 or 4, wherein:

each of the auxiliary light-receiving regions is arranged adjacent to the tracking-use sub light-receiving regions.

6. An optical pickup unit as set forth in claim 1 or 4, wherein:

the tracking servo signal is obtained by using a differential push-pull method.

7. The optical pickup unit as set forth in claim 1 or claim 4, wherein:

the splitting section splits the tracking-use main beam and the tracking-use sub beam respectively from the main beam and each of the sub beams, in a region other than a region on which the main beam and the sub beams are converged, the main beam and the sub beams having been reflected off an information writing layer which is more distant from the converging section than an information writing layer subjected to an information reading/writing process is from the same.

8. The optical pickup unit as set forth in claim 1 or claim 4, wherein the optical pickup unit is connected to a gain adjuster for adding a gain to an output signal from at least one of the auxiliary light-receiving regions.

* * * * *